(12) United States Patent  (10) Patent No.: US 7,774,155 B2
Sato et al.  (45) Date of Patent: Aug. 10, 2010

(54) ACCELEROMETER-BASED CONTROLLER

(75) Inventors: Kenta Sato, Kyoto (JP); Akio Ikeda, Kyoto (JP); Kuniaki Ito, Kyoto (JP); Ryoji Kuroda, Kyoto (JP); Masahiro Urata, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 113 days.

(21) Appl. No.: 12/222,787

(22) Filed: Aug. 15, 2008

(65) Prior Publication Data

US 2009/0005166 A1  Jan. 1, 2009

Related U.S. Application Data

(63) Continuation of application No. 11/406,276, filed on Apr. 19, 2006, now Pat. No. 7,424,388.

(30) Foreign Application Priority Data

Mar. 10, 2006 (JP) ............................. 2006-066450

(51) Int. Cl.
 *A63F 9/00* (2006.01)
(52) U.S. Cl. .................. 702/127; 702/150; 702/151; 702/152; 702/153; 702/154; 702/155; 345/156; 345/157; 345/158; 345/159; 345/160; 345/161; 345/163; 345/169; 463/35; 463/36; 463/37; 463/38; 463/39; 463/40; 463/41; 463/42; 463/43; 463/44; 463/45
(58) Field of Classification Search .................. 702/127, 702/150–155; 163/36, 38, 43, 44; 345/156–161, 345/163, 169; 463/35–45
See application file for complete search history.

(56) References Cited

U.S. PATENT DOCUMENTS 3,454,920 A 7/1969 Mehr (Continued)

FOREIGN PATENT DOCUMENTS

DE 03930581 3/1991

(Continued)

OTHER PUBLICATIONS

Acar, "Robust Micromachined Vibratory Gyroscopes" Dissertation (Dec. 2004).

(Continued)

*Primary Examiner*—Sujoy K Kundu
(74) *Attorney, Agent, or Firm*—Nixon & Vanderhye P.C.

(57) ABSTRACT

Acceleration data which is output from an acceleration sensor is obtained. A rotation motion of an input device around a predetermined direction as a rotation axis is determined by comparing a start point in a two-dimensional coordinate system which is represented by the first acceleration data obtained in a predetermined period, and an end point in the two-dimensional coordinate system which is represented by the last acceleration data obtained in the predetermined period. Coordinate axes of the two-dimensional coordinate system are defined based on components of the two axial directions of the acceleration data, and an origin of the two-dimensional coordinate system represents a value of the acceleration data in the state where no acceleration including the acceleration of gravity acts upon the acceleration sensor. Motion data including at least the determined rotation motion is output.

21 Claims, 26 Drawing Sheets

U.S. PATENT DOCUMENTS

| | | |
|---|---|---|
| 3,474,241 A | 10/1969 | Kuipers |
| D220,268 S | 3/1971 | Kliewer |
| 3,660,648 A | 5/1972 | Kuipers |
| 3,973,257 A | 8/1976 | Rowe |
| 4,009,619 A | 3/1977 | Snyman |
| 4,038,876 A | 8/1977 | Morris |
| 4,166,406 A | 9/1979 | Maughmer |
| 4,240,638 A | 12/1980 | Morrison et al. |
| 4,287,765 A | 9/1981 | Kreft |
| 4,303,978 A | 12/1981 | Shaw et al. |
| 4,318,245 A | 3/1982 | Stowell et al. |
| 4,321,678 A | 3/1982 | Krogmann |
| 4,337,948 A | 7/1982 | Breslow |
| 4,342,985 A | 8/1982 | Desjardins |
| 4,402,250 A | 9/1983 | Baasch |
| 4,425,488 A | 1/1984 | Moskin |
| 4,443,866 A | 4/1984 | Burgiss, Sr. |
| 4,450,325 A | 5/1984 | Luque |
| 4,503,299 A | 3/1985 | Henrard |
| 4,514,798 A | 4/1985 | Lesche |
| 4,540,176 A | 9/1985 | Baer |
| 4,546,551 A | 10/1985 | Franks |
| 4,558,604 A | 12/1985 | Auer |
| 4,561,299 A | 12/1985 | Orlando et al. |
| 4,578,674 A | 3/1986 | Baker et al. |
| 4,623,930 A | 11/1986 | Oshima et al. |
| 4,672,374 A | 6/1987 | Desjardins |
| 4,739,128 A | 4/1988 | Grisham |
| 4,761,540 A | 8/1988 | McGeorge |
| 4,787,051 A | 11/1988 | Olson |
| 4,816,810 A | 3/1989 | Moore |
| 4,839,838 A | 6/1989 | LaBiche et al. |
| 4,849,655 A | 7/1989 | Bennett |
| 4,851,685 A | 7/1989 | Dubgen |
| 4,862,165 A | 8/1989 | Gart |
| 4,914,598 A | 4/1990 | Krogmann et al. |
| 4,918,293 A | 4/1990 | McGeorge |
| 4,957,291 A | 9/1990 | Miffitt et al. |
| 4,961,369 A | 10/1990 | McGill |
| 4,969,647 A | 11/1990 | Mical et al. |
| 4,994,795 A | 2/1991 | MacKenzie |
| 5,045,843 A | 9/1991 | Hansen |
| D320,624 S | 10/1991 | Taylor |
| 5,059,958 A | 10/1991 | Jacobs et al. |
| 5,062,696 A | 11/1991 | Oshima et al. |
| 5,068,645 A | 11/1991 | Drumm |
| D322,242 S | 12/1991 | Cordell |
| D325,225 S | 4/1992 | Adhida |
| 5,124,938 A | 6/1992 | Algrain |
| 5,128,671 A | 7/1992 | Thomas, Jr. |
| D328,463 S | 8/1992 | King et al. |
| 5,136,222 A | 8/1992 | Yamamoto |
| 5,138,154 A | 8/1992 | Hotelling |
| D331,058 S | 11/1992 | Morales |
| 5,175,481 A | 12/1992 | Kanno |
| 5,178,477 A | 1/1993 | Gambaro |
| 5,181,181 A | 1/1993 | Glynn |
| 5,192,082 A | 3/1993 | Inoue et al. |
| 5,202,844 A | 4/1993 | Kamio et al. |
| 5,207,426 A | 5/1993 | Inoue et al. |
| D338,242 S | 8/1993 | Cordell |
| D340,042 S | 10/1993 | Copper et al. |
| 5,259,626 A | 11/1993 | Ho |
| 5,262,777 A | 11/1993 | Low et al. |
| D342,256 S | 12/1993 | Payne |
| 5,280,744 A | 1/1994 | DeCarlo et al. |
| D345,164 S | 3/1994 | Grae |
| 5,296,871 A | 3/1994 | Paley |
| 5,307,325 A | 4/1994 | Scheiber |
| 5,317,394 A | 5/1994 | Hale et al. |
| 5,329,276 A | 7/1994 | Hirabayashi |
| 5,332,322 A | 7/1994 | Gambaro |
| 5,339,095 A | 8/1994 | Redford |
| D350,736 S | 9/1994 | Takahashi et al. |
| D350,782 S | 9/1994 | Barr |
| D351,430 S | 10/1994 | Barr |
| 5,357,267 A | 10/1994 | Inoue |
| 5,359,321 A | 10/1994 | Ribic |
| 5,359,348 A | 10/1994 | Pilcher et al. |
| 5,363,120 A | 11/1994 | Drumm |
| 5,369,580 A | 11/1994 | Monji et al. |
| 5,369,889 A | 12/1994 | Callaghan |
| 5,373,857 A | 12/1994 | Travers et al. |
| 5,396,265 A | 3/1995 | Ulrich et al. |
| 5,421,590 A | 6/1995 | Robbins |
| 5,430,435 A | 7/1995 | Hoch et al. |
| D360,903 S | 8/1995 | Barr et al. |
| 5,440,326 A | 8/1995 | Quinn |
| 5,453,758 A | 9/1995 | Sato |
| D362,870 S | 10/1995 | Oikawa |
| 5,459,489 A | 10/1995 | Redford |
| 5,469,194 A | 11/1995 | Clark et al. |
| 5,481,957 A | 1/1996 | Paley et al. |
| 5,484,355 A | 1/1996 | King, II et al. |
| 5,485,171 A | 1/1996 | Copper et al. |
| 5,490,058 A | 2/1996 | Yamasaki et al. |
| 5,502,486 A | 3/1996 | Ueda et al. |
| 5,506,605 A | 4/1996 | Paley |
| 5,512,892 A | 4/1996 | Corballis et al. |
| 5,517,183 A | 5/1996 | Bozeman, Jr. |
| 5,523,800 A | 6/1996 | Dudek |
| 5,526,022 A | 6/1996 | Donahue et al. |
| 5,528,265 A | 6/1996 | Harrison |
| 5,541,860 A | 7/1996 | Takei et al. |
| 5,551,701 A | 9/1996 | Bouton et al. |
| 5,554,033 A | 9/1996 | Bizzi |
| 5,554,980 A | 9/1996 | Hashimoto et al. |
| 5,561,543 A | 10/1996 | Ogawa |
| 5,563,628 A | 10/1996 | Stroop |
| D375,326 S | 11/1996 | Yokoi et al. |
| 5,573,011 A | 11/1996 | Felsing |
| 5,574,479 A | 11/1996 | Odell |
| 5,579,025 A | 11/1996 | Itoh |
| D376,826 S | 12/1996 | Ashida |
| 5,587,558 A | 12/1996 | Matsushima |
| 5,594,465 A | 1/1997 | Poulachon |
| 5,598,187 A | 1/1997 | Ide et al. |
| 5,602,569 A | 2/1997 | Kato |
| 5,603,658 A | 2/1997 | Cohen |
| 5,605,505 A | 2/1997 | Han |
| 5,606,343 A | 2/1997 | Tsuboyama et al. |
| 5,611,731 A | 3/1997 | Bouton et al. |
| 5,615,132 A | 3/1997 | Horton et al. |
| 5,621,459 A | 4/1997 | Ueda et al. |
| 5,624,117 A | 4/1997 | Ohkubo et al. |
| 5,627,565 A | 5/1997 | Morishita et al. |
| D379,832 S | 6/1997 | Ashida |
| 5,640,152 A | 6/1997 | Copper |
| 5,643,087 A | 7/1997 | Marcus et al. |
| 5,645,077 A | 7/1997 | Foxlin et al. |
| 5,645,277 A | 7/1997 | Cheng |
| 5,666,138 A | 9/1997 | Culver |
| 5,667,220 A | 9/1997 | Cheng |
| 5,670,845 A | 9/1997 | Grant et al. |
| 5,670,988 A | 9/1997 | Tickle |
| 5,676,673 A | 10/1997 | Ferre et al. |
| 5,679,004 A | 10/1997 | McGowan et al. |
| 5,682,181 A | 10/1997 | Nguyen et al. |
| 5,698,784 A | 12/1997 | Hotelling et al. |
| 5,701,131 A | 12/1997 | Kuga |
| 5,702,305 A | 12/1997 | Norman et al. |
| 5,702,323 A | 12/1997 | Poulton |
| 5,703,623 A | 12/1997 | Hall et al. |
| 5,724,106 A | 3/1998 | Autry et al. |

| | | | | | |
|---|---|---|---|---|---|
| 5,726,675 A | 3/1998 | Inoue | 6,037,882 A | 3/2000 | Levy |
| 5,734,371 A | 3/1998 | Kaplan | 6,044,297 A | 3/2000 | Sheldon et al. |
| 5,734,373 A | 3/1998 | Rosenberg et al. | 6,049,823 A | 4/2000 | Hwang |
| 5,734,807 A | 3/1998 | Sumi | 6,052,083 A | 4/2000 | Wilson |
| D393,884 S | 4/1998 | Hayami | 6,057,788 A | 5/2000 | Cummings |
| 5,736,970 A | 4/1998 | Bozeman, Jr. | 6,058,342 A | 5/2000 | Orbach et al. |
| 5,739,811 A | 4/1998 | Rosenberg et al. | 6,059,576 A | 5/2000 | Brann |
| 5,741,182 A | 4/1998 | Lipps et al. | 6,066,075 A | 5/2000 | Poulton |
| 5,742,331 A | 4/1998 | Uomori et al. | 6,069,594 A | 5/2000 | Barnes et al. |
| 5,745,226 A | 4/1998 | Gigioli, Jr. | 6,072,467 A | 6/2000 | Walker |
| D394,264 S | 5/1998 | Sakamoto et al. | 6,072,470 A | 6/2000 | Ishigaki |
| 5,746,602 A | 5/1998 | Kikinis | 6,075,575 A | 6/2000 | Schein et al. |
| 5,751,273 A | 5/1998 | Cohen | 6,081,819 A | 6/2000 | Ogino |
| 5,752,880 A | 5/1998 | Gabai et al. | 6,084,315 A | 7/2000 | Schmitt |
| 5,757,354 A | 5/1998 | Kawamura | 6,084,577 A | 7/2000 | Sato et al. |
| 5,757,360 A | 5/1998 | Nitta et al. | 6,087,950 A | 7/2000 | Capan |
| D395,464 S | 6/1998 | Shiibashi et al. | D429,718 S | 8/2000 | Rudolph |
| 5,764,224 A | 6/1998 | Lilja et al. | 6,110,039 A | 8/2000 | Oh |
| 5,769,719 A | 6/1998 | Hsu | 6,115,028 A | 9/2000 | Balakrishnan |
| 5,771,038 A | 6/1998 | Wang | 6,137,457 A | 10/2000 | Tokuhashi et al. |
| D396,468 S | 7/1998 | Schindler et al. | D433,381 S | 11/2000 | Talesfore |
| 5,785,317 A | 7/1998 | Sasaki | 6,146,278 A | 11/2000 | Kobayashi |
| D397,162 S | 8/1998 | Yokoi et al. | 6,148,100 A | 11/2000 | Anderson et al. |
| 5,794,081 A | 8/1998 | Itoh et al. | 6,155,926 A | 12/2000 | Miyamoto et al. |
| 5,796,354 A | 8/1998 | Cartabiano et al. | 6,160,405 A | 12/2000 | Needle et al. |
| 5,807,284 A | 9/1998 | Foxlin | 6,160,540 A | 12/2000 | Fishkin et al. |
| 5,819,206 A | 10/1998 | Horton | 6,162,191 A | 12/2000 | Foxlin |
| 5,820,462 A | 10/1998 | Yokoi et al. | 6,164,808 A | 12/2000 | Shibata et al. |
| 5,822,713 A | 10/1998 | Profeta | 6,176,837 B1 | 1/2001 | Foxlin |
| 5,825,350 A | 10/1998 | Case, Jr. et al. | 6,181,329 B1 | 1/2001 | Stork et al. |
| D400,885 S | 11/1998 | Goto | 6,183,365 B1 | 2/2001 | Tonomura et al. |
| 5,831,553 A | 11/1998 | Lenssen et al. | 6,184,863 B1 | 2/2001 | Silbert et al. |
| 5,835,077 A | 11/1998 | Dao | 6,191,774 B1 | 2/2001 | Schena et al. |
| 5,835,156 A | 11/1998 | Blonstein et al. | 6,198,295 B1 | 3/2001 | Hill |
| 5,841,409 A | 11/1998 | Ishibashi et al. | 6,198,470 B1 | 3/2001 | Agam et al. |
| D402,328 S | 12/1998 | Ashida | 6,198,471 B1 | 3/2001 | Cook |
| 5,847,854 A | 12/1998 | Benson, Jr. | 6,200,219 B1 | 3/2001 | Rudell et al. |
| 5,850,624 A | 12/1998 | Gard et al. | 6,200,253 B1 | 3/2001 | Nishiumi et al. |
| 5,854,622 A | 12/1998 | Brannon | 6,201,554 B1 | 3/2001 | Lands |
| D405,071 S | 2/1999 | Gambaro | 6,217,450 B1 | 4/2001 | Meredith |
| 5,867,146 A | 2/1999 | Kim et al. | 6,217,478 B1 | 4/2001 | Vohmann et al. |
| 5,874,941 A | 2/1999 | Yamada | D442,998 S | 5/2001 | Ashida |
| 5,875,257 A | 2/1999 | Marrin et al. | 6,225,987 B1 | 5/2001 | Matsuda |
| D407,071 S | 3/1999 | Keating | 6,226,534 B1 | 5/2001 | Aizawa |
| D407,761 S | 4/1999 | Barr | 6,238,291 B1 | 5/2001 | Fujimoto et al. |
| 5,897,437 A | 4/1999 | Nishiumi et al. | 6,239,806 B1 | 5/2001 | Nishiumi et al. |
| 5,898,421 A | 4/1999 | Quinn | 6,241,611 B1 | 6/2001 | Takeda et al. |
| 5,900,867 A | 5/1999 | Schindler et al. | 6,243,658 B1 | 6/2001 | Raby |
| 5,902,968 A | 5/1999 | Sato et al. | 6,244,987 B1 | 6/2001 | Oshuga et al. |
| D410,909 S | 6/1999 | Tickle | 6,245,014 B1 | 6/2001 | Brainard, II |
| 5,912,612 A | 6/1999 | DeVolpi | 6,264,558 B1 | 7/2001 | Nishiumi et al. |
| 5,913,727 A | 6/1999 | Ahdoot | 6,273,819 B1 | 8/2001 | Strauss et al. |
| 5,923,317 A | 7/1999 | Sayler et al. | 6,301,534 B1 | 10/2001 | McDermott, Jr. et al. |
| D412,940 S | 8/1999 | Kato et al. | 6,304,250 B1 | 10/2001 | Yang et al. |
| 5,947,868 A | 9/1999 | Dugan | 6,315,673 B1 | 11/2001 | Kopera et al. |
| 5,955,713 A | 9/1999 | Titus et al. | 6,323,614 B1 | 11/2001 | Palazzolo et al. |
| 5,955,988 A | 9/1999 | Blonstein et al. | 6,323,654 B1 | 11/2001 | Needle et al. |
| 5,956,035 A | 9/1999 | Scianmanella et al. | 6,325,718 B1 | 12/2001 | Nishiumi et al. |
| 5,967,898 A | 10/1999 | Takasaka et al. | 6,331,841 B1 | 12/2001 | Tokuhashi et al. |
| 5,973,757 A | 10/1999 | Aubuchon et al. | 6,331,856 B1 | 12/2001 | Van Hook et al. |
| 5,982,352 A | 11/1999 | Pryor | 6,337,954 B1 | 1/2002 | Soshi et al. |
| 5,984,785 A | 11/1999 | Takeda | 6,347,998 B1 | 2/2002 | Yoshitomi et al. |
| 5,986,644 A | 11/1999 | Herder et al. | 6,361,507 B1 | 3/2002 | Foxlin |
| 5,991,085 A | 11/1999 | Rallison et al. | D456,410 S | 4/2002 | Ashida |
| 5,999,168 A | 12/1999 | Rosenberg et al. | 6,369,794 B1 | 4/2002 | Sakurai et al. |
| 6,002,394 A | 12/1999 | Schein et al. | 6,375,572 B1 | 4/2002 | Masuyama et al. |
| D419,199 S | 1/2000 | Cordell et al. | 6,377,793 B1 | 4/2002 | Jenkins |
| D419,200 S | 1/2000 | Ashida | 6,377,906 B1 | 4/2002 | Rowe |
| 6,011,526 A | 1/2000 | Toyoshima et al. | D456,854 S | 5/2002 | Ashida |
| 6,013,007 A | 1/2000 | Root et al. | 6,383,079 B1 | 5/2002 | Takeda et al. |
| 6,016,144 A | 1/2000 | Blonstein et al. | 6,392,613 B1 | 5/2002 | Goto |
| 6,019,680 A | 2/2000 | Cheng | 6,394,904 B1 | 5/2002 | Stalker |
| 6,020,876 A | 2/2000 | Rosenberg et al. | D458,972 S | 6/2002 | Ashida |

| | | |
|---|---|---|
| 6,400,996 B1 | 6/2002 | Hoffberg et al. |
| 6,409,687 B1 | 6/2002 | Foxlin |
| D459,727 S | 7/2002 | Ashida |
| D460,787 S | 7/2002 | Nishikawa |
| 6,415,223 B1 | 7/2002 | Lin et al. |
| 6,421,056 B1 | 7/2002 | Nishiumi et al. |
| 6,424,333 B1 | 7/2002 | Tremblay |
| 6,426,719 B1 | 7/2002 | Nagareda et al. |
| 6,426,741 B1 | 7/2002 | Goldsmith et al. |
| D462,683 S | 9/2002 | Ashida |
| 6,452,494 B1 | 9/2002 | Harrison |
| 6,456,276 B1 | 9/2002 | Park |
| D464,950 S | 10/2002 | Fraquelli et al. |
| 6,466,198 B1 | 10/2002 | Feinstein |
| 6,466,831 B1 | 10/2002 | Shibata et al. |
| 6,473,070 B2 | 10/2002 | Mishra et al. |
| 6,473,713 B1 | 10/2002 | McCall et al. |
| 6,474,159 B1 | 11/2002 | Foxlin et al. |
| 6,484,080 B2 | 11/2002 | Breed |
| 6,492,981 B1 | 12/2002 | Stork et al. |
| 6,518,952 B1 | 2/2003 | Leiper |
| 6,538,675 B2 | 3/2003 | Aratani et al. |
| D473,942 S | 4/2003 | Motoki et al. |
| 6,540,611 B1 | 4/2003 | Nagata |
| 6,544,124 B2 | 4/2003 | Ireland et al. |
| 6,544,126 B2 | 4/2003 | Sawano et al. |
| 6,545,661 B1 * | 4/2003 | Goschy et al. ............... 345/158 |
| D474,763 S | 5/2003 | Tozaki et al. |
| 6,565,444 B2 | 5/2003 | Nagata et al. |
| 6,567,536 B2 | 5/2003 | McNitt et al. |
| 6,572,108 B1 | 6/2003 | Bristow |
| 6,577,350 B1 | 6/2003 | Proehl et al. |
| 6,582,380 B2 | 6/2003 | Kazlausky et al. |
| 6,590,536 B1 | 7/2003 | Walton |
| 6,591,677 B2 | 7/2003 | Rothuff |
| 6,597,342 B1 | 7/2003 | Haruta |
| 6,597,443 B2 | 7/2003 | Boman |
| 6,599,194 B1 | 7/2003 | Smith et al. |
| 6,609,977 B1 | 8/2003 | Shimizu et al. |
| 6,616,607 B2 | 9/2003 | Hashimoto et al. |
| 6,628,257 B1 | 9/2003 | Oka et al. |
| 6,636,826 B1 | 10/2003 | Abe et al. |
| 6,650,029 B1 | 11/2003 | Johnston |
| 6,650,313 B2 | 11/2003 | Levine et al. |
| 6,650,345 B1 | 11/2003 | Saito et al. |
| 6,654,001 B1 | 11/2003 | Su |
| 6,672,962 B1 | 1/2004 | Ozaki et al. |
| 6,676,520 B2 | 1/2004 | Nishiumi |
| 6,677,990 B1 | 1/2004 | Kawahara |
| 6,681,629 B2 | 1/2004 | Foxlin et al. |
| D486,145 S | 2/2004 | Kaminski et al. |
| 6,686,954 B1 | 2/2004 | Kitaguchi et al. |
| 6,692,170 B2 | 2/2004 | Abir |
| 6,693,622 B1 | 2/2004 | Shahoian et al. |
| 6,712,692 B2 | 3/2004 | Basson et al. |
| 6,717,573 B1 | 4/2004 | Shahoian et al. |
| 6,718,280 B2 | 4/2004 | Hermann |
| 6,725,173 B2 | 4/2004 | An et al. |
| D489,361 S | 5/2004 | Mori et al. |
| 6,736,009 B1 | 5/2004 | Schwabe |
| D491,924 S | 6/2004 | Kaminski et al. |
| D492,285 S | 6/2004 | Ombao et al. |
| 6,743,104 B1 | 6/2004 | Ota et al. |
| 6,747,632 B2 | 6/2004 | Howard |
| 6,747,690 B2 | 6/2004 | Mølgaard |
| 6,752,719 B2 | 6/2004 | Himoto et al. |
| 6,753,849 B1 | 6/2004 | Curran et al. |
| 6,753,888 B2 | 6/2004 | Kamiwada et al. |
| 6,757,068 B2 | 6/2004 | Foxlin |
| 6,757,446 B1 | 6/2004 | Li et al. |
| 6,765,553 B1 | 7/2004 | Odamura |
| D495,336 S | 8/2004 | Andre et al. |
| 6,786,877 B2 | 9/2004 | Foxlin |
| 6,796,177 B2 | 9/2004 | Mori |
| 6,811,489 B1 | 11/2004 | Shimizu et al. |
| 6,811,491 B1 | 11/2004 | Levenberg et al. |
| 6,813,525 B2 | 11/2004 | Reid et al. |
| 6,813,584 B2 | 11/2004 | Zhou et al. |
| 6,816,151 B2 | 11/2004 | Dellinger |
| 6,821,204 B2 | 11/2004 | Aonuma et al. |
| 6,836,705 B2 | 12/2004 | Hellmann et al. |
| 6,836,751 B2 | 12/2004 | Paxton et al. |
| 6,836,971 B1 | 1/2005 | Wan |
| 6,842,991 B2 | 1/2005 | Levi et al. |
| 6,850,221 B1 * | 2/2005 | Tickle ........................ 345/158 |
| 6,850,844 B1 | 2/2005 | Walters et al. |
| 6,856,327 B2 | 2/2005 | Choi |
| D502,468 S | 3/2005 | Knight et al. |
| 6,868,738 B2 | 3/2005 | Moscrip et al. |
| 6,872,139 B2 | 3/2005 | Sato et al. |
| 6,873,406 B1 | 3/2005 | Hines et al. |
| D503,750 S | 4/2005 | Kit et al. |
| D504,677 S | 5/2005 | Kaminski et al. |
| D505,424 S | 5/2005 | Ashida et al. |
| 6,897,845 B2 | 5/2005 | Ozawa |
| 6,897,854 B2 | 5/2005 | Keely et al. |
| 6,908,386 B2 | 6/2005 | Suzuki et al. |
| 6,908,388 B2 | 6/2005 | Shimizu et al. |
| 6,922,632 B2 | 7/2005 | Foxlin |
| 6,925,410 B2 | 8/2005 | Narayanan |
| 6,929,543 B1 | 8/2005 | Ueshima et al. |
| 6,929,548 B2 | 8/2005 | Wang |
| 6,933,861 B2 | 8/2005 | Wang |
| 6,933,923 B2 | 8/2005 | Feinstein |
| 6,954,980 B2 | 10/2005 | Song |
| 6,955,606 B2 | 10/2005 | Taho et al. |
| 6,956,564 B1 | 10/2005 | Williams |
| 6,982,697 B2 | 1/2006 | Wilson et al. |
| 6,984,208 B2 | 1/2006 | Zheng |
| 6,990,639 B2 | 1/2006 | Wilson |
| 6,993,451 B2 | 1/2006 | Chang et al. |
| 6,995,748 B2 | 2/2006 | Gordon et al. |
| 6,998,966 B2 | 2/2006 | Pederson et al. |
| 7,000,469 B2 | 2/2006 | Foxlin et al. |
| 7,002,591 B1 | 2/2006 | Leather et al. |
| 7,031,875 B2 | 4/2006 | Ellenby et al. |
| D524,298 S | 7/2006 | Hedderich et al. |
| 7,081,051 B2 | 7/2006 | Himoto et al. |
| 7,090,582 B2 | 8/2006 | Danieli et al. |
| 7,094,147 B2 | 8/2006 | Nakata et al. |
| 7,098,891 B1 | 8/2006 | Pryor |
| 7,098,894 B2 | 8/2006 | Yang et al. |
| 7,102,616 B1 | 9/2006 | Sleator |
| 7,107,168 B2 | 9/2006 | Oystol et al. |
| D531,228 S | 10/2006 | Ashida et al. |
| 7,126,584 B1 | 10/2006 | Nishiumi et al. |
| 7,127,370 B2 | 10/2006 | Kelly et al. |
| D531,585 S | 11/2006 | Weitgasser et al. |
| D532,829 S | 11/2006 | Kawanobe et al. |
| 7,149,627 B2 | 12/2006 | Ockerse et al. |
| 7,154,475 B2 | 12/2006 | Crew |
| 7,155,604 B2 | 12/2006 | Kawai |
| 7,173,604 B2 | 2/2007 | Marvit et al. |
| 7,176,919 B2 | 2/2007 | Drebin et al. |
| 7,182,691 B1 | 2/2007 | Schena |
| 7,183,480 B2 | 2/2007 | Nishitani et al. |
| 7,184,059 B1 | 2/2007 | Fouladi et al. |
| D543,246 S | 5/2007 | Ashida et al. |
| 7,220,220 B2 | 5/2007 | Stubbs et al. |
| 7,231,063 B2 | 6/2007 | Naimark et al. |
| 7,233,316 B2 | 6/2007 | Smith et al. |
| 7,236,156 B2 | 6/2007 | Liberty et al. |
| 7,239,301 B2 | 7/2007 | Liberty et al. |
| 7,301,527 B2 | 11/2007 | Marvit |
| 7,301,648 B2 | 11/2007 | Foxlin |
| D556,760 S | 12/2007 | Ashida et al. |

| | | | | | | |
|---|---|---|---|---|---|---|
| D559,847 S | 1/2008 | Ashida et al. | | 2005/0212764 A1 | 9/2005 | Toba |
| D561,178 S | 2/2008 | Azuma | | 2005/0212767 A1 | 9/2005 | Marvit et al. |
| 7,335,134 B1 | 2/2008 | LaVelle | | 2005/0215295 A1 | 9/2005 | Arneson |
| D563,948 S | 3/2008 | D'Hoore | | 2005/0215322 A1 | 9/2005 | Himoto et al. |
| D567,243 S | 4/2008 | Ashida et al. | | 2005/0217525 A1 | 10/2005 | McClure |
| RE40,324 E | 5/2008 | Crawford | | 2005/0233808 A1 | 10/2005 | Himoto et al. |
| 7,379,566 B2 | 5/2008 | Hildreth | | 2005/0243061 A1 | 11/2005 | Liberty et al. |
| 7,395,181 B2 | 7/2008 | Foxlin | | 2005/0243062 A1 | 11/2005 | Liberty |
| 7,445,550 B2 | 11/2008 | Barney et al. | | 2005/0253806 A1 | 11/2005 | Liberty et al. |
| 7,568,289 B2 | 8/2009 | Burlingham et al. | | 2005/0256675 A1 | 11/2005 | Kurata |
| 2001/0010514 A1 | 8/2001 | Ishino | | 2006/0028446 A1 | 2/2006 | Liberty et al. |
| 2001/0024973 A1 | 9/2001 | Meredith | | 2006/0092133 A1 | 5/2006 | Touma et al. |
| 2001/0031662 A1 | 10/2001 | Larian | | 2006/0148563 A1 | 7/2006 | Yang |
| 2002/0024500 A1 | 2/2002 | Howard | | 2006/0152487 A1 | 7/2006 | Grunnet-Jepsen et al. |
| 2002/0028071 A1 | 3/2002 | Mølgaard | | 2006/0152488 A1 | 7/2006 | Salsman et al. |
| 2002/0072418 A1 | 6/2002 | Masuyama et al. | | 2006/0152489 A1 | 7/2006 | Sweetser et al. |
| 2002/0075335 A1 | 6/2002 | Rekimoto | | 2006/0178212 A1 | 8/2006 | Penzias |
| 2002/0098887 A1 | 7/2002 | Himoto et al. | | 2006/0256081 A1 | 11/2006 | Zalewski et al. |
| 2002/0103026 A1 | 8/2002 | Himoto et al. | | 2006/0258452 A1 | 11/2006 | Hsu |
| 2002/0107069 A1 | 8/2002 | Ishino | | 2006/0264260 A1 | 11/2006 | Zalewski et al. |
| 2002/0140745 A1 | 10/2002 | Ellenby et al. | | 2006/0282873 A1 | 12/2006 | Zalewski et al. |
| 2002/0158843 A1 | 10/2002 | Levine et al. | | 2006/0287086 A1 | 12/2006 | Zalewski et al. |
| 2003/0038778 A1 | 2/2003 | Noguera et al. | | 2006/0287087 A1 | 12/2006 | Zalewski et al. |
| 2003/0052860 A1 | 3/2003 | Park et al. | | 2007/0021208 A1 | 1/2007 | Mao et al. |
| 2003/0063068 A1 | 4/2003 | Anton et al. | | 2007/0049374 A1 | 3/2007 | Ikeda et al. |
| 2003/0069077 A1 | 4/2003 | Korienek | | 2007/0050597 A1 | 3/2007 | Ikeda |
| 2003/0107551 A1 | 6/2003 | Dunker | | 2007/0052177 A1 | 3/2007 | Ikeda et al. |
| 2003/0144056 A1 | 7/2003 | Liefer et al. | | 2007/0060391 A1 | 3/2007 | Ikeda et al. |
| 2003/0193572 A1 | 10/2003 | Wilson et al. | | 2007/0066394 A1 | 3/2007 | Ikeda et al. |
| 2003/0204361 A1 | 10/2003 | Townsend et al. | | 2007/0072680 A1 | 3/2007 | Ikeda et al. |
| 2003/0216176 A1 | 11/2003 | Shimizu et al. | | 2007/0252815 A1 | 11/2007 | Kuo et al. |
| 2003/0222851 A1 | 12/2003 | Lai et al. | | 2007/0265075 A1 | 11/2007 | Zalewski |
| 2004/0028258 A1 | 2/2004 | Naimark et al. | | 2007/0265076 A1 | 11/2007 | Lin et al. |
| 2004/0048666 A1 | 3/2004 | Bagley | | 2008/0015017 A1 | 1/2008 | Ashida et al. |
| 2004/0070564 A1 | 4/2004 | Dawson | | 2008/0039202 A1 | 2/2008 | Sawano et al. |
| 2004/0075650 A1 | 4/2004 | Paul et al. | | 2008/0273011 A1 | 11/2008 | Lin |
| 2004/0095317 A1 | 5/2004 | Zhang et al. | | 2008/0278445 A1 | 11/2008 | Sweetser et al. |
| 2004/0134341 A1 | 7/2004 | Sandoz et al. | | 2009/0005166 A1 | 1/2009 | Sato |
| 2004/0140954 A1 | 7/2004 | Faeth | | | | |
| 2004/0143413 A1 | 7/2004 | Oystol et al. | | FOREIGN PATENT DOCUMENTS | | |
| 2004/0152515 A1 | 8/2004 | Wegmuller et al. | | | | |
| 2004/0193413 A1 | 9/2004 | Wilson et al. | | DE | 19701344 | 7/1997 |
| 2004/0203638 A1 | 10/2004 | Chan | | DE | 19701374 | 7/1997 |
| 2004/0204240 A1 | 10/2004 | Barney | | DE | 19648487 | 6/1998 |
| 2004/0218104 A1 | 11/2004 | Smith et al. | | DE | 19814254 | 10/1998 |
| 2004/0222969 A1 | 11/2004 | Buchenrieder | | DE | 19937307 | 2/2000 |
| 2004/0227725 A1 | 11/2004 | Calarco et al. | | DE | 10029173 | 1/2002 |
| 2004/0229693 A1 | 11/2004 | Lind et al. | | DE | 10241392 | 5/2003 |
| 2004/0239626 A1 | 12/2004 | Noguera | | DE | 10219198 | 11/2003 |
| 2004/0259651 A1 | 12/2004 | Storek | | EP | 0 835 676 | 4/1998 |
| 2004/0268393 A1 | 12/2004 | Hunleth et al. | | EP | 0852961 | 7/1998 |
| 2005/0017454 A1 | 1/2005 | Endo et al. | | EP | 1062994 | 12/2000 |
| 2005/0020369 A1 | 1/2005 | Davis et al. | | EP | 1279425 | 1/2003 |
| 2005/0047621 A1 | 3/2005 | Cranfill | | EP | 1293237 | 3/2003 |
| 2005/0054457 A1 | 3/2005 | Eyestone et al. | | GB | 1524334 | 9/1978 |
| 2005/0076161 A1 | 4/2005 | Albanna et al. | | GB | 2 244 546 | 5/1990 |
| 2005/0125826 A1 | 6/2005 | Hunleth et al. | | GB | 2284478 | 6/1995 |
| 2005/0172734 A1 | 8/2005 | Alsio | | GB | 2307133 | 5/1997 |
| 2005/0174324 A1 | 8/2005 | Liberty et al. | | GB | 2316482 | 2/1998 |
| 2005/0179644 A1 | 8/2005 | Alsio | | GB | 2319374 | 5/1998 |
| 2005/0210419 A1 | 9/2005 | Kela | | JP | 60-077231 | 5/1985 |
| 2005/0212749 A1 | 9/2005 | Marvit | | JP | 62-143124 | 6/1987 |
| 2005/0212750 A1 | 9/2005 | Marvit | | JP | 3-74434 | 7/1991 |
| 2005/0212751 A1 | 9/2005 | Marvit | | JP | 3-059619 | 11/1991 |
| 2005/0212752 A1 | 9/2005 | Marvit | | JP | 2901476 | 12/1993 |
| 2005/0212753 A1 | 9/2005 | Marvit | | JP | 6-50758 | 2/1994 |
| 2005/0212754 A1 | 9/2005 | Marvit | | JP | 3262677 | 5/1994 |
| 2005/0212755 A1 | 9/2005 | Marvit | | JP | 6-154422 | 6/1994 |
| 2005/0212756 A1 | 9/2005 | Marvit | | JP | 3000028 | 7/1994 |
| 2005/0212757 A1 | 9/2005 | Marvit | | JP | 3194841 | 10/1994 |
| 2005/0212758 A1 | 9/2005 | Marvit | | JP | 06-308879 | 11/1994 |
| 2005/0212759 A1 | 9/2005 | Marvit | | JP | 6-308879 | 11/1994 |
| 2005/0212760 A1 | 9/2005 | Marvit | | JP | 3273531 | 11/1994 |

| | | |
|---|---|---|
| JP | 7-028591 | 1/1995 |
| JP | 3228845 | 1/1995 |
| JP | 7044315 | 2/1995 |
| JP | 07-107573 | 4/1995 |
| JP | 7-22312 | 5/1995 |
| JP | 07-115690 | 5/1995 |
| JP | 7-146123 | 6/1995 |
| JP | 3517482 | 6/1995 |
| JP | 7-200142 | 8/1995 |
| JP | 7-302148 | 11/1995 |
| JP | 7-318332 | 12/1995 |
| JP | 8-095704 | 4/1996 |
| JP | 8-106352 | 4/1996 |
| JP | 8-114415 | 5/1996 |
| JP | 8-122070 | 5/1996 |
| JP | 8-152959 | 6/1996 |
| JP | 8-211993 | 8/1996 |
| JP | 8-335136 | 12/1996 |
| JP | 9-230997 | 9/1997 |
| JP | 9-274534 | 10/1997 |
| JP | 9-319510 | 12/1997 |
| JP | 1033831 | 2/1998 |
| JP | 10-99542 | 4/1998 |
| JP | 10-154038 | 6/1998 |
| JP | 11-506857 | 6/1999 |
| JP | 2000-270237 | 9/2000 |
| JP | 2000-308756 | 11/2000 |
| JP | 2001-175412 | 6/2001 |
| JP | 2002-062981 | 2/2002 |
| JP | 2002-091692 | 3/2002 |
| JP | 2002-153673 * | 5/2002 |
| JP | 2002-233665 | 8/2002 |
| JP | 3422383 | 4/2003 |
| JP | 2004-062774 | 2/2004 |
| JP | 2004-313492 | 11/2004 |
| JP | 2005-040493 | 2/2005 |
| JP | 2005-063230 | 3/2005 |
| JP | 2006-113019 | 4/2006 |
| NL | 9300171 | 8/1994 |
| RU | 2125853 C1 | 2/1999 |
| RU | 2126161 C1 | 2/1999 |
| RU | 2141738 C1 | 11/1999 |
| WO | 96/05766 | 2/1996 |
| WO | WO 9712337 | 4/1997 |
| WO | 97/28864 | 8/1997 |
| WO | WO 9811528 | 3/1998 |
| WO | 00/33168 | 6/2000 |
| WO | WO 00/63874 | 10/2000 |
| WO | WO 0187426 | 11/2001 |
| WO | WO 0191042 A2 | 11/2001 |
| WO | 02/17054 | 2/2002 |
| WO | WO 03107260 A2 | 6/2003 |
| WO | WO 03088147 A1 | 10/2003 |
| WO | WO 2004039055 | 5/2004 |
| WO | 2004/051391 | 6/2004 |

OTHER PUBLICATIONS

Acar, et al., "Experimental evaluation and comparative analysis of commercial variable-capacitance MEMS accelerometers," *Journal of Micromechanics and Microengineering*, vol. 13 (1), pp. 634-645 (May 2003).

Agard, Agard. "Advances in Strapdown Inertial Systems," Lecture Series Advisory Group For Aerospace Research And Development Neuilly-Sur-Seine (France) (1984).

Albrecht, "An Adaptive Digital Filter to Predict Pilot Head Look Direction for Helmet-mounted Displays," MS Thesis University of Dayton (1989).

Algrain, "Estimation of 3-D Angular Motion Using Gyroscopes and Linear Accelerometers," IEEE Transactions on Aerospace and Electronic Systems, vol. 27, No. 6, pp. 910-920 (Nov. 1991).

Algrain, et al., "Accelerometer Based Line-of-Sight Stabilization Approach for Pointing and Tracking System," Second IEEE Conference on Control Applications, vol. 1 , Issue 13-16 pp. 159-163 (Sep. 1993).

Algrain, et al., "Interlaced Kalman Filtering of 3-D Angular Motion Based on Euler's Nonlinear Equations," IEEE Transactions on Aerospace and Electronic Systems, vol. 30, No. 1 (Jan. 1994).

Allen, et al., "A General Method for Comparing the Expected Performance of Tracking and Motion Capture Systems," {VRST} '05: Proceedings of the ACM symposium on Virtual reality software and technology, pp. 201-210 (Nov. 2005).

Allen, et al., "Tracking: Beyond 15 Minutes of Thought," SIGGRAPH 2001 Course 11 (Course Pack) from Computer Graphics (2001).

Alves, "Extended Kalman filtering applied to a full accelerometer strapdown inertial measurement unit," M.S. Thesis Massachusetts Institute of Technology. Dept. of Aeronautics and Astronautics, Santiago (1992).

Analog Devices "ADXL50 Single Axis Accelerometer" (Data Sheet), http://www.analog.com/en/obsolete/adxl50/products/product.html (Mar. 1996).

Analog Devices "ADXL202E Low-Cost ±2 g Dual-Axis Accelerometer with Duty Cycle Output" (Data Sheet), Rev. A (2000).

Analog Devices "ADXL330 Small, Low Power, 3-Axis ±2 g iMEMS Accelerometer" (Data Sheet), Rev. PrA (2005).

Analog Devices "ADXRS150 ±150°/s Single Chip Yaw Rate Gyro with Signal Conditioning" (Data Sheet), Rev. B (2004).

Analog Devices "ADXRS401 ±75°/s Single Chip Yaw Rate Gyro with Signal Conditioning" (Data Sheet), Rev. O (2004).

Ang, et al., "Design and Implementation of Active Error Canceling in Hand-held Microsurgical Instrument," Proceedings of the 2001 IEEE/RSJ International Conference on Intelligent Robots and Systems, vol. 2, (Oct. 2001).

Ang, et al., "Design of All-Accelerometer Inertial Measurement Unit for Tremor Sensing in Hand-held Microsurgical Instrument," Proceedings of the 2003 IEEE International Conference on Robotics & Automation (Sep. 2003).

Apostolyuk, Vladislav, "Theory and design of micromechanical vibratory gyroscopes," MEMS/NEMS Handbook, Springer, 2006, vol. 1, pp. 173-195 (2006).

Arcanatech, IMP (Photos) (1994).

Arcanatech, "IMP User's Guide" (1994).

Ascension Technology, The Bird 6D Input Devices (specification) (1998).

Ator, "Image-Velocity with Parallel-Slit Reticles," Journal of the Optical Society of America (Dec. 1963).

Azarbayejani, et al, "Real-Time 3-D Tracking of the Human Body," Proceedings of IMAGE'COM 96 (1996).

Azarbayejani, et al., "Visually Controlled Graphics," IEEE Transactions on Pattern Analysis and Machine Intelligence, vol. 15, No. 6, pp. 602-605 (Jun. 1993).

Azuma et al., "Improving Static and Dynamic Registration in an Optical See-Through HMD," International Conference on Computer Graphics and Interactive Techniques Proceedings of the 21st annual conference on Computer graphics and interactive techniques, pp. 197-204 (1994).

Azuma et al., "Making Augmented Reality Work Outdoors Requires Hybrid Tracking,"Proceedings of the International Workshop on Augmented Reality, San Francisco, CA, Nov. 1, 1998, Bellevue, Washington, pp. 219-224 (1999).

Azuma, "Predictive Tracking for Augmented Reality," Ph.D. Dissertation, University of North Carolina at Chapel Hill (1995).

Azuma, et al., "A Frequency-Domain Analysis of Head-Motion Prediction," Proceedings of SIGGRAPH '94, pp. 401-408 (1995).

Azuma, et al., "A motion-stabilized outdoor augmented reality system," Proceedings of IEEE Virtual Reality '99, Houston, TX (Mar. 1999).

Bachmann et al., "Inertial and Magnetic Posture Tracking for Inserting Humans into Networked Virtual Environments," Virtual Reality Software and Technology archive, Proceedings of the ACM Symposium On Virtual Reality Software And Technology, Baniff, Alberta, Canada, pp. 9-16 (2001).

Bachmann et al., "Orientation Tracking for Humans and Robots Using Inertial Sensors" (CIRA '99), Naval Postgraduate School, Monterey, CA (1999).

Bachmann, "Inertial and Magnetic Angle Tracking of Limb Segments for Inserting Humans into Synthetic Environments," Dissertation, Naval Postgraduate School, Monterey, CA (Dec. 2000).

Baker et al., "Active Multimodal Control of a Floppy Telescope Structure," Proc. SPIE, vol. 4825, 74 (Mar. 2003).

Balakrishnan, "The Rockin' Mouse: Integral 3D Manipulation on a Plane," (CHI '97), Univ. Toronto, (1997).

Ballagas, et al., Jan, "iStuff: A Physical User Interface Toolkit For Ubiquitous Computer Environments," Proceedings of the SIGCHI Conference on Human Factors in Computing Systems, vol. 5, No. 1, at 537-44 (ACM) (Apr. 5-10, 2003).

Baraff, "An Introduction to Physically Based Modeling," SIGGRAPH 97 Course Notes (1997).

Baudisch, et al., "Soap: a pointing device that works in mid-air" Proc. UIST (2006).

BBN Report, "Virtual Environment Technology for Training (VETT)," The Virtual Environment and Teleoperator Research Consortium (VETREC) (Mar. 1992).

Behringer, "Improving Registration Precision Through Visual Horizon Silhouette Matching," Proceedings of the international workshop on Augmented reality : placing artificial objects in real scenes: placing artificial objects in real scenes, Bellevue, Washington, United States pp. 225-232 (1999).

Behringer, "Registration for Outdoor Augmented Reality Applications Using Computer Vision Techniques and Hybrid Sensors," Virtual Reality, 1999 Proceedings., IEEE Computer Society, pp. 244-261 (1999).

BEI, "BEI GyrochipTM Model QRS11 Data Sheet," BEI Systron Donner Inertial Division, BEI Technologies, Inc., (Sep. 1998).

BEI Systron Donner Inertial Division, Gyrochip Theory of Operation (2001).

Benbasat, "An Inertial Measurement Unit for User Interfaces," Massachusetts Institute of Technology Dissertation, (Sep. 2000).

Benbasat, et al., "An Inertial Measurement Framework for Gesture Recognition and Applications," Gesture and Sign Language in Human-Computer Interaction, International Gesture Workshop, GW 2001, London, UK, 2001 Proceedings, LNAI 2298, at 9-20, I. Wachsmuth and T. Sowa (eds.), Springer-Verlag Berlin Heibelberg (2001, 2002).

Beuter, A., Publications, University of Quebec at Montreal, http://www.er.uqam.ca/nobel/r11040/publicat.htm (Aug. 2007).

BGM-109 Tomahawk, http://en.wikipedia.org/wiki/BGM-109_Tomahawk, Wikipedia, Jan. 2009.

Bhatnagar, "Position trackers for Head Mounted Display systems: A survey" (Technical Report), University of North Carolina at Chapel Hill (Mar. 1993).

Bianchi, "A Tailless Mouse, New cordless Computer Mouse Invented by ArcanaTech." Inc. Article (Jun. 1992).

Bishop, "The Self-Tracker: A Smart Optical Sensor on Silicon," Ph.D. Dissertation, Univ. of North Carolina at Chapel Hill (1984).

Bishop, et al., "Grids Progress Meeting" (Slides), University of North Carolina at Chapel Hill, NC (1998).

Bishop, et al., Self-Tracker: Tracking for Hybrid Environments without Infrastructure (1996).

Bona, et al., "Optimum Reset of Ship's Inertial Navigation System," IEEE Transactions on Aerospace and Electronic Systems (1965).

Borenstein, et al., "Where am I? Sensors and Methods for Mobile Robot Positioning" (1996).

Boser, "3-Axis Accelerometer with Differential Sense Electronics," http://www.eecs.berkeley.edu/~boser/pdf/3axis.pdf (1997).

Boser, "Accelerometer Design Example: Analog Devices XL-05/5," http://www.eecs.berkeley.edu/~boser/pdf/xl05.pdf (1996).

Bowman et al., *3D User Interfaces: Theory and Practice*, Addison-Wesley, Inc., (2005).

Bowman,. et al., "An Introduction to 3-D User Interface Design," MIT Presence, vol. 10, No. 1, pp. 96-108 (2001).

Britton et al., "Making Nested rotations Convenient for the User," ACM SIGGRAPH Computer Graphics, vol. 12, Issue 3, pp. 222-227 (Aug. 1978).

Britton, "A Methodology for the Ergonomic Design of Interactive Computer Graphic Systems, and its Application to Crystallography" (UNC Thesis) (1977).

Business Wire, "Feature/Virtual reality glasses that interface to Sega channel," Time Warner, TCI: project announced concourrent with COMDEX (Nov. 1994).

Business Wire, "Free-space 'Tilt' Game Controller for Sony Playstation Uses Scenix Chip; SX Series IC Processes Spatial Data In Real Time For On-Screen" (Dec. 1999).

Business Wire, "InterSense Inc. Launches InertiaCube2—The World's Smallest Precision Orientation Sensor With Serial Interface" (Aug. 14, 2001).

Business Wire, "Logitech MAGELLAN 3D Controller," Logitech (Apr. 1997).

Business Wire, "Mind Path Introduces GYROPOINT RF Wireless Remote" (Jan. 2000).

Business Wire, "Pegasus' Wireless PenCell Writes On Thin Air with ART's Handwriting Recognition Solutions," Business Editors/High Tech Writers Telecom Israel 2000 Hall 29, Booth 19-20 (Nov. 2000).

Business Wire, "RPI ships low-cost pro HMD Plus 3D Mouse and VR PC graphics card system for CES" (Jan. 1995).

Buxton, Bill, "Human input/output devices," In M. Katz (ed.), Technology Forecast: 1995, Menlo Park, C.A.: Price Waterhouse World Firm Technology Center, 49-65 (1994).

Buxton, Bill, A Directory of Sources for Input Technologies, http://www.billbuxton.com/InputSources,html, Apr. 2001 (last update 2008).

Byte, "Imp Coexists With Your Mouse," What's New, ArcanaTec (Jan. 1994).

Canaday, R67-26 "The Lincoln Wand," IEEE Transactions on Electronic Computers, vol. EC-16, No. 2, p. 240 (Apr. 1967).

Caruso et al., "New Perspective on Magnetic Field Sensing," Sensors Magazine (Dec. 1998).

Caruso et al., "Vehicle Detection and Compass Applications using AMR Magnetic Sensors," Honeywell (May 1999).

Caruso, "Application of Magnetoresistive Sensors in Navigation Systems," Sensors and Actuators, SAE SP-1220, pp. 15-21 (Feb. 1997).

Caruso, "Applications of Magnetic Sensors for Low Cost Compass Systems," Honeywell, SSEC, http://www.ssec.honeywell.com/magnetic/datasheets/lowcost.pdf (May 1999).

Chatfield, "Fundamentals of High Accuracy Inertial Navigation," vol. 174 Progress in Astronautics and Aeronautics, American Institute of Aeronautics and Astronautics, Inc. (1997).

Cheng, "Direct interaction with large-scale display systems using infrared laser tracking devices," ACM International Conference Proceeding Series; vol. 142 (2003).

Cho, et al., "*Magic Wand*: A Hand-Drawn Gesture Input Device in 3-D Space with Inertial Sensors," Proceedings of the 9th Intl Workshop on Frontiers in Handwriting Recognition (IWFHR-9 2004), IEEE (2004).

Computergram, "RPI Entertainment Pods Improve Virtual Experience" (1995).

Cookbook, Numerical Recipes Electronic Edition, http://www.library.cornell.edu/nr/cbookcpdf.html.

Cooke, et al., "NPSNET: flight simulation dynamic modeling using quaternions," Presence, vol. 1, No. 4,pp. 404-420, MIT Press (1992/1994).

CSIDC Winners—Tablet-PC Classroom System Wins Design Competition, IEEE Computer Society Press, vol. 36 , Issue 8, pp. 15-18 , IEEE Computer Society (Aug. 2003).

Cutrone, "Hot products: Gyration GyroPoint Desk, GyroPoint Pro gyroscope-controlled wired and wireless mice" (Computer Reseller News) (Dec. 1995).

Cutts, "A Hybrid Image/Inertial System for Wide-Area Tracking" (Internal to UNC-CH Computer Science) (Jun. 1999 ).

Deruyck, et al., "An Electromagnetic Position Sensor," Polhemus Navigation Sciences, Inc., Burlington, VT (Nov. 1973.).

Donelson, et al., "Spatial Management of Information" (1978 ).

Eiβele, "Orientation as an additional User Interface in Mixed-Reality Environments," 1. workshop Ervwiterte and Virtuelle Realität, pp. 79-90. GI-Fachgruppe AR/VR (2007).

Enura, et al., "Sensor Fusion Based Measurement of Human Head Motion," 3rd IEEE International Workshop on Robot and Human Communication (Jul. 1994).

Ferrin, "Survey of Helmet Tracking Technologies," Proc. SPIE vol. 1456, p. 86-94 (Apr. 1991).

Foxlin et al., "An Inertial Head-Orientation Tracker with Automatic Drift Compensation for Use with HMD's," Proceedings of the conference on Virtual reality software and technology, Singapore, Singapore, pp. 159-173 (1994).

Foxlin et al., "Miniature 6-DOF Inertial System for Tracking HMDs," SPIE vol. 3362 (Apr. 1998).

Foxlin et al., "Miniaturization, Calibration & Accuracy Evaluation of a Hybrid Self-Tracker," The Second IEEE and ACM International Symposium on Mixed and Augmented Reality, pp. 151-160 (2003).

Foxlin et al., "WearTrack: A Self-Referenced Head and Hand Tracker for Wearable Computers and Portable VR," International Symposium on Wearable Computers (ISWC 2000), Oct. 16-18, 2000, Atlanta, GA (2000).

Foxlin, "FlightTracker: A Novel Optical/Inertial Tracker for Cockpit Enhanced Vision, Symposium on Mixed and Augmented Reality," Proceedings of the 3rd IEEE/ACM International Symposium on Mixed and Augmented Reality, pp. 212-221 (Nov. 2004).

Foxlin, "Generalized architecture for simultaneous localization, auto-calibration, and map-building," IEEE/RSJ Conf. on Intelligent Robots and Systems, Lausanne, Switzerland (Oct. 2002).

Foxlin, "Head-tracking Relative to a Moving Vehicle or Simulator Platform Using Differential Inertial Sensors," InterSense, Inc., Presented: Helmet and Head-Mounted Displays V, SPIE vol. 4021, AeroSense Symposium, Orlando, FL, Apr. 24-25, 2000.

Foxlin, "Inertial Head Tracker Sensor Fusion by a Complementary Separate-bias Kalman Filter," Proceedings of the IEEE 1996 Virtual Reality Annual International Symposium, pp. 185-194, 267 (1996).

Foxlin, "Inertial Head-Tracking," MS Thesis, Massachusetts Institute of Technology, Dept. of Electrical Engineering and Computer Science (Sep. 1993).

Foxlin, "Motion Tracking Requirements and Technologies," Chapter 7, from Handbook of Virtual Environment Technology, Stanney Kay, Ed. (2002).

Foxlin, "Pedestrian Tracking with Shoe-Mounted Inertial Sensors," IEEE Computer Graphics and Applications, vol. 25, No. 6, pp. 38-46 (Nov. 2005).

Foxlin, et al., "Constellation: A Wide-Range Wireless Motion-Tracking System for Augmented Reality and Virtual Set Applications," ACM SIGGRAPH, pp. 372-378 (1998).

Foxlin, et al., "VIS-Tracker: A Wearable Vision-Inertial Self-Tracker," IEEE Computer Society (2003).

Freiburg Center for Data Analysis and Modeling—Publications, http://www.fdm.uni-freiburg.de/cms/puplications/publications/ (Aug. 2007).

Friedmann, et al., "Device Synchronization Using an Optimal Linear Filter," SI3D '92: Proceedings of the 1992 symposium on Interactive 3D graphics, pp. 57-62 (1992).

Friedmann, et al., "Synchronization in virtual realities," MIT Presence, vol. 1, No. 1, pp. 139-144 (1992).

Fröhlich, "The Yo Yo: An interaction device combining elastic and isotonic control," at http://www.uni-weimar.de/cms/medien/vr/research/hci/3d-handheld-interaction/the-yoyo-a-handheld-device-combining-elastic-and-isotonic-input.html (2003).

Green, et al., "ADI's iMEMS Angular Rate Sensing Gyroscope," Analog Dialogue (Jan. 2003).

Grimm et al., "Real-Time Hybrid Pose Estimation from Vision and Inertial Data," Proceedings, First Canadian Conference on Computer and Robot Vision, pp. 480-486 (2004).

Gyration Inc., "The Magic Inside GyroPoint".

Gyration, "Gyration GP110 Ultra Cordless Optical Mouse Data Sheet," http://www.gyration.com/descriptions/document/GP110-SPEC-EN.pdf (2002).

Gyration, "Gyration GP110 Ultra Cordless Optical Mouse User Manual," http://www.gyration.com/descriptions/document/GP110-MANUAL-EN.pdf (2002).

Gyration, "Gyration Ultra Cordless Optical Mouse," photos (2002).

Gyration, "Gyration MicroGyro 100 Developer Kit Data Sheet," http://web.archive.org/web/19980708122611/www.gyration.com/html/devkit.html (Jul. 1998).

Hamilton Institute, http://www.dcs.gla.ac.uk/.about.rod/, R. Murray-Smith (Aug. 2007).

Harada, et al., "Portable Absolute Orientation Estimation Device with Wireless Network under Accelerated Situation" Proceedings, 2004 IEEE International Conference on Robotics and Automation, vol. 2, Issue , Apr. 26-May 1, 2004 pp. 1412-1417 vol. 2 (Apr. 2004).

Harada, et al., "Portable orientation estimation device based on accelerometers, magnetometers and gyroscope sensors for sensor network," Proceedings of IEEE International Conference on Multisensor Fusion and Integration for Intelligent Systems, MFI2003, pp. 191-196 (Jul. 2003).

Haykin, et al., "Adaptive Tracking of Linear Time-Variant Systems by Extended RLS Algorithms, IEEE Transactions on Signal Processing," vol. 45, No. 5 (May 1997).

Heath, "Virtual Reality Resource Guide AI Expert," v9 n5 p. 32(14) (May 1994).

Hinckley et al., "The VideoMouse: A Camera-Based Multi-Degree-of-Freedom Input Device" A59, ACM UIST'99 Symposium on User Interface Software & Technology, CHI Letters 1 (1), pp. 103-112, (Jan. 1999).

Hinckley, "Synchronous Gestures for Multiple Persons and Computers", CHI Letters vol. 5 No. 2 (ACM 2003) & Proceedings of the 16th Annual ACM UIST 2003 Symposium on User Interface Software & Technology, at 149-58 (UIST '03 Vancouver BC Canada) (ACM) (Nov. 2003).

Hinckley, et al., "Sensing Techniques for Mobile Interaction," Proceedings of the 13th Annual ACM Symposium on User Interface Software and Technology (San Diego, Cal.), ACM UIST 2000 & Technology, CHI Letters 2 (2), at 91-100 (ACM) (2000).

Hinckley, et al. , "A Survey of Design Issues in Spatial Input," Proceedings of the ACM Symposium on User Interface Software and Technology (1994).

Hogue, "MARVIN: A Mobile Automatic Realtime Visual and INertial tracking system," Master's Thesis, York University (2003).

Hogue, et al., "An optical-inertial tracking system for fully-enclosed VR displays," Proceedings of the 1st Canadian Conference on Computer and Robot Vision, pp. 22-29 (May 2004 ).

Hollands, Robin, "Sourceless Trackers," VR News (Apr. 1995).

Holloway, Richard Lee, "Registration Errors in Augmented Reality Systems," Ph.D. Dissertation, University of North Carolina at Chapel Hill (1995).

Hudson Soft, "Brochure of Toukon Road Brave Warrior, Brave Spirits" (1998).

Inman, "Cheap sensors could capture your every move," http://technology.newscientist.com/article/dn12963-cheap-sensors-could-capture-your-every-move.html (Nov. 2007 ).

InterSense, "InterSense InertiaCube2 Devices," (Specification) (image) (2001).

InterSense, "InterSense InertiaCube2 Manual for Serial Port Model" (2001).

InterSense, "InterSense IS-1200 FlightTracker Prototype Demonstration" (Video) (Nov. 2004).

InterSense, "InterSense IS-1200 InertiaHawk Datasheet" (2009).

InterSense, "InterSense IS-1200 VisTracker Datasheet" (2007).

InterSense, "InterSense IS-1200 VisTracker Devices," (image) (2007).

InterSense, "InterSense IS-900 MicroTraxTM Datasheet" (2007).

InterSense, "InterSense IS-900 Systems Datasheet" (2007).

InterSense, "InterSense MicroTrax Demo Reel," http://www.youtube.com/watch?v=O2F4fu_CISo (2007).

InterSense, "InterSense Mobile Mixed Reality Demonstration" (Video), http://www.youtube.com/watch?v=daVdzGK0nUE&feature=channel_page (Oct. 2006).

InterSense, "InterSense Motion Gaming Tech Demo," http://www.youtube.com/watch?v=7-3y5tdju4E, InterSense (Mar. 2008).

InterSense, "IS-1200 VisTracker Augmented Maintenance Demonstration" (Video), http://www.intersense.com/IS-1200_Systems.aspx, http://www.youtube.com/watch?v=IMI78s91WQo&feature=channel_page (Jan. 2009).

InterSense, "IS-1200 VisTracker Industrial Cart Demonstration" (Video), InterSense http://www.intersense.com/IS-1200_Systems. aspx http://www.youtube.com/watch?v=7xKLCvDGMgY &feature=channel_page (Jan. 2008).

InterSense, "IS-900 Product Technology Brief," http://www.intersense.com/uploadedFiles/Products/White_Papers/IS900_Tech_Overview_Enhanced.pdf (1999).

InterSense, Inc., "Comparison of InterSense IS-900 System and Optical Systems," http://www.intersense.com/uploadedFiles/Products/White_Papers/Comparison%20of%20InterSense%20IS-900%20System%20and%20Optical%20Systems.pdf (Jul. 12, 2004).

Izumori et al, High School Algebra: Geometry (1986).

Jacob, "Human-Computer Interaction—Input Devices" http://www.cs.tufts.edu/~jacob/papers/surveys.html, "Human-Computer Interaction: Input Devices," ACM Computing Surveys, vol. 28, No. 1, pp. 177-179 (Mar. 1996).

Jakubowsk, et al., "Increasing Effectiveness of Human Hand Tremor Separation Process by Using Higher-Order Statistics," Measurement Science Review, vol. 1 (2001).

Jakubowski, et al., "Higher Order Statistics and Neural Network for Tremor Recognition," IEEE Transactions on Biomedical Engineering, vol. 49, No. 2 (Feb. 2002).

Jian, et al., "Adaptive Noise Cancellation," Rice University, http://www.ece.rice.edu/.about.klwang/elec434/elec434.htm, (Aug. 2007).

Jiang, "Capacitive position-sensing interface for micromachined inertial sensors," Dissertation at Univ. of Cal. Berkley (2003).

Ju, et al., "The Challenges of Designing a User Interface for Consumer Interactive Television Consumer Electronics Digest of Technical Papers.," IEEE 1994 International Conference on Volume , Issue , Jun. 21-23, 1994 pp. 114-115 (Jun. 1994).

Keir, et al., "Gesture-recognition with Non-referenced Tracking," IEEE Symposium on 3D User Interfaces, pp. 151-158 (Mar. 25-26, 2006).

Kessler, et al., "The Simple Virtual Environment Library" (MIT Presence) (2000).

Kindratenko, "A Comparison of the Accuracy of an Electromagnetic and a Hybrid Ultrasound-Inertia Position Tracking System," MIT Presence, vol. 10, No. 6, Dec. 2001, 657-663 (2001).

Klein et al.,"Tightly Integrated Sensor Fusion for Robust Visual Tracking," British Machine Vision Computing, vol. 22, No. 10, pp. 769-776 (2004).

Kohlhase, "NASA Report, The Voyager Neptune travel guide," Jet Propulsion Laboratory Publication 89-24, excerpt (Jun. 1989).

Krumm, et al.,"How a Smart Environment Can Use Perception," Ubicomp 2001 (Sep. 2001).

Kuipers, Jack B., "SPASYN—An Electromagnetic Relative Position and Orientation Tracking System," IEEE Transactions on Instrumentation and Measurement, vol. 29, No. 4, pp. 462-466 (Dec. 1980).

La Scala, et al., "Design of an Extended Kalman Filter Frequency Tracker," IEEE Transactions on Signal Processing, vol. 44, No. 3 (Mar. 1996).

Larimer et al., "VEWL: A Framework for building a Windowing Interface in a Virtual Environment," in Proc. of IFIP TC13 Int. Conf. on Human-Computer Interaction Interact'2003 (Zürich, http://people.cs.vt.edu/~bowman/papers/VEWL_final.pdf (2003).

Laughlin, et al., "Inertial Angular Rate Sensors: Theory and Applications," Sensors Magazine (Oct. 1992).

Lee et al., "Tilta-Pointer: the Free-Space Pointing Device," Princeton COS 436 Project, http://www.milyehuang.com/cos436/project/specs.html (2004).

Lee, et al., "Innovative Estimation Method with Measurement Likelihood for all-Accelerometer Type Inertial Navigation System," IEE Transactions on Aerospace and Electronic Systems, vol. 38, No. 1 (Jan. 2002).

Lee, et al., "Two-Dimensional Position Detection System with MEMS Accelerometer for Mouse Applications" Design Automation Conference, 2001. Proceedings, 2001 pp. 852-857 (Jun. 2001).

Leonard, "Computer Pointer Controls 3D Images in Free Space," Electronic Design, pp. 160, 162, 165 , (Nov. 1991).

Liang, et al., "On Temporal-Spatial Realism in the Virtual Reality Environment," ACM 1991 Symposium on User Interface Software and Technology (Nov. 1991).

Link, "Field-Qualified Silicon Accelerometers From 1 Milli g to 200,000 g," Sensors (Mar. 1993).

Liu, et al., "Enhanced Fisher Linear Discriminant Models for Face Recognition," Proc. 14.sup.th International Conference on Pattern Recognition, Queensland, Australia (Aug. 1998).

Lobo et al., "Vision and Inertial Sensor Cooperation Using Gravity as a Vertical Reference," IEEE Trans. on Pattern Analysis and Machine Intelligence, vol. 25, No. 12, pp. 1597-1608 (Dec. 2003).

Logitech, Logitech 2D/6D Mouse Devices Specification (1991).

Logitech, "Logitech 2D/6D Mouse Technical Reference Manual" (1991).

Logitech, "Logitech Tracker—Virtual Reality Motion Tracker." http://www.vrealities.com/logitech.html.

Logitech, Inc., "3D Mouse & Head Tracker Technical Reference Manual" (1992).

Luinge, Inertial sensing of human movement, Thesis, University of Twente (2002).

Luinge, et al., "Estimation of orientation with gyroscopes and accelerometers," Proceedings of the First Joint BMES/EMBS Conference, 1999., vol. 2, p. 844 (Oct. 1999).

Luthi, P. et al., "Low Cost Inertial Navigation System," and translation (2000 ).

MacKenzie et al., "A two-ball mouse affords three degrees of freedom," Extended Abstracts of the CHI '97 Conference on Human Factors in Computing Systems, pp. 303-304. New York: ACM (1997).

MacKinlay, "Rapid Controlled Movement Through a Virtual 3D Workspace," ACM SIGGRAPH Computer Graphics archive, vol. 24 , No. 4, pp. 171-176 (Aug. 1990).

MacLean, "Designing with Haptic Feedback", Proceedings of IEEE Robotics and Automation (ICRA '2000), at 783-88 (Apr. 22-28, 2000).

Masliah, "Measuring the Allocation of Control in 6 Degree of Freedom Human-Computer Interaction Tasks," Proceedings of the SIGCHI conference on Human factors in computing systems, pp. 25-32 (2001 ).

Maybeck, "Stochastic Models, Estimation and Control," vol. 1, Mathematics in Science and Engineering, vol. 141 (1979).

Merrill, "FlexiGesture: A sensor-rich real-time adaptive gesture and affordance learning platform for electronic music control," Thesis, Massachusetts Institute of Technology (Jun. 2004).

Meyer et al., "A Survey of Position Tracker," vol. 1, Issue 2, pp. 173-200, MIT Presence, (1992).

Microsoft Research Corp., "XWand Devices" (image).

Miles, "New pads lack control," The Times, Dec. 6, 1999.

Mizell, "Using Gravity to Estimate Accelerometer Orientation," IEEE Computer Society (2003).

Morris, "Accelerometry—a technique for the measurement of human body movements," J Biomechanics 6: 729-736 (1973).

Mulder, "How to Build an Instrumental Glove Based on the Powerglove Flex Sensors," PCVR 16, pp. 10-14 (1994).

Mulder, "Human movement tracking technology," School of Kinesiology, Simon Fraser University (Jul. 1994).

Myers, et al., "Interacting at a Distance: Measuring the Performance of Laser Pointers and Other Devices," CHI 2002, (Apr. 2002).

N.I.C.E., "The N.I.C.E. Project" (video), http://www.niceproject.com/about/ (1997).

Naimark, et al., "Circular Data Matrix Fiducial System and Robust Image Processing for a Wearable Vision-Inertial Self-Tracker," Proceedings. International Symposium on Mixed and Augmented Reality, ISMAR (2002).

Naimark, et al., "Encoded LED System for Optical Trackers," Fourth IEEE and ACM International Symposium on Mixed and Augmented Reality, pp. 150-153 (2005 ).

Navarrete, et al., "Eigenspace-based Recognition of Faces: Comparisons and a new Approach," Image Analysis and Processing (2001).

Newswire PR, "Five New Retailers To Carry Gyration's Gyropoint Point and Gyropoint Pro" (1996).

Newswire PR, "Three-Axis MEMS-based Accelerometer From STMicroelectronics Targets Handheld Terminals," STMicro (Feb. 2003).

Nichols, "Geospatial Registration of Information for Dismounted Soldiers (GRIDS)," Contractor's Progress, Status, and Management Report (Milestone 3 Report to DARPA ETO) (Oct. 1998).

Nintendo, Nintendo Entertainment System (NES) (1984).

Nintendo, NES System and Controllers (1984).

Nintendo, NES Controller (1984).

Nintendo, NES Zapper Guns (1984).

Nintendo, NES Duck Hunt Game (1984).

Nintendo, Nintendo GameBoy System (1989).

Nintendo, Nintendo Super NES (SNES) (1991).

Nintendo, SNES System & Controllers (1991).

Nintendo, SNES Superscope (1991).

Nintendo, Nintendo 64 System (N64) (1996).

Nintendo, Nintendo 64 System and Controllers (1996).

Nintendo, Nintendo 64 Controller (1996).

Nintendo, Nintendo N64 Controller with Rumble Pack (1996-1997).

Nintendo, Nintendo N64 Rumble Packs (1996-1997).

Nintendo, Nintendo GameBoy Color System (1998).

Nintendo, GameBoy Color (1998).

Nintendo, Nintendo: Kirby Tilt & Tumble game, packaging and user manual (Aug. 2000-2001).

Nintendo, Pokemon Pinball (1998).

Nintendo, Nintendo Game Boy Advance System (2001).

Nintendo, Nintendo Game Boy Advance (2001).

Nintendo, Nintendo: WarioWare: Twisted game, packaging and user manual (2004-2005).

Nintendo, Nintendo Game Boy Advance Wireless Adapter (Sep. 26, 2003).

Nintendo, Nintendo GameCube System (2001).

Nintendo, GameCube System and Controller (2001).

Nintendo, GameCube Controller (2001).

Nintendo, Wavebird Wireless Controllers (May 2002).

Nintendo, G3 Wireless Controller (Pelican) (2001).

Nintendo, Game Boy Advance SP System (2003).

Nintendo, Nintendo Game Boy Color Game Cartridge with Built-In Rumble (Jun. 28, 2009).

Nishiyama, "A Nonlinear Filter for Estimating a Sinusoidal Signal and its Parameters in White Noise: On the Case of a Single Sinusoid," IEEE Transactions on Signal Processing, vol. 45, No. 4 (Apr. 1997).

Nishiyama, "Robust Estimation of a Single Complex Sinusoid in White Noise-H.infin. Filtering Approach," IEEE Transactions on Signal Processing, vol. 47, No. 10 (Oct. 1999).

Odell, "An Optical Pointer for Infrared Remote Controllers," Proceedings of International Conference on Consumer Electronics (1995).

Odell, Transcript of Testimony, Investigation No. 337-TA-658, Before the United States International Trade Commission, vol. IV, redacted (May 14, 2009).

Ojeda, et al., "No GPS? No Problem!" University of Michigan Develops Award-Winning Personal Dead-Reackoning (PDR) System for Walking Users, http://www.engin.umich.edu/research/mrl/urpr/In_Press/P135.pdf (post 2004).

Omelyan, "On the numerical integration of motion for rigid polyatomics: The modified quaternion approach" Computers in Physics, vol. 12 No. 1, pp. 97-103 (1998).

Ovaska, "Angular Acceleration Measurement: A Review," Instrumentation and Measurement Technology Conference, Conference Proceedings. IEEE, vol. 2 (Oct. 1998).

Pai, et al., "The Tango: A Tangible Tangoreceptive Whole-Hand Interface," Proceedings of World Haptics and IEEE Eurohaptics Conference, Symposium on Haptic Interfaces for Virtual Environment and Teleoperator Systems (2005).

Paradiso, et al., "Interactive Therapy with Instrumented Footwear," CHI 2004, Apr. 24-29, 2004, Vienna, Austria (2004).

Park, Adaptive control strategies for MEMS gyroscopes (Dissertation), Univ. Cal. Berkley (2000).

PCTRACKER, Product Technology Brief, at http://www.intersense.com/uploadedFiles/Products/White_Papers/PCTracker_Tech_Overview.pdf.

Pelican Accessories G3 Wireless Controller (Sep. 6, 2002).

Perforce, Perforce Controller (image).

Pham, Hubert, "Pointing in Intelligent Environments with the WorldCursor," Proceedings of Interact 2003, Andrew Wilson & (2003).

Phillips, "Forward/Up Directional Incompatibilities During Cursor Placement Within Graphical User Interfaces," Ergonomics, informaworld.com (May 2005).

Phillips, "On the Right Track: A unique optical tracking system gives users greater freedom to explore virtual worlds" (Apr. 2000).

Pierce et al., "Image Plane Interaction Techniques in 3D Immersive Environments," Proceedings of the 1997 symposium on Interactive 3D graphics, portal.acm.org (1997).

Pilcher, "AirMouse Remote Controls," IEEE Conference on Consumer Electronics (1992).

Pique, "Semantics of Interactive Rotations," Interactive 3D Graphics, Proceedings of the 1986 workshop on Interactive 3D graphics, pp. 259-269 (Oct. 1986).

Piyabongkarn, "Development of a MEMS Gyroscope For Absolute Angle Measurement," IEEE Transactions on Control Systems Technology, vol. 13, Issue 2, pp. 185-195 (Mar. 2005).

Piyabongkarn, "Development of a MEMS Gyroscope For Absolute Angle Measurement," Dissertation, Univ. Minnesota (Nov. 2004).

Polhemus, "Polhemus 3SPACE FASTRAK devices" (image) (2000).

Pryor et al., "A Reusable Software Architecture for Manual Controller Integration," IEEE Conf. on Robotics and Automation, Univ of Texas (Apr. 1997).

Raab, et al., "Magnetic Position and Orientation Tracking System," IEEE Transactions on Aerospace and Electronic Systems, vol. AES-15, No. 5, pp. 709-718 (Sep. 1979).

Raethjen, et al., "Tremor Analysis in Two Normal Cohorts," Clinical Neurophysiology 115 (2004).

Rebo, "Helmet-mounted virtual environment display system," Thesis, Air Force Institute of Technology, Defense Technical Information Center (Dec. 1988).

Rebo, et al., "Helmet-Mounted Virtual Environment Display System," Proc. SPIE vol. 1116, pp. 80-84 (Sep. 1989).

Rekimoto, "Tilting Operations for Small Screen Interfaces," Proceedings of the 9th Annual ACM Symposium On User Interface Software And Technology, pp. 167-168 (1996).

Reunert, "Fiber-Optic Gyroscopes: Principles and Applications," Sensors, (Aug. 1993).

Ribo, et al., "Hybrid Tracking for Outdoor Augmented Reality Applications," IEEE Computer Graphics and Applications, vol. 22, No. 6, pp. 54-63 (Nov./Dec. 2002).

Riviere, C., Robotics Institute, http://www.ri.cmu.edu/people/riviere.sub.--cameron.html http://www.ri.cmu.edu/person.html?type=publications&person_id=248 (Aug. 2007).

Riviere, et al., "Adaptive Canceling of Physiological Tremor for Improved Precision in Microsurgery," IEEE Transactions on Biomedical Engineering, vol. 45, No. 7 (Jul. 1998).

Riviere, et al., "Toward Active Tremor Canceling in Handheld Microsurgical Instruments," IEEE Transactions on Robotics and Automation, vol. 19, No. 5 (Oct. 2003).

Robbinett et al., "Implementation of Flying, Scaling, and Grabbing in Virtual Worlds," ACM Symposium (1992).

Roberts, "The Lincoln Wand," AFIPS Conference Proceedings, MIT Lincoln Laboratory (1966).

Robinett et al., "The Visual Display Transformation for Virtual Reality," University of North Carolina at Chapel Hill (1994).

Roetenberg, "Inertial and magnetic sensing of human motion," Thesis (2006).

Roetenberg, et al., "Inertial And Magnetic Sensing Of Human Movement Near Ferromagnetic Materials," Proceedings. The Second IEEE and ACM International Symposium on Mixed and Augmented Reality (Mar. 2003).

Rolland, et al., "A Survey of Tracking Technology for Virtual Environments," University of Central Florida, Center For Research And Education In Optics Lasers (CREOL) (2001 ).

Sakai, et al., "Optical Spatial Filter Sensor For Ground Speed," Optical Review, vol. 2, No. 1 pp. 65-67 (1994).

Saxena et al., "In Use Parameter Estimation of Inertial Sensors by Detecting Multilevel Quasi-Static States," Lecture Notes in Computer Science, 2005—Berlin: Springer-Verlag, (Apr. 2004).

Sayed, "A Framework for State-Space Estimation with Uncertain Models," IEEE Transactions on Automatic Control, vol. 46, No. 7 (Jul. 2001).

Sayed, UCLA Adaptive Systems Laboratory-Home Page, UCLA, http://asl.ee.ucla.edu/index.php?option=com.sub.--frontpage&Itemid=1 (Aug. 2007).

Schofield, Jack et al., Coming up for airpad, The Guardian (Feb. 2000).

Screen Shot of Brave Spirits (1998 ).

Selectech, Selectech AirMouse Devices (image) (1991).

Selectech, "Selectech AirMouse Remote Controls, Model # AM-R1," photographs (1991).

Selectech, "Airmouse Remote Control System Model AM-1 User's Guide," Colchester, VT (Sep. 24, 1991).

Selectech, Facsimile Transmission from Rossner to Monastiero, Airmouse Remote Controls, Colchester, VT (Mar. 25, 1992).

Selectech, "Changing Driver Versions on CDTV/AMIGA" (Oct. 17, 1991).

Selectech, "AirMouse Remote Controls, AirMouse Remote Control Warranty" (1991).

Selectech, Software, "AirMouse for DOS and Windows IBM & Compatibles," "AirMouse Remote Control B0100EN-C, Amiga Driver, CDTV Driver, Version: 1.00," "AirMouse Remote Control B0100EM-C.1, Apple Macintosh Serial Driver Version: 1.00 (1.01B)," "AirMouse Remote Control B0100EL-B/3.05 DOS Driver Version: 3.0, Windows Driver Version 1.00," AirMouse Remote Control MS-DOS Driver Version: 3.00/3.05, Windows 3.0 Driver Version: 1.00 (1991).

Seoul National Univ., "EMMU System"—Seoul National Univ Power Point Presentation, www.computer.org/portal/cms_docs_ieeecs/ieeecs/education/csidc/CSIDC03Presentations/SNU.ppt (2003).

Shoemake, Ken, Quaternions, UPenn, Online.

Simon, et al. "The Yo Yo: A Handheld Combining Elastic And Isotonic Input," http://www.uni-weimar.de/cms/fileadmin/medien/vr/documents/publications/TheYoYo-Interact2003-Talk.pdf (2003).

Simon, et al., "The YoYo: A Handheld Device Combining Elastic and Isotonic Input," Human-Computer Interaction—INTERACT'03, pp. 303-310 (2003).

Smith, "Gyrevolution: Orienting the Digital Era," http://www.gyration.com/images/pdfs/Gyration_White_Paper.pdf (2007).

Sorenson, et al., "The Minnesota Scanner: A Prototype Sensor for Three-Dimensional Tracking of Moving Body Segments," IEEE Transactions on Robotics and Animation (Aug. 1989).

SOURCEFORGE.COM, "ARToolkit API Documentation" (SourceForge web pages) (2004-2006).

Stovall, "Basic Inertial Navigation," NAWCWPNS TM 8128, Navigation and Data Link Section, Systems Integration Branch (Sep. 1997).

Sutherland, "A Head-Mounted Three Dimensional Display," AFIPS '68 (Fall, part I): Proceedings of the Dec. 9-11, 1968, fall joint computer conference, part I, pp. 757-764 (Dec. 1968).

Sutherland, Ivan E., "Sketchpad: A Man-Machine Graphical Communication System," AFIPS '63 (Spring): Proceedings of the May 21-23, 1963, Spring Joint Computer Conference, pp. 329-346 (May 1963).

Sweetster, "A Quaternion Algebra Tool Set," http://world.std.com/%7Esweetser/quaternions/intro/tools/tools.html (Jun. 2005).

Thinkoptics, Thinkoptics Wavit devices (image) (2007).

Timmer, "Data Analysis and Modeling Dynamic Processes in the Life Sciences," Freiburg Center for Data Analysis and Modeling, http://webber.physik.uni-freiburg.de/.about.jeti/ (Aug. 2007).

Timmer, "Modeling Noisy Time Series: Physiological Tremor," International Journal of Bifurcation and Chaos, vol. 8, No. 7 (1998).

Timmer, et al, "Pathological Tremors: Deterministic Chaos or Nonlinear Stochastic Oscillators?" Chaos, vol. 10, No. 1 (Mar. 2000).

Timmer, et al., "Characteristics of Hand Tremor Time Series," Biological Cybernetics, vol. 70 (1993).

Timmer, et al., Cross-Spectral Analysis of Physiological Tremor and Muscle Activity: II Application to Synchronized Electromyogram, Biological Cybernetics, vol. 78 (1998).

Timmer, et al., "Cross-Spectral Analysis of Tremor Time Series," International Journal of Bifurcation and Chaos, vol. 10, No. 11 (2000).

Titterton et al., "Strapdown Inertial Navigation Technology," pp. 1-56 and pp. 292-321 (May 1997).

Titterton et al., "Strapdown Inertial Navigation Technology," 2nd ed., Institution of Electrical Engineers (2004).

Tokimec, et al., "A Wearable Attitude-Measurement System Using a Fiberoptic Gyroscope," MIT Presence (Apr. 2002).

UNC Computer Science Department, "News & Notes from Sitterson Hall," UNC Computer Science, Department Newsletter, Issue 24, Spring 1999 (Apr. 1999).

Univ. Illinois at Chicago, "CAVE—A Virtual Reality Theater," http://www.youtube.com/watch?v=Sf6bJjwSCE 1993.

Univ. Wash., "ARToolkit" (U. Wash. web pages) (1999).

Urban, "BAA 96-37 Proposer Information," DARPA/ETO (1996).

US Dynamics Corp, "Spinning Mass Mechanical Gyroscopes" (Aug. 2006).

US Dynamics Corp, "The Concept of 'Rate' (more particularly, angular rate pertaining to rate gyroscopes) (rate gyro explaination)," (Aug. 2006).

US Dynamics Corp, "US Dynamics Model 475 Series Rate Gyroscope Technical Brief—brief discussion on rate gyroscope basics, operation, and uses, and a dissection of the model by major component" (Dec. 2005).

US Dynamics Corp, "US Dynamics Rate Gyroscope Interface Brief (rate gyro IO)" (Aug. 2006).

Van Den Bogaard, "Using linear filters for real-time smoothing of rotational data in virtual reality application," http://www.science.uva.nl/research/ias/alumni/m.sc.theses/theses/RobvandenBogaard.pdf (Aug. 2004).

Van Laerhoven, et al., "Using An Autonomous Cube For Basic Navigation And Input," Proceedings of the 5th International Conference on Multimodal interfaces, Vancouver, British Columbia, Canada, pp. 203-210 (2003).

Van Rheeden, et al., "Noise Effects On Centroid Tracker Aim Point Estimation," IEEE Trans. on Aerospace and Electronic Systems, vol. 24, No. 2, pp. 177-185 (Mar. 1988).

Vaz, et al., "An Adaptive Estimation of Periodic Signals Using a Fourier Linear Combiner," IEEE Transactions on Signal Processing, vol. 42, Issue 1, pp. 1-10 (Jan. 1994).

Verplaetse, "Inertial Proprioceptive Devices: Self-Motion Sensing Toys And Tools," IBM Systems Journal (Sep. 1996).

Verplaetse, "Inertial-Optical Motion-Estimating Camera for Electronic Cinematography," Masters of Science Thesis, MIT, (1997).

Vorozcovs, et al.,"The Hedgehog: A Novel Optical Tracking Method For Spatially Immersive Displays," MIT Presence, vol. 15, No. 1, pp. 108-121 (2006).

Wang, et al., "Tracking a Head-Mounted Display in a Room-Sized Environment with Head-Mounted Cameras," SPIE 1990 Technical Symposium on Optical Engineering and Photonics in Aerospace Sensing, vol. 1290, pp. 47-57 (1990).

Ward, et al., "A Demonstrated Optical Tracker With Scalable Work Area for Head-Mounted Display Systems," Symposium on Interactive 3D Graphics, Proceedings of the 1992 Symposium On Interactive 3D Graphics, pp. 43-52, ACM Press, Cambridge, MA (1992).

Watt, *3D Computer Graphics*, "Three-Dimensional Geometry In Computer Graphics,", pp. 1-22 Addison-Wesley (1999).

Welch et al., "HiBall-3100™ Wide-Area, High-Precision Tracker and 3D Digitizer," http://www.3rdtech.com/HiBall.htm (2002-2006).

Welch et al., HiBall Devices (image) (2002-2006).

Welch et al., Motion Tracking: No Silver Bullet, but a Respectable Arsenal IEEE Computer Graphics and Applications, vol. 22, No. 6, pp. 24-38 (Nov. 2002).

Welch, "Hybrid Self-Tracker: An Inertial/Optical Hybrid Three-Dimensional Tracking System," Tech. Report TR95-048, Dissertation Proposal, Univ. of North Carolina at Chapel Hill, Dept. Computer Science, Chapel Hill, N.C. (1995).

Welch, "A Self-Contained Wide-Area Tracker Using Sensor Fusion" (2001).

Welch, "Hawkeye Zooms in on Mac Screens with Wireless Infrared Penlight Pointer," MacWeek (May 1993).

Welch, et al., "Complementary Tracking and Two-Handed Interaction for Remote 3D Medical Consultation with a PDA," Proceedings of Trends and Issues in Tracking for Virtual Environments, Workshop at the IEEE Virtual Reality 2007 Conference (Mar. 2007).

Welch, et al., "High-Performance Wide-Area Optical Tracking: The HiBall Tracking System," MIT Presence: Teleoperators & Virtual Environments (2001).

Welch, et al., "SCAAT: Incremental Tracking with Incomplete Information," Computer Graphics, SIGGRAPH 97 Conference Proceedings, pp. 333-344 (Aug. 1997).

Welch, et al., "Source Code for HiBall+Inerital device," UNC-CH Computer Science (Jun. 1998).

Welch, et al., "The HiBall Tracker: High-Performance Wide-Area Tracking for Virtual and Augmented Environments," ACM SIGGRAPH, Addison-Wesley (1999).

Welch, et al., "The High-Performance Wide-Area Optical Tracking : The HiBall Tracking System," MIT Presence, Presence, vol. 10 , No. 1 (Feb. 2001).

Welch, et al., "Tracking for Training in Virtual Environments: Estimating the Pose of People and Devices for Simulation and Assessment," [J. Cohn, D. Nicholson, and D. Schmorrow, editors, The PSI Handbook of Virtual Environments for Training and Education: Developments for the Military and Beyond, Chap.1, pp. 23-47] (2008).

Widrow, et al., "Fundamental Relations Between the LMS Algorithm and the DFT," IEEE Transactions on Circuits and Systems, vol. 34, No. CAS-7, (Jul. 1987).

Williams, et al., "Physical Presence: Palettes In Virtual Spaces," Society of Photo-Optical Instrumentation Engineers (SPIE) Conference Series, vol. 3639, No. 374-384 (May 1999).

Wilson, "Wireless User Interface Devices for Connected Intelligent Environments," Ubicomp 2003 Workshop (2003).

Wilson, "WorldCursor: Pointing in Intelligent Environments with a Tele-operated Laser Pointer," UIST '03 Companion (Nov. 2003).

Wilson, "XWand: UI for Intelligent Environments," http://research.microsoft.com/en-us/um/people/awilson/wand/default.htm (Apr. 2004).

Wilson, et al., "Demonstration of the XWand Interface for Intelligent Spaces," UIST '02 Companion, pp. 37-38 (Oct. 2002).

Wilson, et al., "Gesture Recognition Using the Xwand," ri.cmu.edu (2004).

Wilson, et al., "Xwand: UI for Intelligent Spaces," CHI 2003, Proceedings of the SIGCHI conference on Human factors in computing systems, pp. 545-552 (Apr. 2003).

Wilson, Research page, biography available at http://research.microsoft.com/en-us/um/people/awilson/?0sr=a, Microsoft Corp. (2009).

Wilson, XWand video, http://research.microsoft.com/~awilson/wand/wand%20video%20768k.WMV (Mar. 2002).

Wilson, Transcript of Testimony, Investigation No. 337-TA-658, Before the United States International Trade Commission, vol. V (May 15, 2009).

Wormell, "Unified Camera, Content and Talent Tracking in Digital Television and Movie Production," InterSense, Inc. & Mark Read, Hypercube Media Concepts, Inc. Presented: NAB 2000, Las Vegas, NV, Apr. 8-13, 2000.

Wormell, et al., "Advancements In 3D Interactive Devices For Virtual Environments," ACM International Conference Proceeding Series; vol. 39 (2003).

Worringham, et al., "Directional Stimulus-Response Compatibility: A Test Of Three Alternative Principles," Ergonomics, vol. 41, Issue 6, pp. 864-880 (Jun. 1998).

Worringham, et al., "Tablet-PC Classroom System Wins Design Competition," Computer, vol. 36, No. 8, pp. 15-18 (Aug. 2003).

Yang, et al., "Implementation and Evaluation of 'Just Follow Me': An Immersive, VR-Based, Motion-Training System," MIT Presence: Teleoperators and Virtual Environments, vol. 11 No. 3, at 304-23 (MIT Press) (Jun. 2002).

You, et al., "Hybrid Inertial and Vision Tracking for Augmented Reality Registration," http://graphics.usc.edu/cgit/pdf/papers/Vr1999.PDF (1999).

You, et al., "Orientation Tracking for Outdoor Augmented Reality Registration," IEE Computer Graphics and Applications, IEEE, vol. 19, No. 6, pp. 36-42 (Nov. 1999).

Youngblut, et al., "Review of Virtual Environment Interface Technology," Institute for Defense Analyses (Jul. 1996).

Yun, et al., "Recent Developments in Silicon Microaccelerometers," Sensors, University of California at Berkeley (Oct. 1992).

Zhai, "Human Performance in Six Degree of Freedom Input Control," Thesis, University of Toronto (1995).

Zhou, et al., "A survey—Human Movement Tracking and Stroke Rehabilitation," Technical Report: CSM-420, ISSN 1744-8050, Dept. of Computer Sciences, University of Essex, UK (Dec. 8, 2004).

Zhu, et al., "A Real-Time Articulated Human Motion Tracking Using Tri-Axis Inertial/Magnetic Sensors Package," IEEE Transactions On Neural Systems and Rehabilitation Engineering, vol. 12, No. 2 (Jun. 2004).

"ASCII Grip One Handed Controller," *One Switch-ASCII Grip One Handed Playstation Controller*, http://www.oneswitch.org.uk/1/ascii/grip.htm , Jul. 11, 2008, pp. 1-2.

"Superfamicom Grip controller by ASCII," http://superfami.com/sfc_grip.html, Jul. 10, 2008, pp. 1-2.

"ASCII/Sammy Grip V2," *One Switch-Accessible Gaming Shop-ASCII Grip V2*, http://www.oneswitch.org.uk/1/AGS/AGS-onehand/ascii-grip-v2.html, Jul. 10, 2008, pp. 1-2.

Photographs of prior art ASCII Grip V2 Controller, (cited in previous IDS as: ASCII/Sammy Grip V2 One Switch-Accessible Gaming Shop-ASCII Grip V2, http://www.oneswitch.org.uk/1/AGS/AGS-onehand/ascii-grip-v2.html, Jul. 10, 2008, pp. 1-2.).

"Nintendo Wii swings into action," May 25, 2006, http://news.com.com/2300-1043_3-6070295-2.html?tag=ne.gall.pg, (Apr. 6, 2007).

Kennedy, P.J., "Hand-Held Data Input Device," *IBM Technical Disclosure Bulletin*, vol. 26, No. 11, Apr. 1984, pp. 5826-5827.

Photographs of N64 controller.

Photographs of Xbox 360 controller.

"Game Controller" Wikipedia, 7 pages, http://en.wikipedia.org/w/index.php?title=Game_controller&oldid=21390758 (Aug. 19, 2005).

Dichtburn, "Camera in Direct3D" Toymaker, 5 pages, http://web.archive.org/web/20050206032104/http://toymaker.info/games/html/camera.html. (Mar. 5, 2005).

Electronic Entertainment Expo (E3) advertisement for G-Force Tilt "TILTPAK Rumble & Motion Sensing Pak for Nintendo 64".

Electronic Entertainment Expo (E3) advertisement for G-Force Tilt "TILTFORCE[2] Motion-Sensing & Vibration Controller for Playstation Game Console".

News Article "New Game Controllers Using Analog Devices' G-Force Tilt to Be Featured at E3", Norwood, MA (May 10, 1999).

Youtube video: "Nintendo Wii Controller Invented By Americans" http://www.youtube.com/watch?v=wjLhSrSxFNw, Jun. 28, 2000.

Youtube Fox News Video: "Interview with Pat Goschy, the "Real" Nintendo Wii Inventor" http://www.youtube.com/watch?v=oKtZysYGDLE.

English Abstract for Japanese Patent No. JP10021000, published Jan. 23, 1998.

English Abstract for Japanese Patent No. JP11053994, published Feb. 26, 1999.

English Abstract for Japanese Patent No. JP11099284, published Apr. 13, 1999.

English Abstract for Japanese Patent No. JP2006136694, published Jun. 1, 2006.

English Abstract for Japanese Patent No. JP2001038052, published Feb. 13, 2001.

English Abstract for Japanese Patent No. JP2002224444, published Aug. 13, 2002.

English Abstract for Japanese Patent No. WO9732641, published Sep. 12, 1997.

Kennedy, P.J., "Hand-Held Data Input Device," *IBM Technical Disclosure Bulletin*, vol. 26, No. 11, Apr. 1984, pp. 5826-5827.

"Controllers-Atari Space Age Joystick," *AtariAge: Have You Played Atari Today?* www.atariage.com/controller_page.html?SystemID=2600&ControllerID=12.

"Controllers-Booster Grip," *AtariAge: Have You Played Atari Today?* www.atariage.com/controller_page.html?SystemID=2600 &ControllerID=18.

"Coleco Vision: Super Action™ Controller Set," www.vintagecomputing.com/wp-content/images/retroscan/coleco_sac_1_large.jpg.

Acciistick, picture of one-handed controller, 2 pages (Feb. 6, 2006).

Electro-Plankton Weblog, http://www.tranism.com/weblog/2005/09/, This is the Revelotion Nintendo Style, Sep. 15, 2005, 2 pgs.

CNET News.com, http://news.com.com/2300-1043_3-6070295-2. html?tag=ne.gall.pg, "Nintendo Wii Swings Into Action," May 25, 2006, 1pg.

Gyration Ultra Cordless Optical Mouse, User Manual, 1-15, Gyration, Inc., Saratoga, CA (2003).

Hinckley, Ken, et al., The VideoMouse: A Camera_based Multi-Degree_f_freedom input Device, CHI Letters vol. 1, 1 UIST "99, Ashville, NC pp. 103-112 (1999).

European Search Report for Application No. EP 07 11 2880 by Examiner S. Arnold on Oct. 18, 2007, in Munich.

Ashida et al., entitled, "Game Controller," U.S. Appl. No. 11/790,780, filed Apr. 27, 2007, pending.

U.S. Appl. No. 11/745,842, filed May 2007, Ashida et al.

Briefs. (New & Improved) (Brief Article), PC Magazine, Oct. 26, 1993.

Foremski, T. "Remote Control Mouse Aims at Interactive TV", Electronics Weekly, Mar. 9, 1994.

Gelmis, J.; "Ready to Play, the Future Way", Jul. 23, 1996, Buffalo News.

Ji, H. "Study on the infrared remote-control lamp-gesture device", Yingyong Jiguang/Applied Laser Technology, v 17, n 5, p. 225-227, Oct. 1997 Language: Chinese-Abstract only.

Maggioni, C., "A novel gestural input device for virtual reality", IEEE Virtual Reality Annual International Symposium (Cat. No. 93CH3336-5), 118-24, 1993.

Morgan, C.; "Still chained to the overhead projector instead of the podium? (TV Interactive Corp's LaserMouse Remote Pro infrared mouse) (Clipboard)(Brief Article) (Product Announcement)", Government Computer News.Jun. 13, 1994.

Templeman, James N., "Virtual Locomotion: Walking in Place through Virtual Environments," Presence, vol. 8 No. 6, pp. 598-617, Dec. 1999.

Office Action issued in commonly assigned copending U.S. Appl. No. 11/446,187, dated Apr. 29, 2008.

Office Action issued in commonly assigned copending U.S. Appl. No. 11/446,187, dated Feb. 26, 2009.

Office Action issued in commonly assigned copending U.S. Appl. No. 11/446,187, dated Aug. 19, 2009.

Office Action issued in commonly assigned copending U.S. Appl. No. 11/446,188, dated Apr. 30, 2008.

Office Action issued in commonly assigned copending U.S. Appl. No. 11/446,188, dated Feb. 27, 2009.

Office Action issued in commonly assigned copending U.S. Appl. No. 11/446,188, dated Oct. 21, 2009.

Notice of Allowanced issued in commonly assigned copending U.S. Appl. No. 11/532,328, dated Apr. 15, 2010.

* cited by examiner

F I G. 3
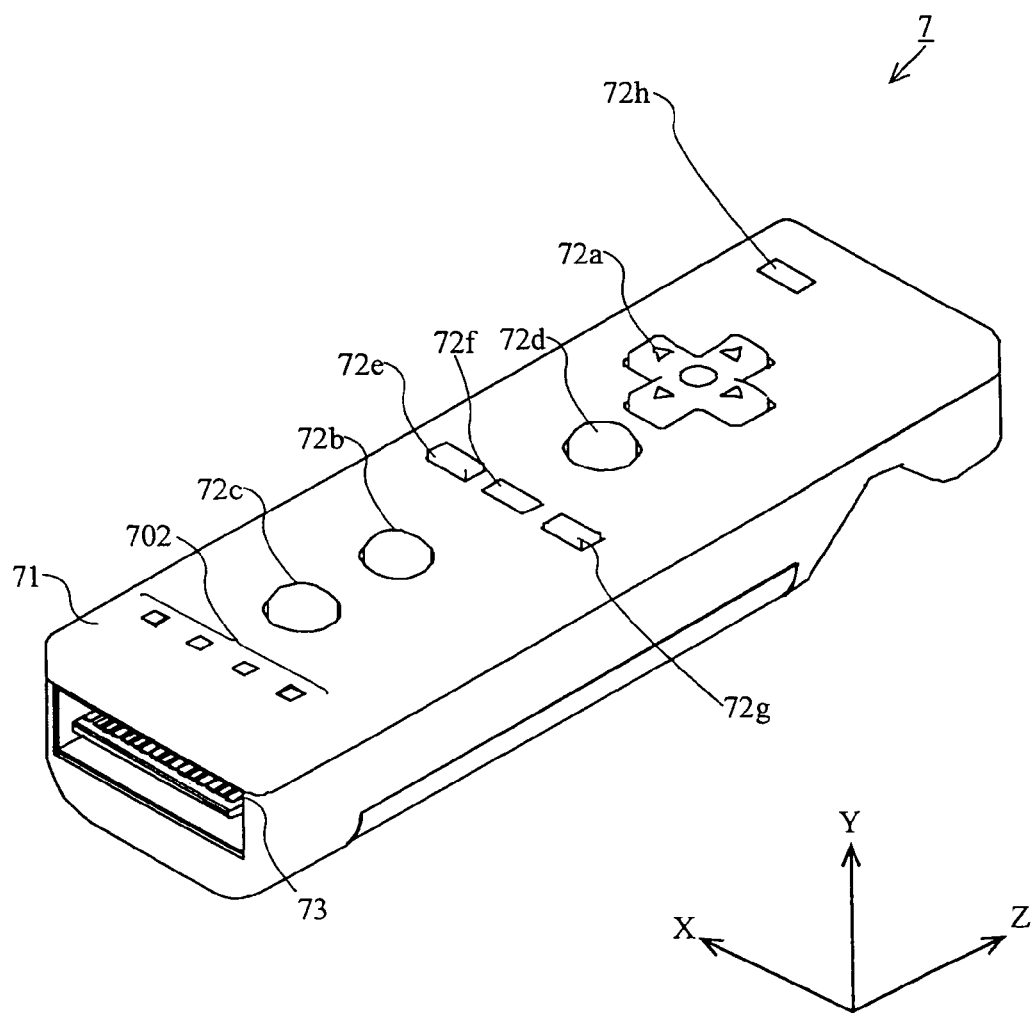

F I G. 7
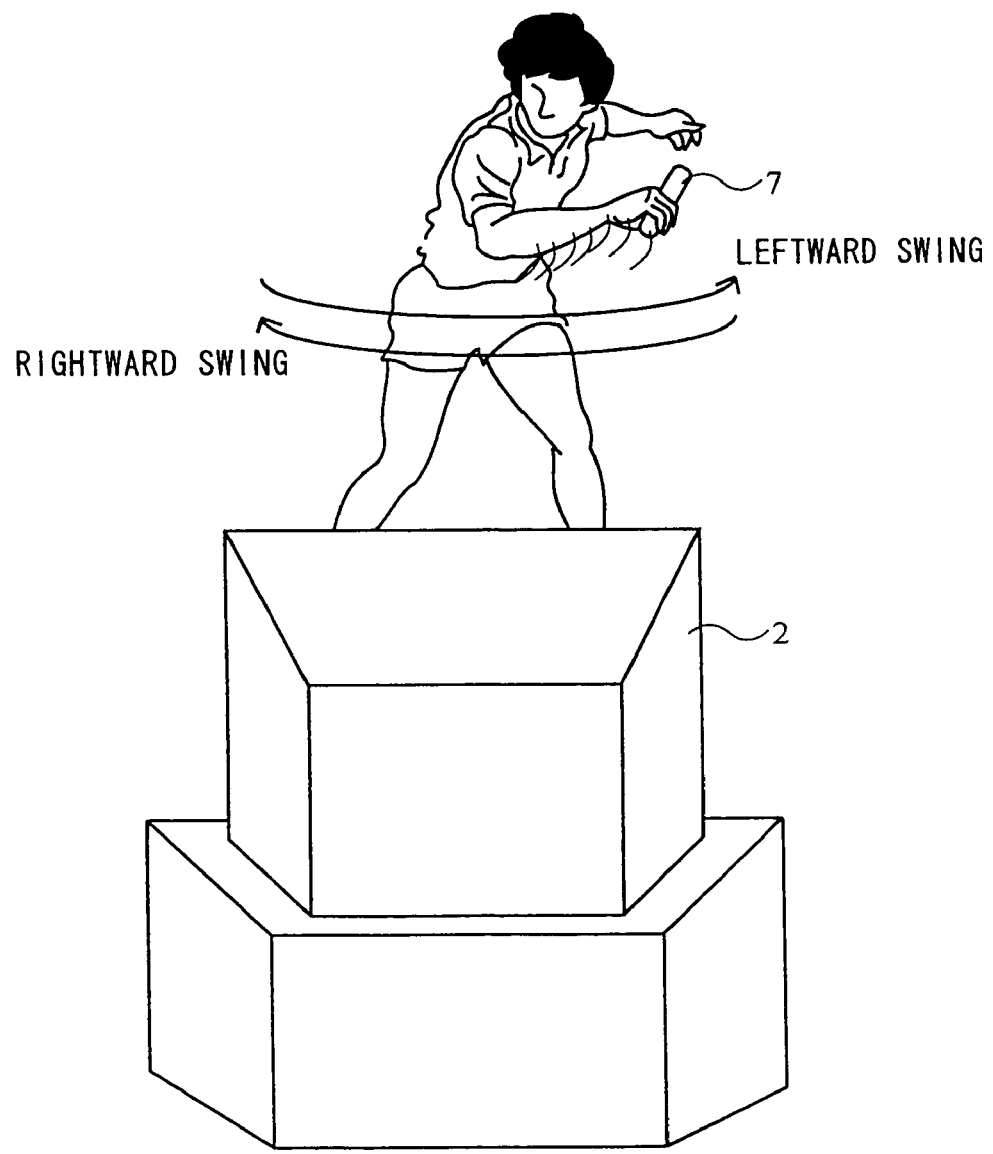

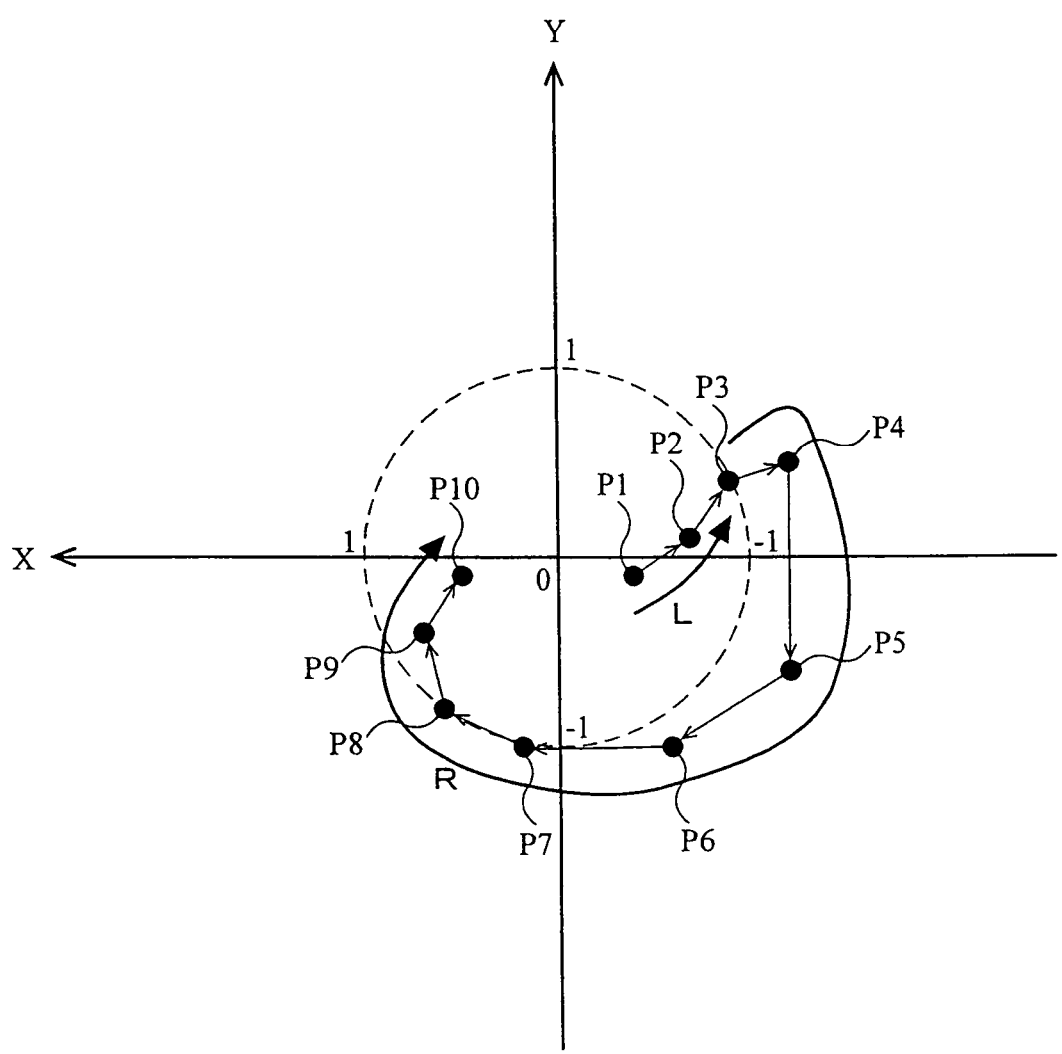
F I G. 10

F I G. 1 7
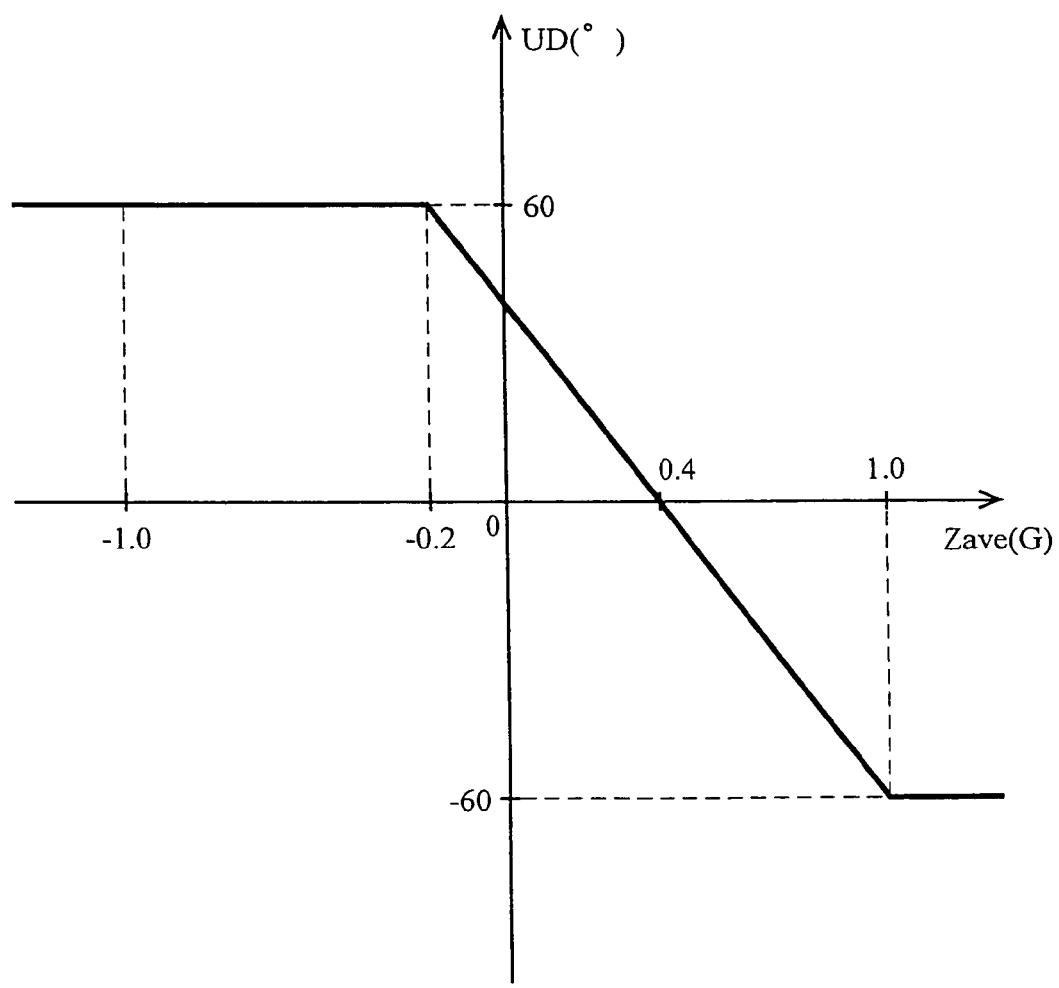

F I G. 25

| | NO TWIST | LEFTWARD TWIST | RIGHTWARD TWIST |
|---|---|---|---|
| LEFTWARD SWING | NO SPIN | TOPSPIN<br>UP-DOWN DIRECTION: RAPIDLY GOES DOWN<br>LEFT-RIGHT DIRECTION: NO CHANGE | BACKSPIN<br>UP-DOWN DIRECTION: FLYING DISTANCE INCREASES<br>LEFT-RIGHT DIRECTION: CURVES RIGHTWARD |
| RIGHTWARD SWING | NO SPIN | BACKSPIN<br>UP-DOWN DIRECTION: FLYING DISTANCE INCREASES<br>LEFT-RIGHT DIRECTION: CURVES LEFTWARD | TOPSPIN<br>UP-DOWN DIRECTION: RAPIDLY GOES DOWN<br>LEFT-RIGHT DIRECTION: NO CHANGE |

ACCELEROMETER-BASED CONTROLLER

CROSS REFERENCE OF RELATED APPLICATION

The disclosure of Japanese Patent Application No. 2006-066450 is incorporated herein by reference.

BACKGROUND

1. Field

Example embodiments of the present invention relates to a motion determining apparatus and a storage medium having a motion determining program stored thereon, and more particularly to a motion determining apparatus for determining a rotation motion given to an input device including an acceleration sensor and a storage medium having a motion determining program for determining the same stored thereon.

2. Description of the Background Art

Conventionally, apparatuses have been developed for determining a motion of an input device operated by a user. The input device includes an acceleration sensor, and the motion of the input device is determined using an output from the acceleration sensor. For example, Japanese Laid-Open Patent Publication No. 2002-153673 (hereinafter, referred to as "patent document 1") discloses a game apparatus including a game controller which is formed like a boxing glove and has a triaxial acceleration sensor. With the game apparatus, a user can enjoy a game using an output from the triaxial acceleration sensor.

The controller (glove) disclosed by patent document 1 includes a triaxial acceleration sensor having a sensor X, a sensor Y and a sensor Z. When a drastically large value is input to the sensor Y, the game apparatus traces back an output waveform obtained from the sensor Y and sets a time around value 0 as time t0. A time at which value 0 or the vicinity thereof is obtained after the output waveform shows a drastically small value is set as time t1. An acceleration detected between time t0 and time t1 is extracted from an output waveform from each of the sensors X and Z. Using the output waveform of each component, the game apparatus determines the type of the punch (for example, straight, hook, uppercut, etc.). Specifically, in the case where the output waveform from the sensor X shows a slightly positive value and the output waveform from the sensor Z does not change, the game apparatus determines that the player has given a straight punch. In the case where the output waveform from the sensor X shows a negative value at the start of operation and then shows a positive value and the waveform from the sensor Z does not change, the game apparatus determines that the player has given a hook. In the case where the waveform from the sensor X is infinite and the waveform from the sensor Z shows a large negative value and then shows a positive value, the game apparatus determines that the player has given an uppercut.

The game apparatus disclosed by patent document 1 determines the type of the punch in association with the waveform from each of the sensors X and Z. The determination is made independently for the waveform of each component. Therefore, this game apparatus does not assume a case where outputs from the two sensors influence each other, for example, a case where the direction of the glove (controller) is changed during the detection period. In the case where outputs from a plurality of sensors need to be combined to determine a motion, the motion cannot be accurately determined merely by making a determination independently for each sensor. For example, a motion of the glove being rotated (twisted) around a predetermined rotation axis cannot be determined. Also, a composite motion including a plurality of motions, for example, a motion of the glove being rotated (twisted) while the player is giving a punch, cannot be determined. Namely, the motions which can be input to the controller by the player are limited to relatively simple ones.

SUMMARY

Therefore, an aspect of example embodiments of the present invention is to provide a motion determining apparatus capable of determining a rotation motion given to an input device including an acceleration sensor, and a storage medium having a motion determining program capable of the same stored thereon.

At least one example embodiment of the present invention has the following features to attain the aspects mentioned above. The reference numerals, step numbers and the like in parentheses in this section of the specification indicate the correspondence with the embodiment described later for easier understanding of example embodiments of the present invention, and do not limit the present invention in any way.

A first aspect of example embodiment(s) of the present invention is directed to a motion determining apparatus (3) for determining a motion of an input device (7) including an acceleration sensor (701) for determining an acceleration in each of at least two axial directions (X- and Y-axis directions). The motion determining apparatus comprises data obtaining means (S61, S64, S77 and S92 executed by the CPU 30; hereinafter only the step numbers will be indicated), rotation motion determination means (S101, S102), and output means (S102, S106). The data obtaining means obtains acceleration data (Da) which is output from the acceleration sensor. The rotation motion determination means determines, through processing operations, a rotation motion of the input device around a predetermined direction as a rotation axis (Z axis). The processing operations include comparing a start point (Ps) in a two-dimensional coordinate system (X-Y coordinate system) which is represented by the first acceleration data obtained in a predetermined period, and an end point (Pe) in the two-dimensional coordinate system which is represented by the last acceleration data obtained in the predetermined period, wherein coordinate axes (X axis, Y axis) of the two-dimensional coordinate system are defined based on components of the two axial directions of the acceleration data, and an origin of the two- dimensional coordinate system represents a value of the acceleration data in the state where no acceleration including the acceleration of gravity acts upon the acceleration sensor. The output means outputs motion data (Dj) including at least the rotation motion determined by the rotation motion determination means.

In a fourth aspect based on the first aspect, the rotation motion determination means includes angle calculation means (S101) The angle calculation means calculates an angle ($\theta$) defined by a vector from the origin toward the start point in the two-dimensional coordinate system and a vector from the origin toward the end point in the two-dimensional coordinate system. The rotation motion determination means determines the rotation motion based on the angle.

In a seventh aspect based on the fourth aspect, the rotation motion determination means further includes rotation direction determination means (S102). When the angle exceeds a first threshold value (120°), the rotation direction determination means determines that the input device has been moved while being rotated in one of two directions. When the angle is less than a second threshold value (70°), the rotation direction determination means determines that the input device has been moved while being rotated in the other of the two directions with respect to the rotation axis. The output means outputs the motion data including the rotation direction (positive value or negative value of S) determined by the rotation direction determination means.

In a tenth aspect based on the fourth aspect, the rotation motion determination means further includes rotation angle determination means (S102). The rotation angle determination means determines a rotation angle (value of S) of the input device based on a value of the angle. The output means outputs the motion data including the rotation angle determined by the rotation angle determination means.

In second, fifth, ninth, and eleventh aspects based on the first, fourth, seventh, and tenth aspects, the motion detection apparatus further comprises storage means (33). The storage means stores the acceleration data sequentially obtained by the data obtaining means. The rotation motion determination means sets a coordinate point in the two-dimensional coordinate system which is represented by the first acceleration data obtained in the predetermined period, among the acceleration data stored in the storage means, as the start point; and sets a coordinate point in the two-dimensional coordinate system which is represented by the last acceleration data obtained in the predetermined period, among the acceleration data stored in the storage means, as the end point.

In third, sixth, ninth, and twelfth aspects based on the first, fourth, seventh, and tenth aspects, the acceleration sensor detects an acceleration of the input device in each of three axial directions (X-, Y- and Z-axis directions) perpendicular to one another. The rotation motion determination means sets a time period in which acceleration data in a first axial direction (Z-axis direction) of the three axial directions exceeds a predetermined value as the predetermined period (Yes in S62). The two-dimensional coordinate system has the coordinate axes defined based on components of a second axial direction and a third axial direction (X- and Y-axis directions) of the three axial directions. The rotation motion determination means determines the rotation motion using acceleration data in the second axial direction and the third axial direction which has been obtained first and last in the predetermined period and stored in the storage means.

In a thirteenth aspect based on the first aspect, the acceleration sensor detects an acceleration including at least a centrifugal component generated when the input device is swung by a user so as to output acceleration data. The rotation motion determination means sets, as the start point, a coordinate point in the two-dimensional coordinate system which is represented by acceleration data obtained at the start of a period in which an acceleration of the centrifugal component exceeds a threshold value, among the acceleration data obtained by the data obtaining means; and sets, as the endpoint, a coordinate point in the two-dimensional coordinate system which is represented by acceleration data obtained at the end of the period, among the acceleration data obtained by the data obtaining means.

A fourteenth aspect of example embodiment(s) of the present invention is directed to a storage medium having stored thereon a motion determining program executable by a computer (30) of a motion determining apparatus for detecting a motion of an input device including an acceleration sensor for determining an acceleration in each of at least two axial directions. The motion determining program causes the computer to execute a data obtaining step, a rotation motion determination step, and an output step. The data obtaining step obtains acceleration data which is output from the acceleration sensor. The rotation motion determination step determines a rotation motion of the input device around a predetermined direction as a rotation axis, by comparing a start point in a two-dimensional coordinate system which is represented by the first acceleration data obtained in a predetermined period, and an end point in the two-dimensional coordinate system which is represented by the last acceleration data obtained in the predetermined period, wherein coordinate axes of the two-dimensional coordinate system are defined based on components of the two axial directions of the acceleration data, and an origin of the two-dimensional coordinate system represents a value of the acceleration data in the state where no acceleration including the acceleration of gravity acts upon the acceleration sensor. The output step outputs motion data including at least the rotation motion determined in the rotation motion determination step.

In a seventeenth aspect based on the fourteenth aspect, the rotation motion determination step includes an angle calculation step. The angle calculation step calculates an angle defined by a vector from the origin toward the start point in the two-dimensional coordinate system and a vector from the origin toward the end point in the two-dimensional coordinate system. In the rotation motion determination step, the rotation motion is determined based on the angle.

In a twentieth aspect based on the seventeenth aspect, the rotation motion determination step further includes a rotation direction determination step. When the angle exceeds a first threshold value, rotation direction determination step determines that the input device has been moved while being rotated in one of two directions. When the angle is less than a second threshold value, the rotation direction determination step determines that the input device has been moved while being rotated in the other of the two directions with respect to the rotation axis. In the output step, the motion data including the rotation direction determined in the rotation direction determination step is output.

In a twenty-third aspect based on the seventeenth aspect, the rotation motion determination step further includes a rotation angle determination step. The rotation angle determination step determines a rotation angle of the input device based on a value of the angle. In the output step, the motion data including the rotation angle determined in the rotation angle determination step is output.

In finteenth, eighteenth, twenty-first, and twenty-fourth aspects based on the forteenth, seventeenth, twentieth, and twenty-third aspects, the motion determining program further causes the computer to execute a storage control step. The storage control step stores the acceleration data, sequentially obtained in the data obtaining step, in a memory (30). In the rotation motion determination step, a coordinate point in the two-dimensional coordinate system which is represented by the first acceleration data obtained in the predetermined period, among the acceleration data stored in the memory, is set as the start point; and a coordinate point in the two-dimensional coordinate system which is represented by the last acceleration data obtained in the predetermined period, among the acceleration data stored in the memory, is set as the end point.

In sixteenth, nineteenth, twenty-second, and twenty-fifth aspects based on the finteenth, eighteenth, twenty-first, and twenty-fourth aspects, the acceleration sensor detects an acceleration of the input device in each of three axial directions perpendicular to one another. In the rotation motion determination step, a time period in which acceleration data in a first axial direction of the three axial directions exceeds a predetermined value is set as the predetermined period. The two-dimensional coordinate system has the coordinate axes defined based on components of a second axial direction and a third axial direction of the three axial directions. In the rotation motion determination step, the rotation motion is determined using acceleration data in the second axial direction and the third axial direction which has been obtained first and last in the predetermined period and stored in the memory.

In a twenty-sixth aspect based on the fourteenth aspect, the acceleration sensor detects an acceleration including at least a centrifugal component generated when the input device is swung by a user so as to output acceleration data. In the rotation motion determination step, a coordinate point in the two-dimensional coordinate system which is represented by acceleration data obtained at the start of a period in which an acceleration of the centrifugal component exceeds a threshold value, among the acceleration data obtained in the data obtaining step, is set as the start point; and a coordinate point in the two-dimensional coordinate system which is represented by acceleration data obtained at the end of the period, among the acceleration data obtained in the data obtaining step, is set as the end point.

According to the first aspect, when the user rotates the input device around a predetermined direction as a rotation axis, the rotation motion can be accurately determined. Since the rotation motion given to the input device can be used as an operation input, the variety of operations which can be input to the input device is widened. The determination of the rotation motion only requires some type of acceleration to act upon the input device while changing in accordance with the rotation motion. The rotation motion can be determined using a change in, for example, the acceleration of gravity or an acceleration generated by the user swinging the input device.

According to the fourth aspect, the tendency of the acceleration changing in accordance with the rotation motion can be easily determined using an angle defined by a vector from the origin toward the start point and a vector from the origin toward the end point in the two-dimensional coordinate system.

According to the seventh aspect, when the user performs a composite motion including a plurality of motions, for example, when the user swings while rotating the input device, the direction of the rotation motion of the input device can be determined. Since a composite motion including the rotation motion given to the input device can be used as an operation input, the variety of operations which can be input to the input device is further widened.

According to the tenth aspect, the rotation angle at which the user has rotated the input device can be determined. Since the rotation angle given to the input device can be used as an operation input, the variety of operations which can be input to the input device is further widened.

According to the second, fifth, ninth, and eleventh aspects, the acceleration data representing the start point and the end point can be easily extracted by sequentially storing the acceleration data obtained in a period covering the predetermined period.

According to the third, sixth, ninth, and twelfth aspects, among the acceleration data in the three axial directions perpendicular to one another, the acceleration data in the second and third axial directions in a period in which the acceleration data in the first axial direction shows a value exceeding a predetermined value is used for the determination. Accordingly, the period in which the input device is swung can be determined by a setting such that the acceleration obtained when the user swings the input device has an influence on the first axial direction. As a result, the motion of the input device being rotated by the user can be determined from the start until the end of the swing. When the user performs a composite motion including a plurality of motions, for example, when the user swings while rotating the input device, the direction of the rotation motion of the input device can be determined. Since such a composite motion of the input device can be used as an operation input, the variety of operations which can be input to the input device is further widened.

According to the thirteenth aspect, the acceleration data, which is obtained at the start and at the end of a period in which the acceleration generated when the user swings the input device exceeds a predetermined value, is used for the determination. Therefore, the determination is made possible using acceleration data obtained at the start of the swing and at the end of the swing. As a result, the motion of the input device being rotated by the user can be determined from the start until the end of the swing.

A storage medium having a motion determining program according to example embodiment(s) of the present invention stored thereon provides the same effects as those of the above-described motion determining apparatus.

These and other features, aspects and advantages of example embodiment(s) of the present invention will become more apparent from the following detailed description of example embodiment(s) of the present invention when taken in conjunction with the accompanying drawings.

BRIEF DESCRIPTION OF THE DRAWINGS

FIG. 3 is an isometric view of a controller 7 shown in FIG. 1 seen from the top rear side thereof;

FIG. 7 shows how the controller 7 shown in FIG. 3 is used to perform a game operation;

FIG. 10 is an example of a shift of acceleration data obtained in one of FIG. 9A through FIG. 9D by a leftward swing;

FIG. 17 is a graph illustrating an example of up-down angle UD calculated in accordance with Z-axis direction acceleration data;

FIG. 25 shows exemplary behaviors determined in accordance with the spin parameter S.

DESCRIPTION OF THE PREFERRED EMBODIMENTS

Figure 1:
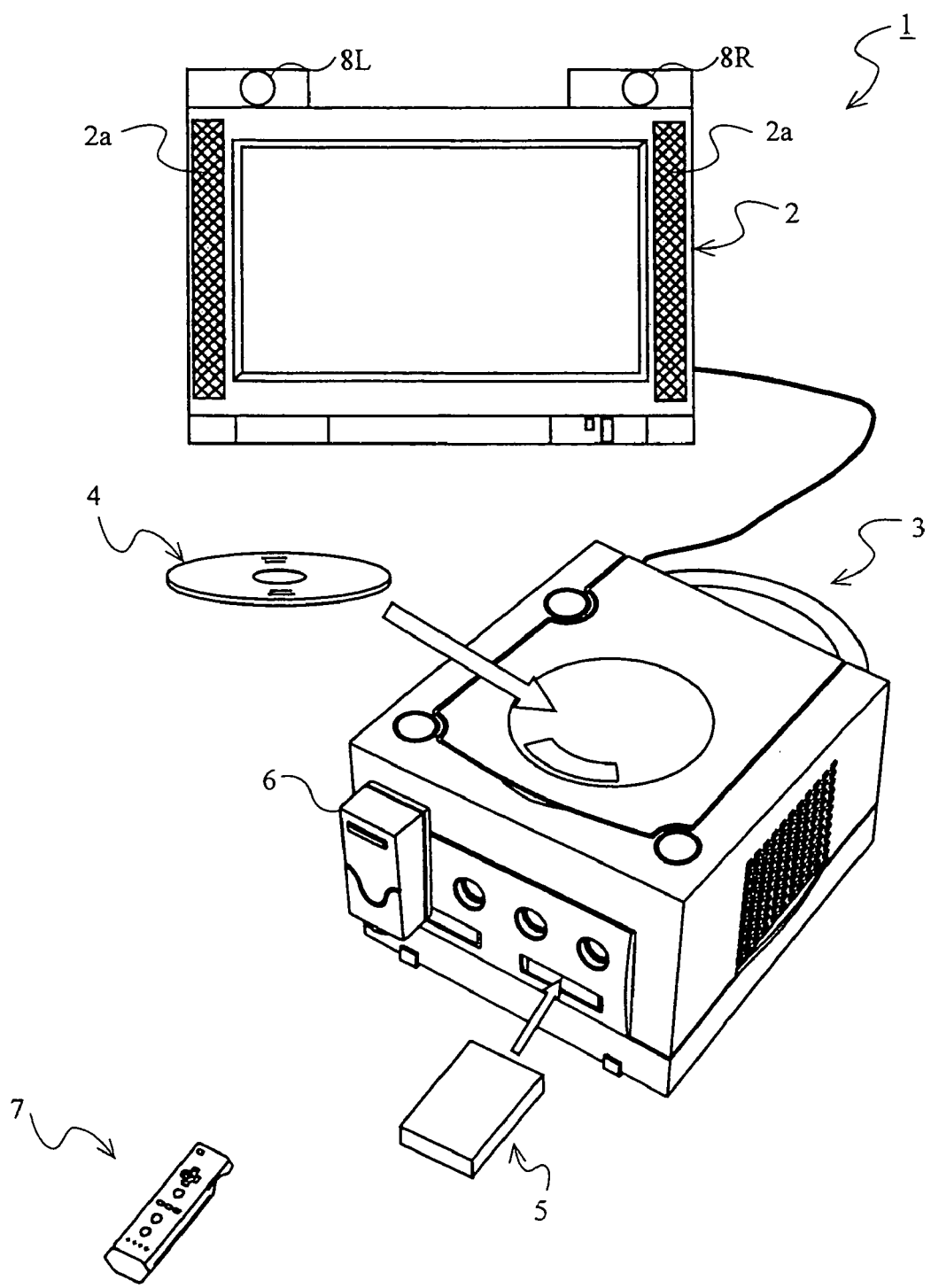
FIG. 1 is an external view of a game system 1 according to an example embodiment of the present invention.

With reference to FIG. 1, a motion determining apparatus according to one example embodiment of the present invention will be described. Hereinafter, in order to give a specific description, a game system 1 using a motion determining apparatus according to example embodiment(s) of the present invention will be used as an example. FIG. 1 is an external view illustrating the game system 1. In the following description, the game system 1 includes an installation type game apparatus corresponding to a motion determining apparatus according to example embodiment(s) of the present invention.

As shown in FIG. 1, the game system 1 includes an installation type game apparatus (hereinafter, referred to simply as a "game apparatus") 3, which is connected to a display (hereinafter, referred to as a "monitor") 2 including a speaker 2a of a home-use TV receiver or the like via a connection cord, and a controller 7 for giving operation information to the game apparatus 3. The game apparatus 3 is connected to a receiving unit 6 via a connection terminal. The receiving unit 6 receives transmission data which is wirelessly transmitted from the controller 7. The controller 7 and the game apparatus 3 are connected to each other by wireless communication. On the game apparatus 3, an optical disc 4 as an example of an exchangeable information storage medium is detachably mounted. The game apparatus 3 includes a power ON/OFF switch, a game processing reset switch, and an OPEN switch for opening a top lid of the game apparatus 3 on a top main surface of the game apparatus 3. When a player presses the OPEN switch, the lid is opened, so that the optical disc 4 is mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the memory card 5 and display the game image on the monitor 2. A player playing with the game apparatus 3 can enjoy the game by operating the controller 7 while watching the game image displayed on the monitor 2.

The controller 7 wirelessly transmits the transmission data from a communication section 75 included therein (described later) to the game apparatus 3 connected to the receiving unit 6, using the technology of, for example, Bluetooth (registered trademark). The controller 7 is operation means for mainly operating a player object appearing in a game space displayed on the monitor 2. The controller 7 includes an operation section having a plurality of operation buttons, a key, a stick and the like. As described later in detail, the controller 7 also includes an imaging information calculation section 74 for taking an image viewed from the controller 7. As an example of an imaging subject of the imaging information calculation section 74, two LED modules (hereinafter, referred to as "markers") 8L and 8R are provided in the vicinity of a display screen of the monitor 2. The markers 8L and 8R each output infrared light forward from the monitor 2. In this embodiment, imaging information by the imaging information calculation section 74 is not used, and therefore the markers 8L and 8R are not absolutely necessary.

Figure 2:
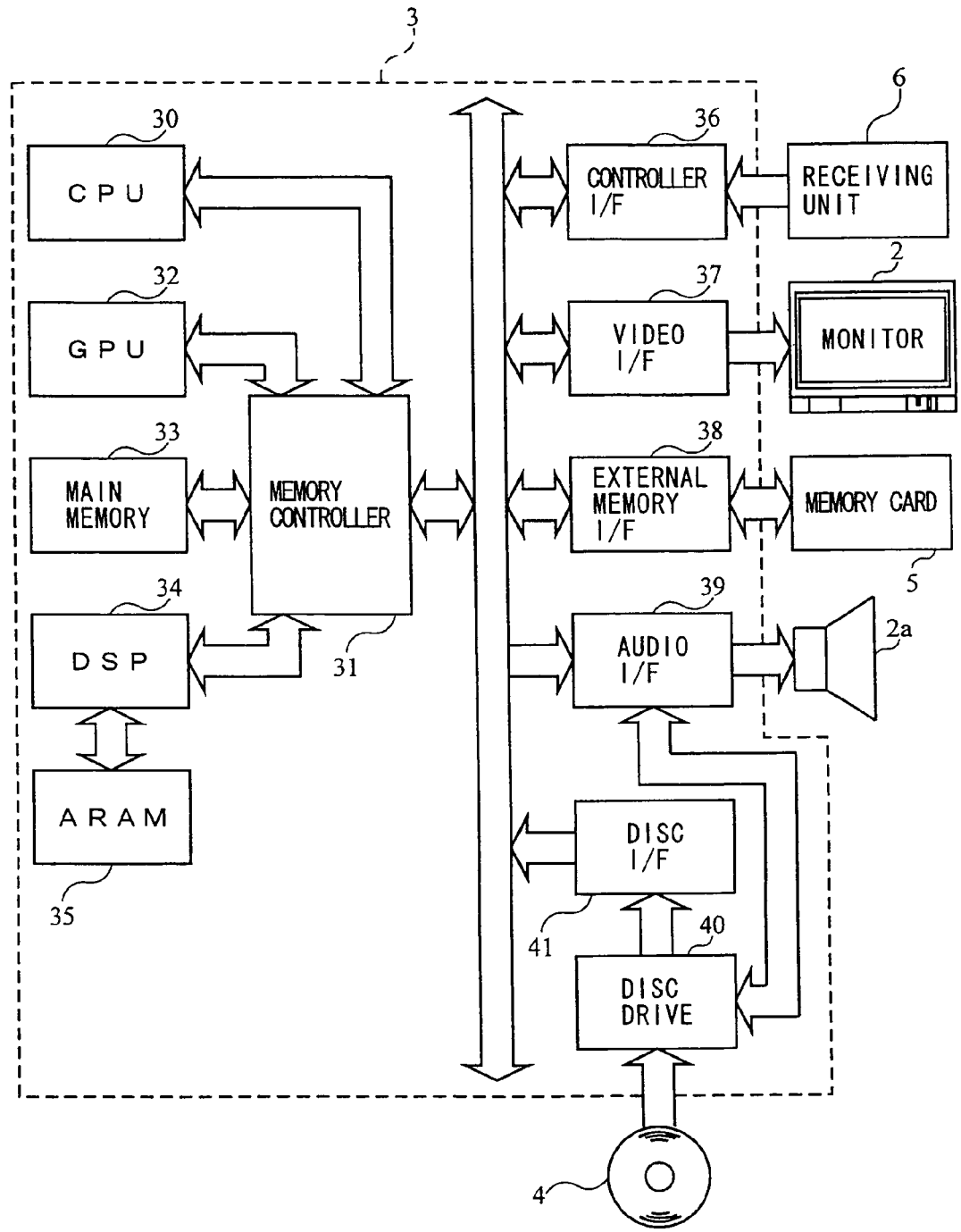
FIG. 2 is a functional block diagram of a game apparatus 3 shown in FIG. 1.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 30 for executing various types of programs. The CPU 30 executes a start program stored in a boot ROM (not shown) to, for example, initialize memories including a main memory 33, and then executes a game program stored on the optical disc 4 to perform game processing or the like in accordance with the game program. The game program stored on the optical disc 4 includes a motion determining program according to example embodiment(s) of the present invention. The CPU 30 also performs motion detection processing for determining a motion of the controller 7 as a part of the game processing. The CPU 30 is connected to a GPU (Graphics Processing Unit) 32, the main memory 33, a DSP (Digital Signal Processor) 34, and an ARAM (Audio RAM) 35 via a memory controller 31. The memory controller 31 is connected to a controller I/F (interface) 36, a video I/F 37, an external memory I/F 38, an audio I/F 39, and a disc I/F 41 via a predetermined bus. The controller I/F 36, the video I/F 37, the external memory I/F 38, the audio I/F 39 and the disc I/F 41 are respectively connected to a receiving unit 6, the monitor 2, the external memory card 5, the speaker 2a and a disc drive 40.

The GPU 32 performs image processing based on an instruction from the CPU 30. The GPU 32 includes, for example, a semiconductor chip for performing calculation processing necessary for displaying 3D graphics. The GPU 32 performs the image processing using a memory dedicated for image processing (not shown) and a part of the storage area of the main memory 33. The GPU 32 generates game image data and a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program read from the optical disc 4 by the CPU 30, various types of data or the like. The game program, the various types of data or the like stored in the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs predetermined processing (for example, storage of the game program or sound data already read). The DSP 34 reads the sound data stored in the ARAM 35 and outputs the sound data to the speaker 2a included in the monitor 2 via the memory controller 31 and the audio I/F 39.

The memory controller 31 comprehensively controls data transfer, and is connected to the various I/Fs described above. The controller I/F 36 includes, for example, four controllers I/F 36a through 36d, and communicably connects the game apparatus 3 to an external device which is engageable via connectors of the controller I/F 36a through 36d. For example, the receiving unit 6 is engaged with such a connector and is connected to the game apparatus 3 via the controller I/F 36. As described above, the receiving unit 6 receives the transmission data from the controller 7 and outputs the transmission data to the CPU 30 via the controller I/F 36. The video I/F 37 is connected to the monitor 2. The external memory I/F 38 is connected to the external memory card 5 and is accessible to a backup memory or the like provided in the external card 5. The audio I/F 39 is connected to the speaker 2a built in the monitor 2, and is connected such that the sound data read by the DSP 34 from the ARAM 35 or sound data directly output from the disc drive 40 is output from the speaker 2a. The disc I/F 41 is connected to the disc drive 40. The disc drive 40 reads data stored at a predetermined reading position of the optical disc 4 and outputs the data to a bus of the game apparatus 3 or the audio I/F 39.

Figure 4:
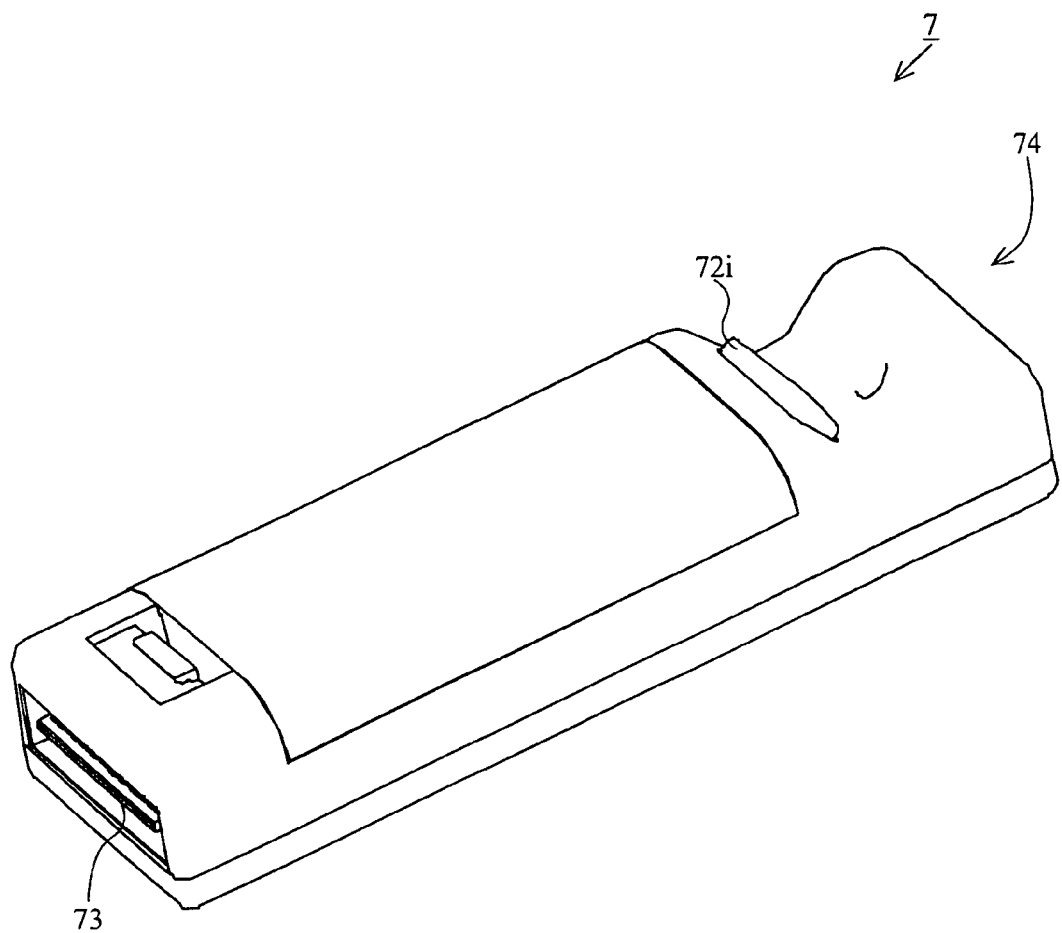
FIG. 4 is an isometric view of the controller 7 shown in FIG. 3 seen from the bottom rear side thereof.

With reference to FIG. 3 and FIG. 4, the controller 7 as an example of the input device according to example embodiment(s) of the present invention will be described. FIG. 3 is an isometric view of the controller 7 seen from the top rear side thereof. FIG. 4 is an isometric view of the controller 7 seen from the bottom rear side thereof.

As shown in FIG. 3 and FIG. 4, the controller 7 includes a housing 71 formed by plastic molding or the like. The housing 71 has a plurality of operation sections 72. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to the four directions represented by the arrows (front, rear, right and left), which are respectively located on cross-shaped projecting portions arranged at an interval of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or a direction in which the cursor is to move.

The cross key 72a is an operation section for outputting an operation signal in accordance with the above-described direction input operation performed by the player, but such an operation section may be provided in another form. For example, the cross key 72a may be replaced with a composite switch including a push switch including ring-shaped four-direction operation section and a center switch provided at the center thereof. Alternatively, the cross key 72a may be replaced with an operation section which includes an inclinable stick projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad. Still alternatively, the cross key 72a may be replaced with an operation section which includes switches representing at least four directions (front, rear, right and left) and outputs an operation signal in accordance with the switch pressed by the player.

Rearward to the cross key 72a on the top surface of the housing 71, a plurality of operation buttons 72b through 72g are provided. The operation buttons 72b through 72g are each an operation section for outputting a respective operation signal when the player presses a head thereof For example, the operation buttons 72b through 72d are assigned functions of an X button, a Y button and a B button. The operation buttons 72e through 72g are assigned functions of a select switch, a menu switch and a start switch, for example. The operation buttons 72b through 72g are assigned various functions in accordance with the game program executed by the game apparatus 3, but this will not be described in detail because the functions are not directly relevant to example embodiment(s) of the present invention. In an exemplary arrangement shown in FIG. 3, the operation buttons!72b through 72d are arranged in a line at the center in the front-rear direction on the top surface of the housing 71. The operation buttons 72e through 72g are arranged in a line in the left-right direction between the operation buttons 72b and 72d. The operation button 72f has a top surface thereof buried in the top surface of the housing 71, so as not to be inadvertently pressed by the player.

Forward to the cross key 72a on the top surface of the housing 71, an operation button 72h is provided. The operation button 72h is a power switch for remote-controlling the power of the game apparatus 3 to be on or off. The operation button 72h also has a top surface thereof buried in the top surface of the housing 71, so as not to be inadvertently pressed by the player.

Rearward to the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to controller 7 that he/she is using. Specifically, when the controller 7 transmits the transmission data to the receiving unit 6, one of the plurality of LEDs corresponding to the controller type is lit up.

On a bottom surface of the housing 71, a recessed portion is formed. As described later in detail, the recessed portion is formed at a position at which an index finger or middle finger of the player is located when the player holds the controller 7. On a rear slope surface of the recessed portion, an operation button 72i is provided. The operation button 72i is an operation section acting as, for example, an A button. The operation button 72i is used, for example, as a trigger switch in a shooting game, or for attracting attention of a player object to a predetermined object.

On a front surface of the housing 71, an imaging element 743 (see FIG. 5B) included in the imaging information calculation section 74 is provided. The imaging information calculation section 74 is a system for analyzing image data taken by the controller 7 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. On a rear surface of the housing 71, a connector 73 is provided. The connector 73 is, for example, a 32-pin edge connector, and is used for engaging and connecting the controller 7 with a connection cable. Example embodiment(s) of the present invention does not use information from the imaging information calculation section 74, and thus the imaging information calculation section 74 will not be described in further detail.

In order to give a specific description, a coordinate system which is set for the controller 7 will be defined. As shown in FIG. 3 and FIG. 4, X-, Y- and Z-axis directions perpendicular to one another are defined for the controller 7. Specifically, the longitudinal direction of the housing 71, i.e., the front-rear direction of the controller 7, is set as a Z-axis direction. A direction toward the front surface of the controller 7 (the surface having the imaging information calculation section 74) is set as a positive Z-axis direction. The up-to-down direction of the controller 7 is set as a Y-axis direction. A direction toward the top surface of the controller housing 71 (the surface having the cross key 72a and the like) is set as a positive Y-axis direction. The left-right direction of the controller 7 is set as an X-axis direction. A direction toward a left surface of the housing 71 (the surface which is not shown in FIG. 3 but is shown in FIG. 4) is set as a positive X-axis direction.

Figure 5A:
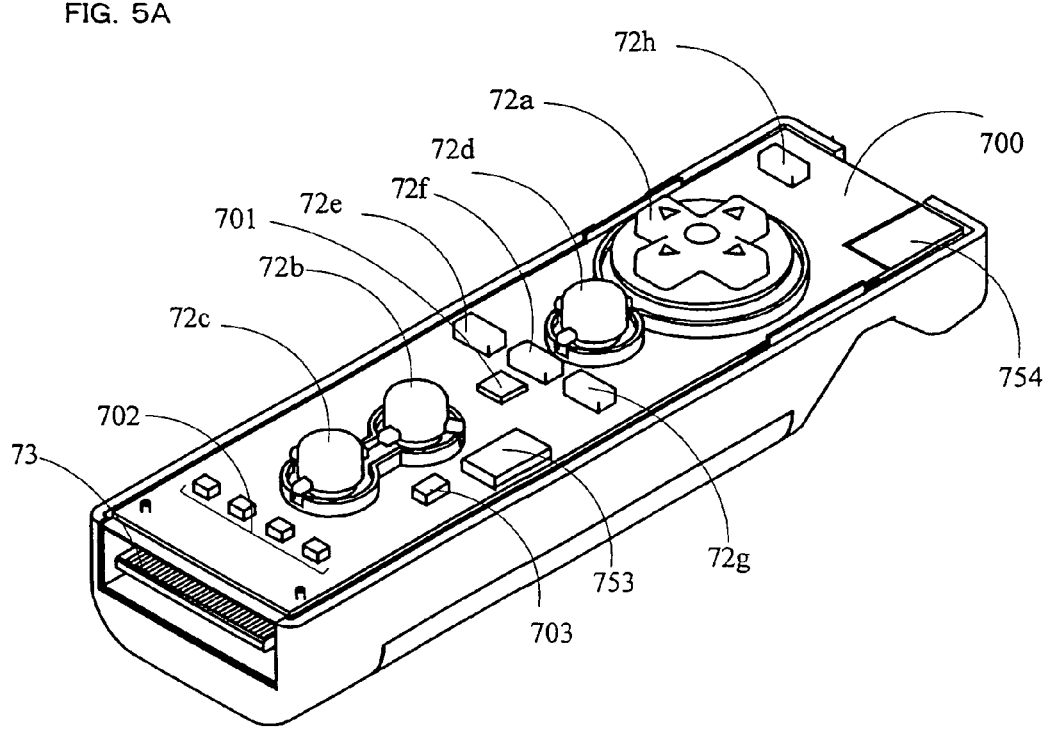
FIG. 5A is an isometric view of the controller 7 shown in FIG. 3 in the state where an upper casing is removed.
Figure 5B:
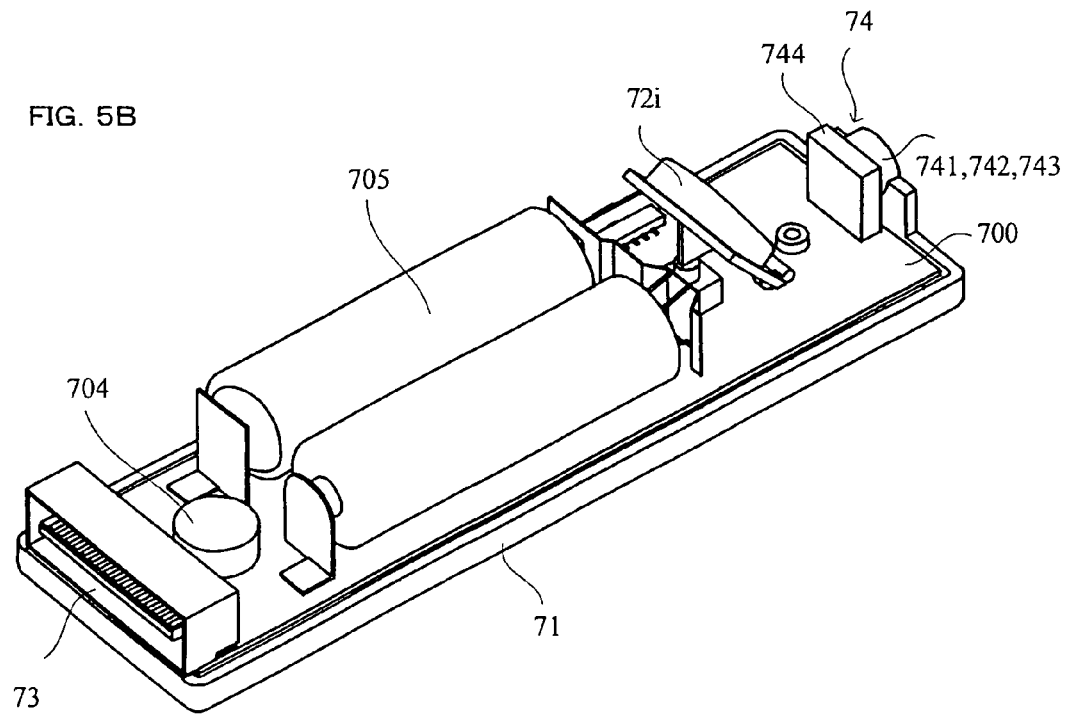
FIG. 5B is an isometric view of the controller 7 shown in FIG. 3 in the state where a lower casing is removed.

With reference to FIG. 5A and FIG. 5B, an internal structure of the controller 7 will be described. FIG. 5A is an isometric view illustrating a state where an upper casing (a part of the housing 71) of the controller 7 is removed. FIG. 5B is an isometric view illustrating a state where a lower casing (a part of the housing 71) of the controller 7 is removed. FIG. 5B shows a reverse side of a substrate 700 shown in FIG. 5A.

As shown in FIG. 5A, the substrate 700 is fixed inside the housing 71. On a top main surface of the substrate 700, the operation buttons 72a through 72h, an acceleration sensor 701, the LEDs 702, a quartz oscillator 703, a wireless module 753, an antenna 754 and the like are provided. These elements are connected to a microcomputer 751 (see FIG. 6) via lines (not shown) formed on the substrate 700 and the like. The acceleration sensor 701 detects and outputs acceleration, which can be used to calculate inclination, oscillation and the like in a three-dimensional space in which the controller 7 is located.

Figure 6:
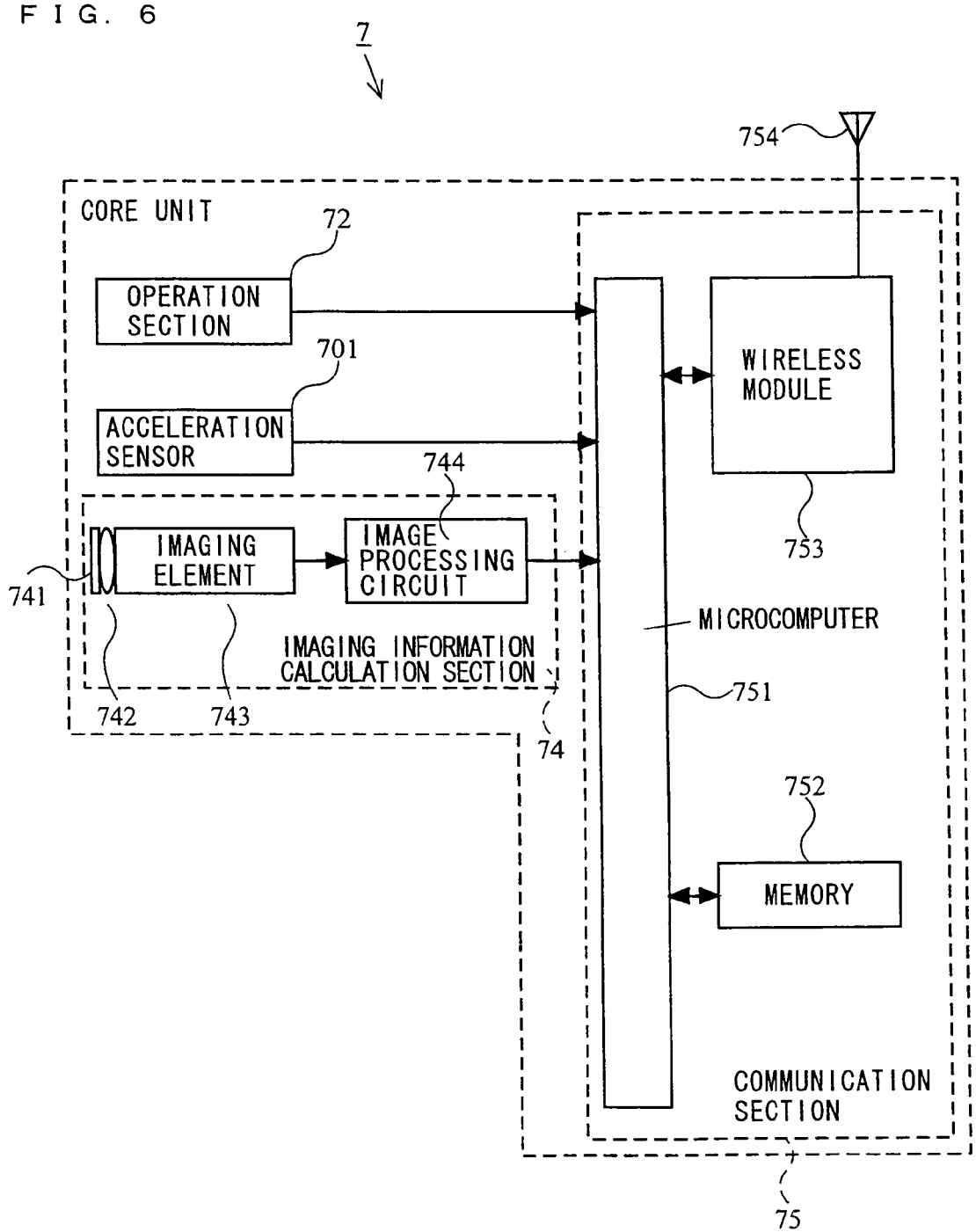
FIG. 6 is a block diagram illustrating a structure of the controller 7 shown in FIG. 3.

As shown in FIG. 6, the controller 7 preferably includes a three-axis, linear acceleration sensor 701 that detects linear acceleration in three directions, i.e., the up/down direction (Y-axis shown in FIG. 3), the left/right direction (X-axis shown in FIG. 3), and the forward/backward direction (Z-axis shown in FIG. 3). Alternatively, a two axis linear accelerometer that only detects linear acceleration along each of the X-axis and Y-axis (or other pair of axes) may be used in another embodiment depending on the type of control signals desired. As a non-limiting example, the three-axis or two-axis linear accelerometer 701 may be of the type available from Analog Devices, Inc. or STMicroelectronics N.V. Preferably, the acceleration sensor 701 is an electrostatic capacitance or capacitance-coupling type that is based on silicon micromachined MEMS (microelectromechanical systems) technology. However, any other suitable accelerometer technology (e.g., piezoelectric type or piezoresistance type) now existing or later developed may be used to provide the three-axis or two-axis linear acceleration sensor 701.

As one skilled in the art understands, linear accelerometers, as used in acceleration sensor 701, are only capable of detecting acceleration along a straight line corresponding to each axis of the acceleration sensor. In other words, the direct output of the acceleration sensor 701 is limited to signals indicative of linear acceleration (static or dynamic) along each of the two or three axes thereof. As a result, the acceleration sensor 701 can not directly detect movement along a non-linear (e.g. arcuate) path, rotation, rotational movement, angular displacement, tilt, position, attitude or any other physical characteristic.

However, through additional processing of the linear acceleration signals output from the acceleration sensor 701, additional information relating to the controller 7 can be inferred or calculated (i.e., determined), as one skilled in the art will readily understand from the description herein. For example, by detecting static, linear acceleration (i.e., gravity), the linear acceleration output of the acceleration sensor 701 can be used to determine tilt of the object relative to the gravity vector by correlating tilt angles with detected linear acceleration. In this way, the acceleration sensor 701 can be used in combination with the micro-computer 751 (or another processor) to determine tilt, attitude or position of the controller 7. Similarly, various movements and/or positions of the controller 7 can be calculated through processing of the linear acceleration signals generated by the acceleration sensor 701 when the controller 7 containing the acceleration sensor 701 is subjected to dynamic accelerations by, for example, the hand of a user, as will be explained in detail below. In another embodiment, the acceleration sensor 701 may include an embedded signal processor or other type of dedicated processor for performing any desired processing of the acceleration signals output from the accelerometers therein prior to outputting signals to micro-computer 751. For example, the embedded or dedicated processor could convert the detected acceleration signal to a corresponding tilt angle (or other desired parameter) when the acceleration sensor is intended to detect static acceleration (i.e., gravity).

The communication section 75 including the wireless module 753 and the antenna 754 allows the controller 7 to act as a wireless controller. The quartz oscillator 703 generates a reference clock of the microcomputer 751 described later.

As shown in FIG. 5B, at a front edge of a bottom main surface of the substrate 700, the image information calculation section 74 is provided. The image information calculation section 74 includes an infrared filter 741, a lens 742, the imaging element 743 and an image processing circuit 744 located in this order from the front surface of the controller 7. These elements are attached to the bottom main surface of the substrate 700. At a rear edge of the bottom main surface of the substrate 700, the connector 73 is attached. The operation button 72i is attached on the bottom main surface of the substrate 700 rearward to the image information calculation section 74, and cells 705 are accommodated rearward to the operation button 72i. On the bottom main surface of the substrate 700 between the cells 705 and the connector 73, a vibrator 704 is attached. The vibrator 704 may be, for example, a vibration motor or a solenoid. The controller 7 is vibrated by an actuation of the vibrator 704, and the vibration is conveyed to the player holding the controller 7. Thus, a so-called vibration-responsive game is realized.

With reference to FIG. 6, the internal structure of the controller 7 will be described. FIG. 6 is a block diagram showing the structure of the controller 7.

The imaging information calculation section 74 includes the infrared filter 741, the lens 742, the imaging element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the imaging element 743. The imaging element 743 is a solid-state imaging device such as, for example, a CMOS sensor or a CCD. The imaging element 743 takes an image of the infrared light collected by the lens 742. Accordingly, the imaging element 743 takes an image of only the infrared light which has passed through the infrared filter 741 and generates image data. The image data generated by the imaging element 743 is processed by the image processing circuit 744. Specifically, the image processing circuit 744 processes the image data obtained from the imaging element 743, detects an area thereof having a high brightness, and outputs processing result data representing the detected coordinate position and size of the area to the communication section 75. The imaging information calculation section 74 is fixed to the housing 71 of the controller 7. The imaging direction of the imaging information calculation section 74 can be changed by changing the direction of the housing 71.

As described above, the acceleration sensor 701 detects and outputs the acceleration in the form of components of three axial directions of the controller 7, i.e., the components of the up-down direction (Y-axis direction), the left-right direction (X-axis direction), and the front-rear direction (the Z-axis direction) of the controller 7. Data representing the acceleration as the components of the three axial directions detected by the acceleration sensor 701 is output to the communication section 75. Based on the acceleration data which is output from the acceleration sensor 701, a motion of the controller 7 can be determined. As the acceleration sensor 701, a sensor for detecting an acceleration in two of the three axial directions may be used depending on the data needed for a particular application.

The communication section 75 includes the microcomputer 751, a memory 752, the wireless module 753 and the antenna 754. The microcomputer 751 controls the wireless module 753 for transmitting the transmission data while using the memory 752 as a storage area during processing.

Data from the controller 7 including an operation signal (key data) from the operation section 72, acceleration signals in the three axial directions (X-axis, Y-axis and Z-axis direction acceleration data) from the acceleration sensor 701, and the processing result data from the imaging information calculation section 74 are output to the microcomputer 751. The microcomputer 751 temporarily stores the input data (key data, X-axis, Y-axis and Z-axis direction acceleration data, and the processing result data) in the memory 752 as the transmission data which is to be transmitted to the receiving unit 6. The wireless transmission from the communication section 75 to the receiving unit 6 is performed at a predetermined time interval. Since game processing is generally performed at a cycle of 1/60 sec., the wireless transmission needs to be performed at a cycle of a shorter time period. Specifically, the game processing unit is 16.7 ms (1/60 sec.), and the transmission interval of the communication section 75 structured using the Bluetooth (registered trademark) technology is 5 ms. At the transmission timing to the receiving unit 6, the microcomputer 751 outputs the transmission data stored in the memory 752 as a series of operation information to the wireless module 753. The wireless module 753 uses, for example, the Bluetooth (registered trademark) technology to radiate the operation information from the antenna 754 as a carrier wave signal of a predetermined frequency. Thus, the key data from the operation section 72, the X-axis, Y-axis and Z-axis direction acceleration data from the acceleration sensor 701, and the processing result data from the imaging information calculation section 74 are transmitted from the controller 7. The receiving unit 6 of the game apparatus 3 receives the carrier wave signal, and the game apparatus 3 demodulates or decodes the carrier wave signal to obtain the series of operation information (the key data, the X-axis, Y-axis and Z-axis direction acceleration data, and the processing result data). Based on the obtained operation information and the game program, the CPU 30 of the game apparatus 3 performs the game processing. In the case where the communication section 75 is structured using the Bluetooth (registered trademark) technology, the communication section 75 can have a function of receiving transmission data which is wirelessly transmitted from other devices.

Before describing specific processing performed by the game apparatus 3, an overview of a game played by the game apparatus 3 will be described. As shown in FIG. 7, the entire controller 7 is small enough to be held by one hand of an adult or even a child. In order to play the game with a game system 1 using the controller 7, the player holds the controller 7 with one hand (for example, right hand) such that the front surface of the controller 7 is directed forward. For example, the player holds the controller 7 with his/her thumb on the left surface thereof, with his/her palm on the top surface thereof, and with his/her index finger, middle finger, third finger and fourth finger on the bottom surface thereof, such that the front surface thereof is directed forward, i.e., away from himself/herself. The player holds the controller 7 as if he/she was holding a tennis racket.

The player swings his/her arm holding the controller 7 from his/her right to left (hereinafter, such a motion will be referred to as a "leftward swing" or swings his/her arm holding the controller 7 from his/her left to right (hereinafter, such a motion will be referred to as a "rightward swing") based on the game image displayed on the monitor 2. By such a swinging motion, the player gives operation information (specifically, X-axis, Y-axis and Z-axis direction acceleration data) to the game apparatus 3 from the controller 7. In addition to the above-mentioned leftward swing and rightward swing, the player can, for example, perform a leftward swing or a rightward swing while swinging up the controller 7, swinging down the controller 7, or twisting the controller 7 left or right. By such a motion, the player can give various types of X-axis, Y-axis and Z-axis direction acceleration data to the game apparatus 3 from the controller 7.

Figure 8:
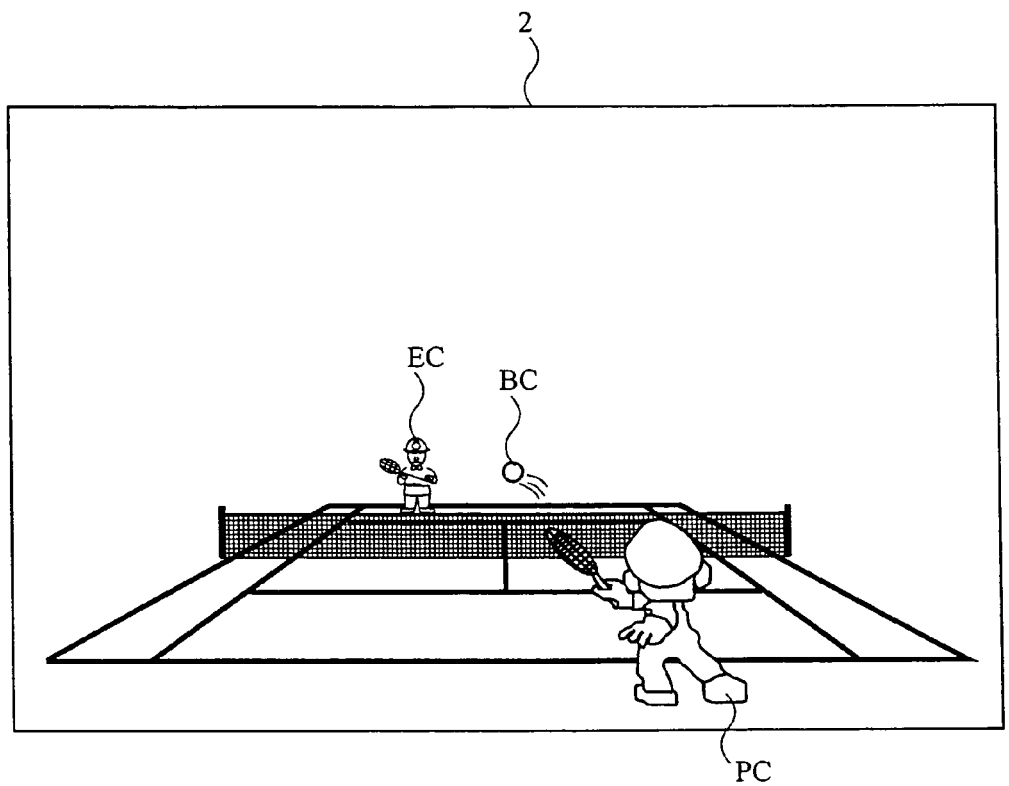
FIG. 8 shows an example of a tennis game image displayed on a monitor 2 in accordance with X-, Y- and Z-axis direction acceleration data received from the controller 7 shown in FIG. 3.
Figure 9A:
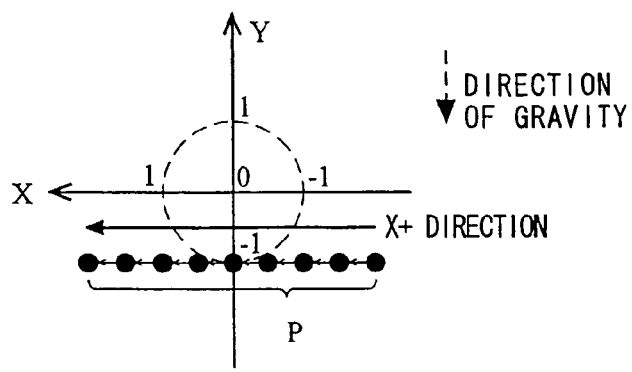
FIG. 9A through FIG. 9D are exemplary graphs, X and Y axes of which each represent whether an acceleration represented by each of the X- and Y-axis direction acceleration data is positive or negative as well as the magnitude of such an acceleration.
Figure 9B:
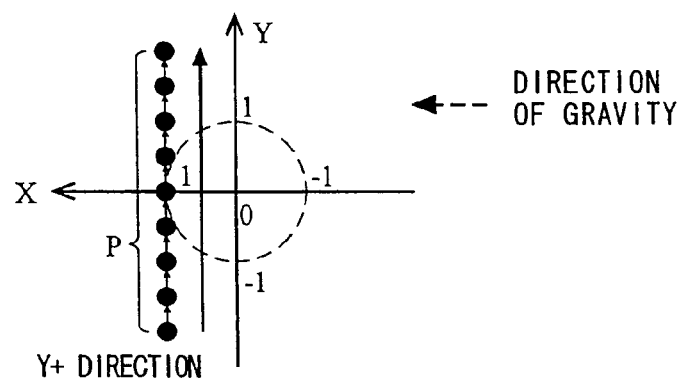
Figure 9C:
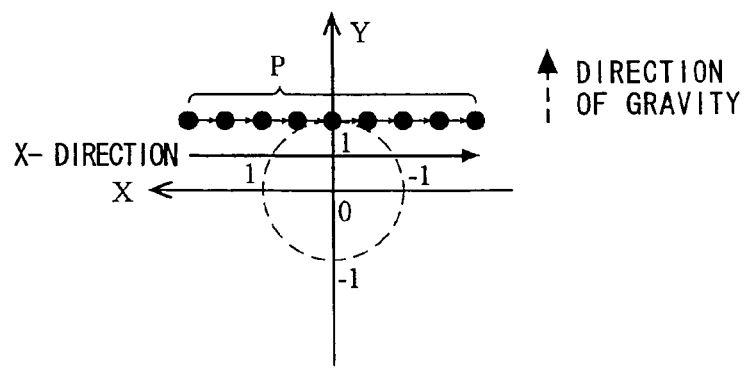
Figure 9D:
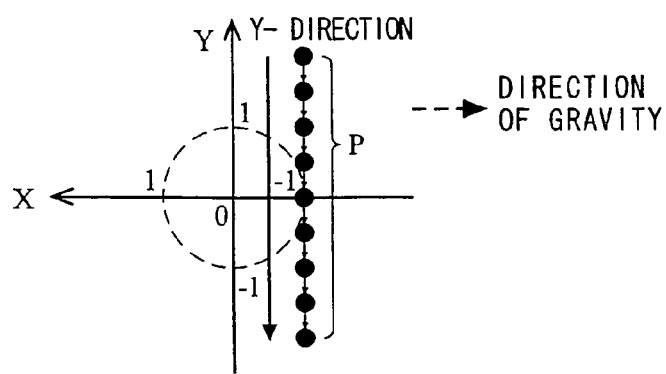

As shown in FIG. 8, a tennis game or the like is displayed on the monitor 2 in accordance with the X-axis, Y-axis and Z-axis direction acceleration data received from the controller 7. Specifically, a tennis court set in a virtual game space is displayed on the monitor 2 as a three-dimensional game image. In the virtual game space, a player character PC to be operated by the player, an opponent character EC acting as an opponent to the player character PC, a ball character BC representing a tennis ball moving on the tennis court, and the like are located. Such characters are displayed on the monitor 2. Hereinafter, motion determining processing according to example embodiment(s) of the present invention will be described. In order to give a specific description, it is assumed that a game program for the tennis game is stored on the optical disc 4 and that the CPU 30 performs the motion determining processing for determining a motion of the controller 7 during the tennis game.

The player character PC holds a tennis racket and is located on the tennis court which is set in the virtual game space. In accordance with a motion of the player of swinging the controller 7, an animation of the player character PC of swinging the tennis racket is displayed. When the player character PC hits back the ball character BC flying toward the player character PC with the tennis racket, the ball character BC hit by the tennis racket flies toward the court of the opponent character EC. Namely, by the player holding the controller 7 performing a motion of swinging the controller 7, the player character PC is displayed as performing a motion of swinging the tennis racket in a similar manner. The player can experience a virtual sports game as if he/she was playing tennis with a tennis racket.

In the case where the player character PC represents a right-handed tennis player, when the player performs a "leftward swing" of the controller 7, the player character PC swings the tennis racket forehand. When the player performs a "rightward swing" of the controller 7, the player character PC swings the tennis racket backhand. Namely, the player character PC swings the tennis racket in the same direction as the player swings the controller 7.

In accordance with the timing or velocity at which the player swings the controller 7, the flying direction or velocity of the ball character BC hit by the tennis racket swung by the player character PC changes. By the player performing a leftward swing or a rightward swing while swinging up or swinging down the controller 7, the height of the flying trajectory of the ball character BC changes. By the player performing a leftward swing or a rightward swing while twisting the controller 7 left or right, the player character PC can be displayed as hitting back the ball character BC with a so-called topspin or backspin toward the opponent character EC. As described later in detail, such motions can be distinguished by the X-axis, Y-axis and Z-axis direction acceleration data which is output from the controller 7. In this manner, a tennis game reflecting various motions given by the player to the controller 7 can be represented.

Now, a method for determining whether or not the controller 7 is being swung will be described. When the Z-axis direction acceleration data represents a positive Z-axis direction value exceeding a threshold value, the game apparatus 3 determines that the player is swinging the controller 7. For example, when the controller 7 is in a still state, the acceleration sensor 701 never detects an acceleration exceeding the acceleration of gravity of 9.8 m/s$^2$. When the player holding the controller 7 swings his/her arm as described above, the front edge of the controller 7 moves in an arc-shaped trajectory. Therefore, the acceleration in the positive Z-axis direction (see FIG. 3) is detected by the influence of the centrifugal force. In this embodiment, a threshold value equal to or greater than the acceleration of gravity is set, and when the Z-axis direction acceleration data represents an acceleration exceeding the threshold value, it is determined that the player is swinging the controller 7.

With reference to FIG. 9A through FIG. 9D, when it is determined that the player is swinging the controller 7, a direction in which the player is swinging the controller 7 (swinging direction) is determined by a method described below using the X- and Y-axis direction acceleration data. FIG. 9A through FIG. 9D are exemplary graphs, X and Y axes of which each represent whether an acceleration represented by each of the X- and Y-axis direction acceleration data is positive or negative as well as the magnitude of such an acceleration. The accelerations represented by the X- and Y-axis direction acceleration data simultaneously obtained at a predetermined time interval (for example, every 5 ms) are sequentially plotted in the X-Y coordinate system. In FIG. 9A through FIG. 9D, points P represent the accelerations represented by the X- and Y-axis direction acceleration data simultaneously obtained. The arrow beside the points P represents the order in which the data is obtained. The origin ((X, Y)=(0, 0)) represents the value of the acceleration data in the state where no acceleration including the acceleration of gravity acts upon the acceleration sensor 701. The numerical value "1" (corresponding to the position indicated by the dashed circle) represents the magnitude of the acceleration of gravity.

When the player swings the controller 7, the controller 7 is accelerated at the start of the swing and decelerated at the end of the swing. Accordingly, at the start of the swing, the controller 7 is provided with an acceleration in the same direction as the swing. Then, the magnitude of the acceleration gradually decreases. At the end of the swing, the controller 7 is provided with an acceleration in the opposite direction to the swing. In general, an acceleration vector (or information on whether the acceleration is positive or negative) which is output from the acceleration sensor 701 is exactly opposite to the acceleration direction of the controller 7. Accordingly, at the start of the swing, the acceleration sensor 701 detects an acceleration in the opposite direction to the swing. Then, the magnitude of the acceleration gradually decreases. At the end of the swing, the acceleration sensor 701 detects an acceleration in the same direction as the swing.

For example, when the controller 7 is accelerated in a horizontal leftward swing with the top surface thereof directed upward (i.e., when the acceleration direction of the controller 7 is the positive X-axis direction), the acceleration sensor 701 provides an acceleration vector in a negative X-axis direction. In the X-Y coordinate system in which the accelerations represented by the X- and Y-axis direction data simultaneously obtained during the swing are plotted, the accelerations show a negative value in the X-axis direction at the start of the swing because the controller 7 is accelerated. Toward the end of the swing, the accelerations are plotted in the positive X-axis direction because the controller 7 is decelerated. In addition, the acceleration sensor 701 is constantly acted upon by the acceleration of gravity. Therefore, the acceleration sensor 701 detects an acceleration of magnitude "1" in a vertical direction (in this case, in a negative Y-axis direction). Accordingly, when the player performs a horizontal leftward swing of the controller 7 with the top surface thereof directed upward, points P are sequentially plotted from a negative value to a positive value in the X-axis direction (in the X+direction) with the value in the Y-axis direction fixed at "−1" (see FIG. 9A).

When the controller 7 is accelerated in a horizontal leftward swing with the top surface thereof directed at 90 degrees leftward with respect to the player (i.e., when the acceleration direction of the controller 7 is the positive Y-axis direction), the acceleration sensor 701 provides an acceleration vector in the negative Y-axis direction. In the X-Y coordinate system in which the accelerations represented by the X- and Y-axis direction data simultaneously obtained during the swing are plotted, the accelerations show a negative value in the Y-axis direction at the start of the swing because the controller 7 is accelerated. Toward the end of the swing, the accelerations are plotted in the positive Y-axis direction because the controller 7 is decelerated. In addition, the acceleration sensor 701 is constantly acted upon by the acceleration of gravity. Therefore, the acceleration sensor 701 detects an acceleration of magnitude "1" in the vertical direction (in this case, in the positive X-axis direction). Accordingly, when the player performs a horizontal leftward swing of the controller 7 with the top surface thereof directed at 90 degrees leftward with respect to the player, points P are sequentially plotted from a negative value to a positive value in the Y-axis direction (in the Y+direction) with the value in the X-axis direction fixed at "+1" (see FIG. 9B).

When the controller 7 is accelerated in a horizontal leftward swing with the top surface thereof directed downward (i.e., when the acceleration direction of the controller 7 is the negative X-axis direction), the acceleration sensor 701 provides an acceleration vector in the positive X-axis direction. In the X-Y coordinate system in which the accelerations represented by the X- and Y-axis direction data simultaneously obtained during the swing are plotted, the accelerations shows a positive value in the X-axis direction at the start of the swing because the controller 7 is accelerated. Toward the end of the swing, the accelerations are plotted in the negative X-axis direction because the controller 7 is decelerated. In addition, the acceleration sensor 701 is constantly acted upon by the acceleration of gravity. Therefore, the acceleration sensor 701 detects an acceleration of magnitude "1" in the vertical direction (in this case, in the positive Y-axis direction). Accordingly, when the player performs a horizontal leftward swing of the controller 7 with the top surface thereof directed downward, points P are sequentially plotted from a positive value to a negative value in the X-axis direction (in the X-direction) with the value in the Y-axis direction fixed at "+1" (see FIG. 9C).

When the controller 7 is accelerated in a horizontal leftward swing with the top surface thereof directed at 90 degrees rightward with respect to the player (i.e., when the acceleration direction of the controller 7 is the negative Y-axis direction), the acceleration sensor 701 provides an acceleration vector in the positive Y-axis direction. In the X-Y coordinate system in which the accelerations represented by the X- and Y-axis direction data simultaneously obtained during the swing are plotted, the accelerations show a positive value in the Y-axis direction at the start of the swing because the controller 7 is accelerated. Toward the end of the swing, the accelerations are plotted in the negative Y-axis direction because the controller 7 is decelerated. In addition, the acceleration sensor 701 is constantly acted upon by the acceleration of gravity. Therefore, the acceleration sensor 701 detects an acceleration of magnitude "1" in the vertical direction (in this case, in the negative X-axis direction). Accordingly, when the player performs a horizontal leftward swing of the controller 7 with the top surface thereof directed at 90 degrees rightward with respect to the player, points P are sequentially plotted from a positive value to a negative value in the Y-axis direction (in the Y-direction) with the value in the X-axis direction fixed at "−1" (see FIG. 9D).

As described above, when the player performs a leftward swing of the controller 7, a direction in which the acceleration obtained from the X- and Y-axis direction acceleration data shifts (shifting direction) varies in accordance with the direction of the controller 7 held by the player. However, as is clear from FIG. 9A through FIG. 9D, when the player performs a leftward swing of the controller 7, the points P are all plotted clockwise around the origin of the X-Y coordinate system. It is clear that when the player performs a rightward swing of the controller 7, the shifting direction of acceleration is opposite; i.e., the points P are all plotted counterclockwise around the origin of the X-Y coordinate system. This means that by calculating the direction in which the points P are circulated with respect to the origin of the X-Y coordinate system (circulation direction of the points P), the swinging direction of the controller 7 provided by the player (moving direction of the controller 7) can be determined. The relationship between the circulation direction of the points P and the swinging direction of the controller 7 varies in accordance with the setting of the coordinate axes, the characteristics of the acceleration sensor, the setting of the X-Y coordinate system and the like, and may be adjusted in accordance with such settings as necessary. Specifically, the swinging direction of the controller 7 can be accurately determined by analyzing the shifting direction of the acceleration data with respect to the direction of acceleration of gravity based on the obtained acceleration data (represented by the dashed arrow in FIG. 9A through FIG. 9D).

In actuality, however, the points P plotted in the X-Y coordinate system draw a complicated curve as shown in FIG. 10 by the influence of a backswing performed by the player before swinging the controller 7 as intended, a twist, or the like. FIG. 10 shows an example of the plotted points P obtained when the player performs a leftward swing. At the start of the swing, the plotted points P show a counterclockwise shift (points P1 through P3; shift L) and then show a clockwise shift (points P3 through P10; shift R). If the swinging direction of the controller 7 is determined in the middle of shift L, the swinging direction is determined as rightward. Shift L is a data group having a relatively small magnitude of acceleration. This is because the backswing is weak. Shift L is almost radial from the origin of the X-Y coordinate system. This is because the controller 7 is swung in a different direction from the leftward swing or the rightward swing. Such a data group having a relatively small magnitude of acceleration and showing a shift which is almost radial from the origin of the X-Y coordinate system is considered to have a low reliability for determining the swinging direction. The swinging direction can be accurately determined by using a data group having a relatively large magnitude of acceleration and showing a shift which is close to a circle around the origin of the X-Y coordinate system, for example, shift R. In other words, in order to determine the swinging direction, data having a larger magnitude of acceleration and data showing a shift which is closer to a circle around the origin of the X-Y coordinate system is more reliable.

Figure 11:
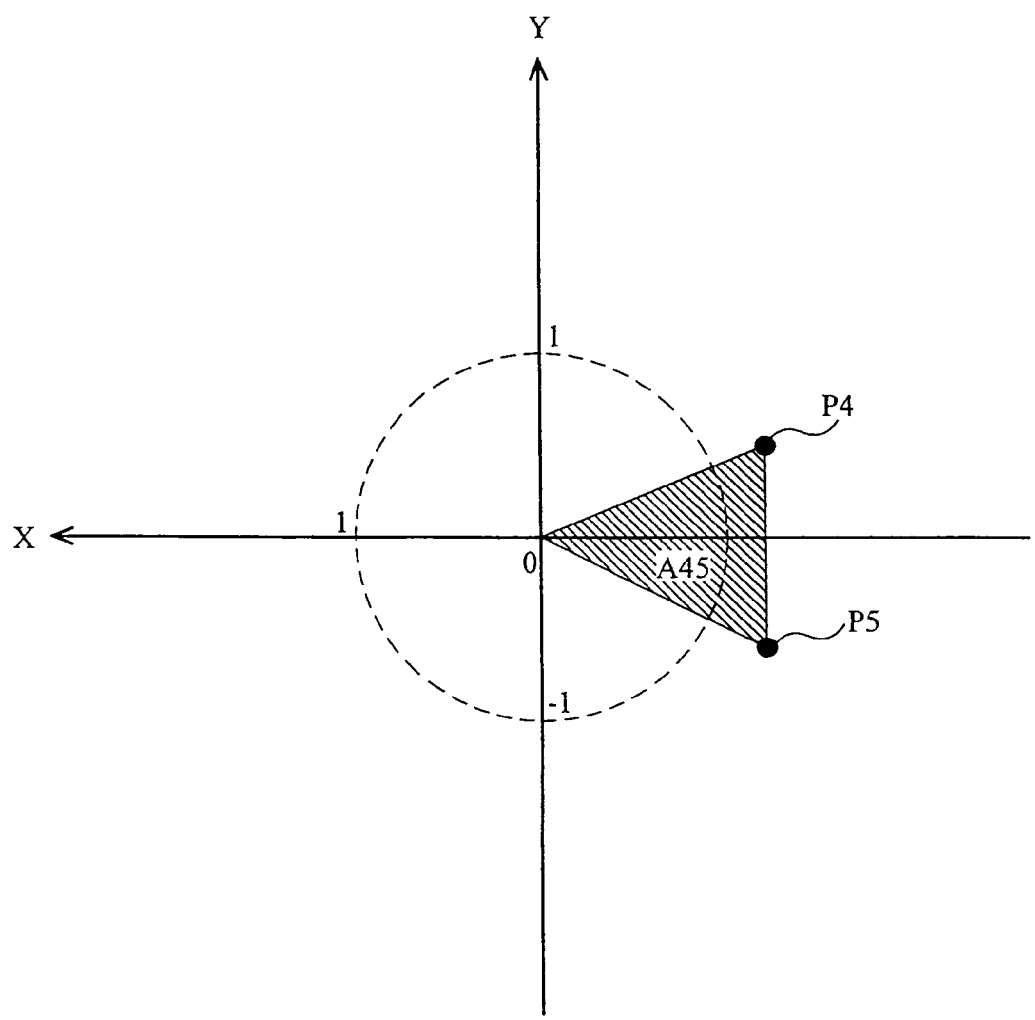
FIG. 11 shows a triangle area A45 defined by straight lines connecting points P4 and P5 which are continuous in a time series manner and the origin shown in FIG. 10.

The above-described reliability is represented by an area of a triangle defined by two pieces of acceleration data which are continuous in a time series manner and the origin of the X-Y coordinate system. For example, as shown in FIG. 11, a triangle area A45 defined by straight lines connecting points P4 and P5 which are continuous in a time series manner and the origin is used. Where the points P represent a larger magnitude of acceleration, the triangle area A45 is larger. Where the points P show a shift closer to a circle around the origin, the triangle area A45 is larger. In this manner, the reliability can be represented by the triangle area A45.

Figure 12:
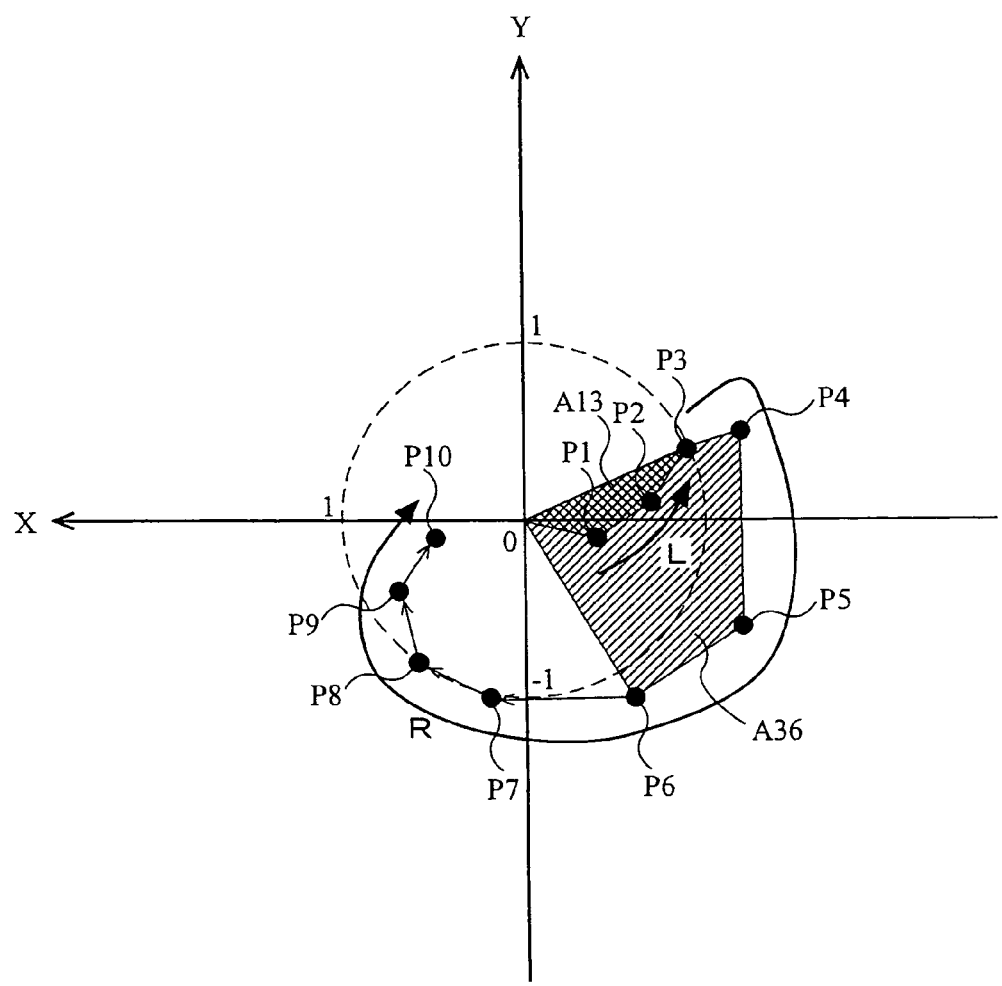
FIG. 12 shows an area A13 obtained by accumulating triangles defined by points P1 through P3 which are continuous in a time series manner and the origin shown in FIG. 10 and an area A36 obtained by accumulating triangles defined by points P3 through P6 which are continuous in a time series manner and the origin shown in FIG. 10.

FIG. 12 shows an area A13 of a region relating to points P1 through P3 shown in FIG. 10 which are continuous in a time series manner, and an area A36 of a region relating to points P3 through P6 shown in FIG. 10 which are continuous in a time series manner. More specifically, the region having the area A13 is obtained by accumulating triangles each defined by the origin and two adjacent points among points P1 through P3. The region having the area A36 is obtained by accumulating triangles each defined by the origin and two adjacent points among points P3 through P6. The area A13 overlaps a part of the area A36. As shown in FIG. 12, the area A13 is an accumulated area of the triangles calculated using the points P1 through P3 representing a counterclockwise shift with respect to the origin. The area A36 is an accumulated area of the triangles calculated using the points P3 through P6 representing a clockwise shift with respect to the origin. As is clear from FIG. 12, the area A13 is significantly smaller than the area A36. In this embodiment, the areas of triangles defined by the points P representing a clockwise shift and the areas of triangles defined by the points P representing a counterclockwise shift are each accumulated in a time series manner. When one of the accumulated values exceeds a threshold value, the swinging direction of the controller 7 is determined based on whether the points P defining the triangles used for forming the exceeding accumulated value show a clockwise shift or a counterclockwise shift. In this manner, the swinging direction can be accurately determined by while eliminating the influence of the data having a low reliability. It is considered that the swinging direction can be determined more accurately by analyzing all the points P from the start until the end of the swing. In this embodiment, the threshold value is used in order to determine the swinging direction at an earlier stage of the swinging motion.

Now, a velocity at which the player swings the controller 7 (swinging velocity) is determined as follows. When the player swings the controller 7 at a high velocity, the time period from the acceleration to the deceleration is relatively short. When the player swings the controller 7 at a low velocity, the time period from the acceleration to the deceleration is relatively long. Where the player swings the controller 7 with the same length of stroke, the interval between the points P plotted in the X-Y coordinate system (hereinafter, occasionally referred to as a "data interval") is larger as the player swings the controller 7 at a higher velocity. Accordingly, the swinging velocity of the controller 7 provided by the player can be calculated by determining the interval between the points P which are continuous in a time series manner. In this embodiment, all the points P from the start until the end of the swing are analyzed, and the points P having the largest interval therebetween, among the intervals between points P which are continuous in a time series manner, are extracted. Thus, the swinging velocity is calculated.

Figure 13:
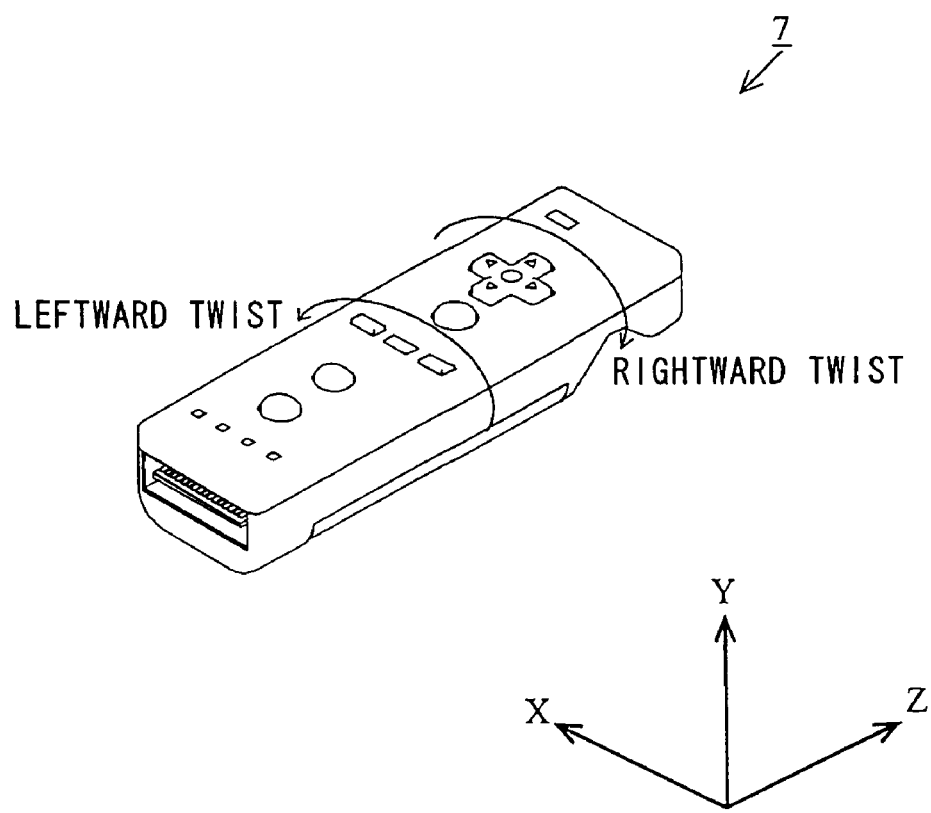
FIG. 13 is an isometric view of the controller 7 shown in FIG. 3 illustrating twisting directions thereof.
Figure 14A:
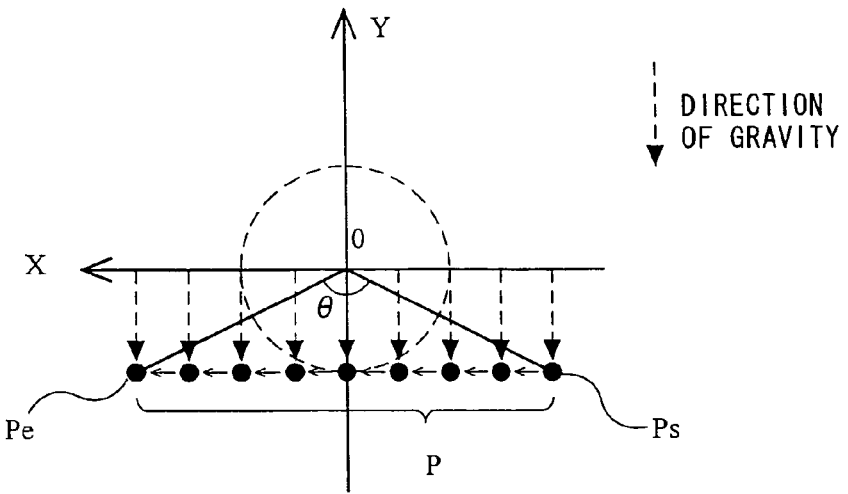
FIG. 14A through FIG. 14C are graphs each illustrating an example of values of acceleration represented by each of the X- and Y-axis direction acceleration data in accordance with the twist given to the controller 7.
Figure 14B:
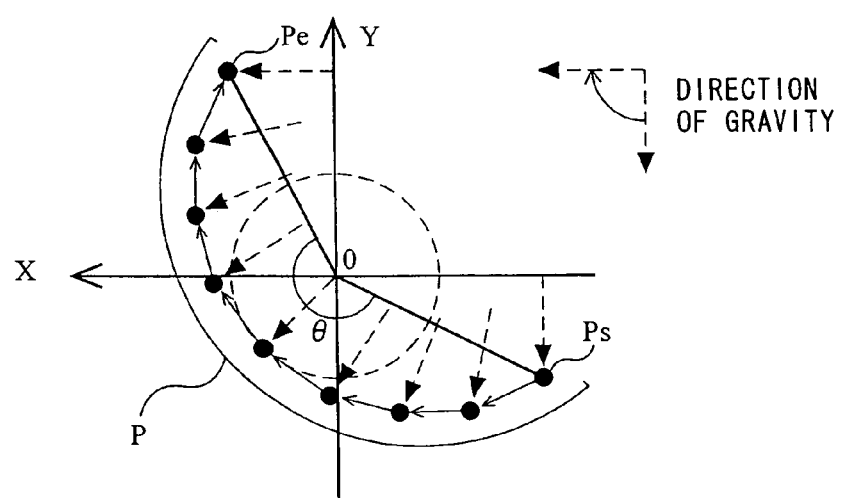
Figure 14C:
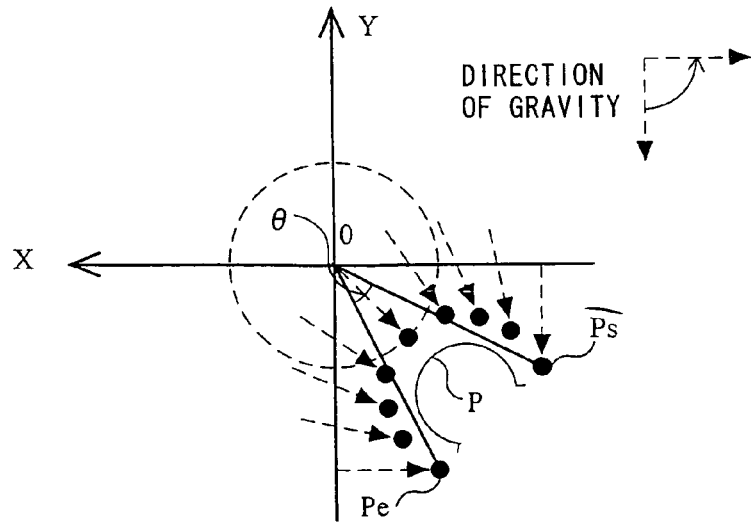
Figure 15:
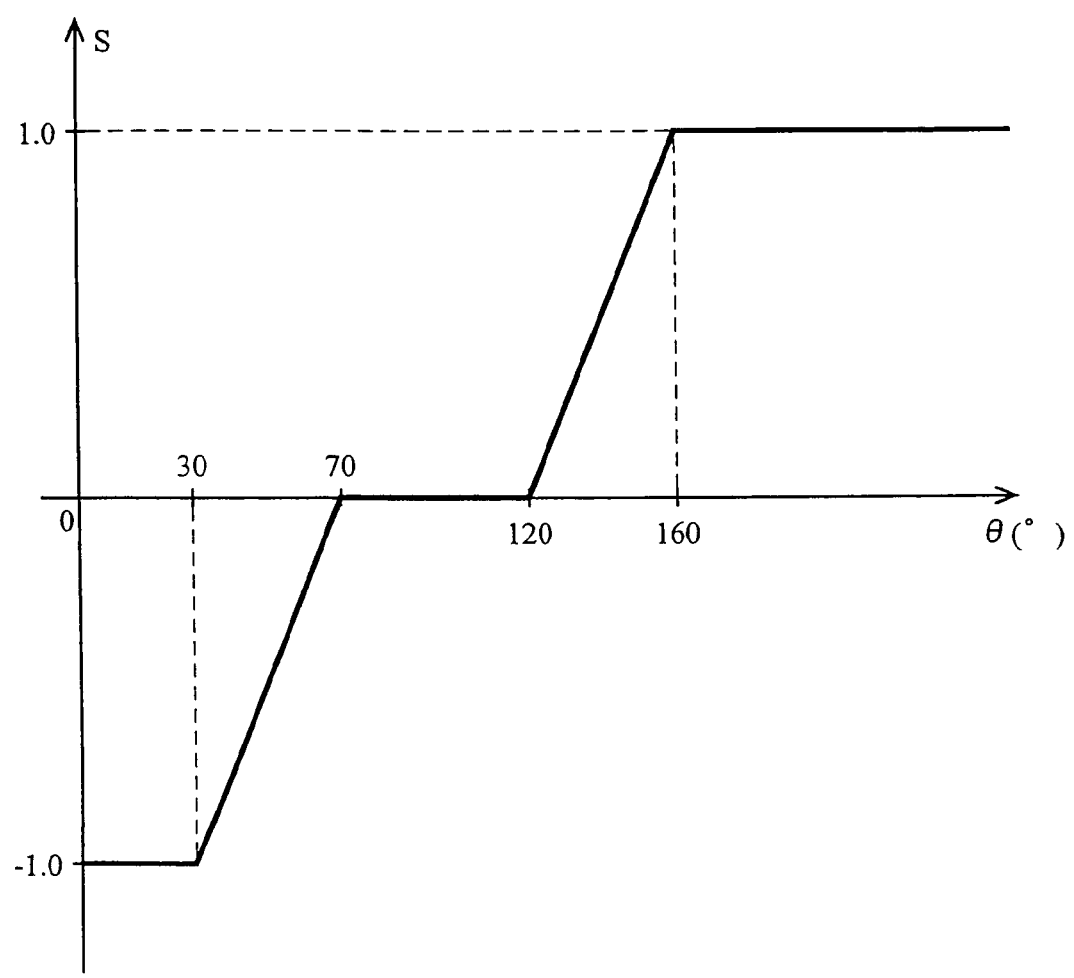
FIG. 15 is a graph illustrating an example of spin parameter S calculated in accordance with the angle θ shown in FIG. 14A through FIG. 14C.

With reference to FIG. 13 through FIG. 15, when the player is swinging the controller 7, a direction in which the player twists the controller 7 (twisting direction) is determined by a method described below using the X- and Y-axis direction acceleration data. FIG. 13 is an isometric view of the controller 7 illustrating the twisting directions thereof. FIG. 14A through FIG. 14C are graphs each illustrating an example of values of acceleration represented by each of the X- and Y-axis direction acceleration data in accordance with the twist given to the controller 7. FIG. 15 is a graph illustrating an example of spin parameter S calculated in accordance with the angle θ shown in FIG. 14A through FIG. 14C. In FIG. 14A through FIG. 14C, as in FIG. 9A through FIG. 9D, the points P are connected by arrows in the order in which the points P are obtained, and the origin ((X, Y)=(0, 0)) represents the value of the acceleration data in the state where no acceleration including the acceleration of gravity acts upon the acceleration sensor 701.

With reference to FIG. 13, when performing a leftward swing or a rightward swing of the controller 7, the player can provide the controller 7 with a "leftward twist" or a "rightward twist" around the Z-axis. The "leftward twist" refers to rotating the controller 7 counterclockwise with respect to the player around the Z axis, and the "rightward twist" refers to rotating the controller 7 clockwise with respect to the player around the Z axis. The result of a determination on the twist is reflected on a spin (a topspin or a backspin) given to the ball character BC.

In order to determine an angle at which the player twists the controller 7 (twisting angle) while swinging the controller 7, it is necessary to analyze the X- and Y-axis direction acceleration data from the start until the end of the swing. In this embodiment, the twisting angle of the controller 7 is determined using a point Ps representing the X- and Y-axis direction acceleration data obtained at the start of the swing (the first point plotted in the X-Y coordinate system; start point) and a point Pe representing the X- and Y-axis direction acceleration data obtained at the end of the swing (the last point plotted in the X-Y coordinate system; end point).

For example, FIG. 14A shows an example of the X- and Y-axis direction acceleration data obtained from the start until the end of the swing when the player performs a horizontal leftward swing with the top surface of the controller 7 being kept upward (i.e., with no twist). An angle θ defined by a straight line connecting the start point Ps and the origin of the X-Y coordinate system and a straight line connecting the end point Pe and the origin (hereinafter, referred to as an "angle θ from the start point Ps to the end point Pe") is calculated, and a spin parameter S in accordance with the angle θ is set. Since the direction of gravity acting upon the controller 7 is constant, an intermediate angle θ is obtained. The angle θ is obtained by calculating an absolute value of an angle defined by a vector extending from the origin of the X-Y coordinate system to the start point Ps and a vector extending from the origin to the end point Pe.

FIG. 14B shows an example of the X- and Y-axis direction acceleration data obtained from the start until the end of the swing when the player performs a horizontal leftward swing while giving a leftward twist to the controller 7 from the state where the top surface of the controller 7 is directed upward. Since the direction of gravity acting upon the controller 7 changes clockwise in accordance with the twist, the angle θ from the start Ps to the end point Pe obtained by the leftward twist is larger than the angle θ obtained with no twist.

FIG. 14C shows an example of the X- and Y-axis direction acceleration data obtained from the start until the end of the swing when the player performs a horizontal leftward swing while giving a rightward twist to the controller 7 from the state where the top surface of the controller 7 is directed upward. Since the direction of gravity acting upon the controller 7 changes counterclockwise in accordance with the twist, the angle θ from the start Ps to the end point Pe obtained by the rightward twist is smaller than the angle θ obtained with no twist.

As described above, the direction or angle of a twist provided to the controller 7 during the swing can be determined using the angle θ from the start point Ps to the end point Pe. For example, in the case where the player is performing a leftward swing of the controller 7, the controller 7 is determined to be given a "leftward twist" when the angle θ is larger than a threshold value and is determined to be given a "rightward twist" when the angle θ is smaller than the threshold value. In the case where the player is performing a rightward swing of the controller 7, the direction of the twist is determined oppositely. Namely, in the case where the player is performing a rightward swing of the controller 7, the controller 7 is determined to be given a "rightward twist" when the angle θ is larger than the threshold value and is determined to be given a "leftward twist" when the angle θ is smaller than the threshold value. Using the start point Ps and the end point Pe represented by the X- and Y-axis direction acceleration data as coordinate points on the X-Y coordinate system, a rotation motion of the controller 7 around the Z axis, perpendicular to the X and Y axes, as the rotation axis can be determined.

In accordance with the difference between the angle θ obtained by the leftward twist or the rightward twist and the angle θ obtained with no twist (see FIG. 14A), an amount by which the player twists the controller 7 (twisting amount) can be determined. In this embodiment, a predetermined conversion table is used to convert the angle θ used for determining the twisting direction or the twisting angle into a spin parameter S in accordance with the value of the angle θ. Thus, the subsequent game processing is executed. A spin parameter S is, for example, a floating-point number in the range of −1.0 to 1.0 which is determined in accordance with the value of the angle θ. The game processing is executed such that the maximum effect of a backspin is provided when S=−1.0, and the maximum effect of a topspin is provided when S=1.0.

For example, as shown in FIG. 15, when the angle θ is θ≦30°, the angle θ is converted into a spin parameter S=−1.0. When the angle θ is 30°<θ≦70°, the angle θ is converted into a spin parameter S linearly changing in the range of −1.0 to 0.0. When the angle θ is 70°<θ≦120°, the angle θ is converted into a spin parameter S=0.0. When the angle θ is 120°<θ≦160°, the angle θ is converted into a spin parameter S linearly changing in the range of 0.0 to 0.1. When the angle θ is 160°<θ, the angle θ is converted into a spin parameter S=1.0. By adjusting such a conversion table, the effect of reflecting a twist given to the controller 7 on the game processing can be adjusted.

Figure 16A:
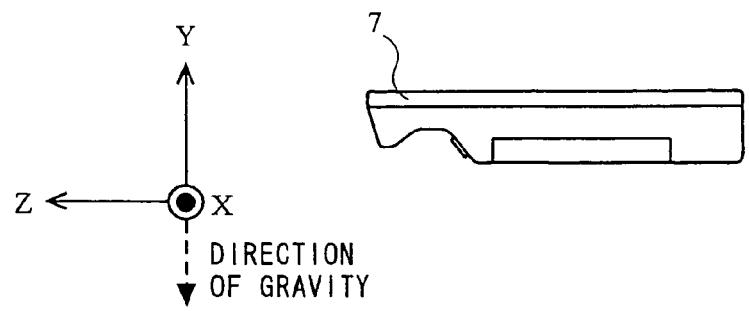
FIG. 16A through FIG. 16C illustrate the relationship between the state where the controller 7 is inclined upward or downward and the coordinate axes in such a state.
Figure 16B:
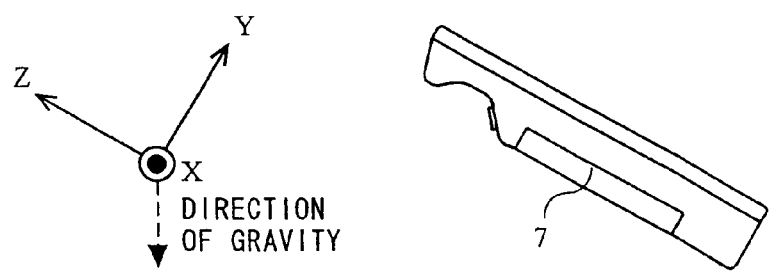
Figure 16C:
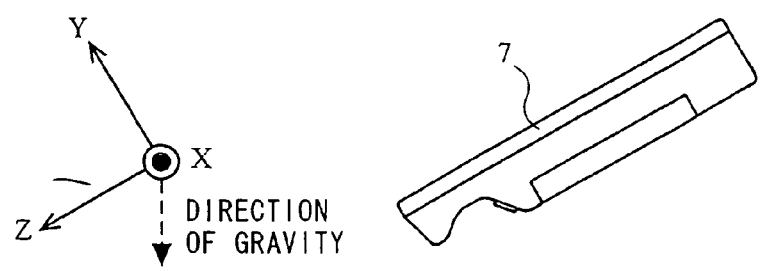

With reference to FIG. 16A through FIG. 16C and FIG. 17, a method for determining a state where the controller 7 is being swung up or down will be described. FIG. 16A through FIG. 16C illustrate the relationship between the state where the controller 7 is inclined upward or downward and the coordinate axes in such a state. FIG. 17 is a graph illustrating an example of up-down angle UD calculated in accordance with Z-axis direction acceleration data.

In this embodiment, it is determined whether the controller 7 is being swung up or down based on the up-down direction of the controller 7 before the controller 7 is swung. For example, when the player inclines the front surface of the controller 7 downward at equal to or greater than a predetermined angle from the horizontal state before starting the swing, it is determined that the controller 7 is being swung up. When the player inclines the front surface of the controller 7 upward at equal to or greater than the predetermined angle from the horizontal state before starting the swing, it is determined that the controller 7 is being swung down.

Specifically, when it is determined that the controller 7 is being swung, the up-down direction of the controller 7 before the swing is determined based on the Z-axis direction acceleration data obtained during several frames immediately therebefore. For example, as shown in FIG. 16A, when the controller 7 is horizontal before the player starts swinging the controller 7, the acceleration of gravity acts in the negative Y-axis direction. Therefore, the Z-axis direction acceleration data does not reflect the influence of the acceleration of gravity. As shown in FIG. 16B, when the front surface of the controller 7 is inclined upward with respect to the horizontal state before the player starts swinging the controller 7, the acceleration of gravity acts in the negative Y-axis direction and a negative Z-axis direction. Therefore, the Z-axis direction acceleration data shows an acceleration in the negative Z-axis direction by the influence of the acceleration of gravity. As shown in FIG. 16C, when the front surface of the controller 7 is inclined downward with respect to the horizontal state before the player starts swinging the controller 7, the acceleration of gravity acts in the negative Y-axis direction and the positive Z-axis direction. Therefore, the Z-axis direction acceleration data shows an acceleration in the positive Z-axis direction by the influence of the acceleration of gravity. Accordingly, the up-down direction of the controller 7 before the player starts swinging the controller 7 can be determined by analyzing the Z-axis direction acceleration data obtained before the player starts swinging the controller 7.

In this embodiment, the obtained Z-axis direction acceleration data is stored in the main memory 33. When it is determined that the controller 7 is being swung, an average value Zave of the Z-axis direction acceleration data obtained in 30 immediately previous frames is converted into an up-down angle UD of the controller 7. Thus, the subsequent game processing is executed.

For example, as shown in FIG. 17, when the average value Zave is Zave≦−0.2 G, the average value Zave is converted into an up-down angle UD=60°. When the average value Zave is −0.2 G<Zave≦1.0 G, the average value Zave is converted into an up-down angle UD linearly changing in the range of 60° to −60°. When the average value Zave is 1.0 G<Zave, the average value Zave is converted into an up-down angle UD=−600. The up-down angle UD into which the average value Zave is converted is eccentric toward the positive Z-axis direction. The reason is as follows. Since the Z-axis direction acceleration data is always eccentric to the positive Z-axis direction at the start of the swing. In consideration of the influence of this, the up-down angle UD is made eccentric to the positive Z-axis direction. By adjusting such a conversion table, the effect of reflecting the Z-axis direction acceleration data obtained before the player starts swinging the controller 7 on the game processing can be adjusted.

Figure 18:
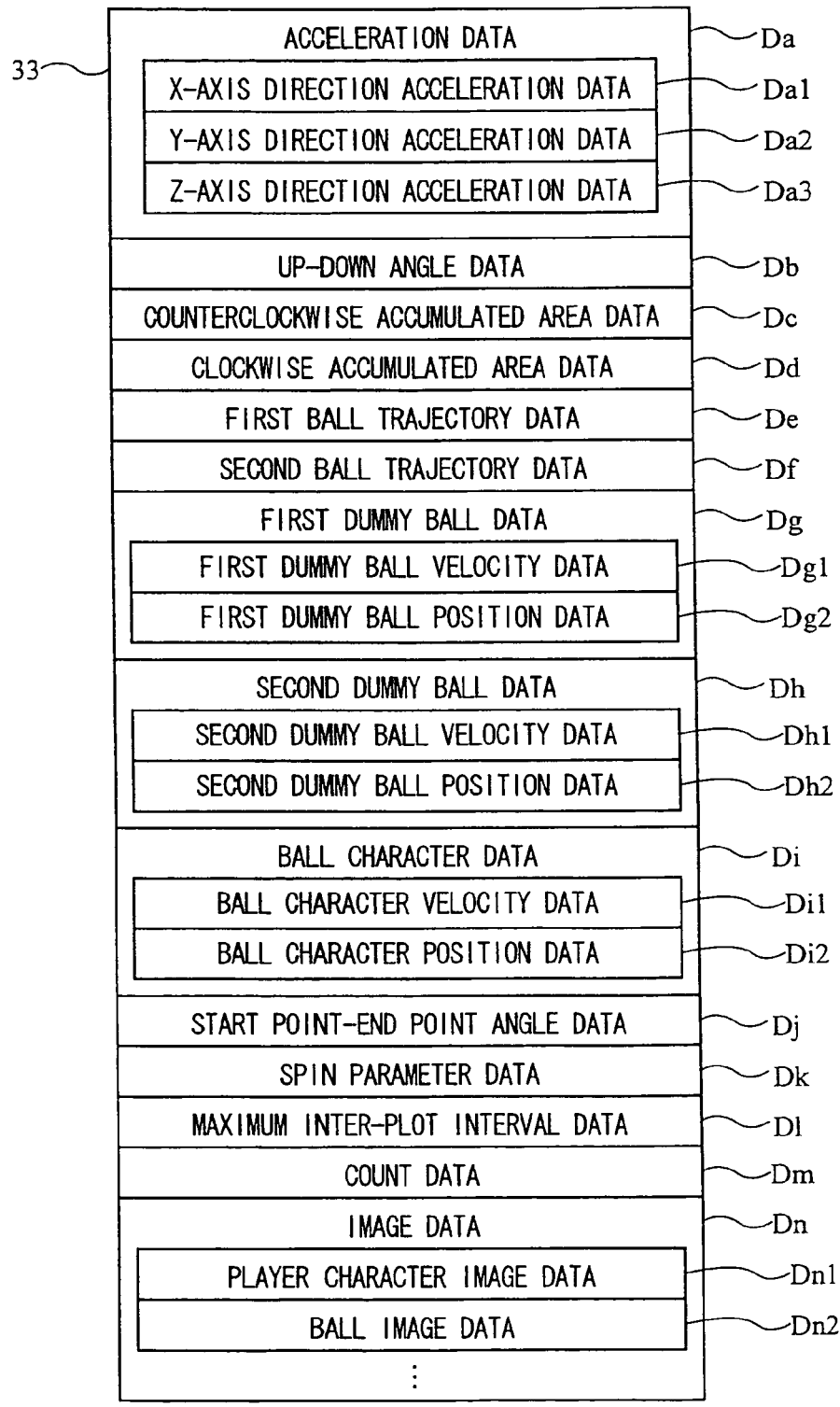
FIG. 18 shows main data stored in the main memory 33 of the game apparatus 3.

Next, the game processing performed by the game system 1 will be described in detail. With reference to FIG. 18, main data used for the game processing will be described. FIG. 18 shows main data stored in the main memory 33 of the game apparatus 3.

As shown in FIG. 18, the main memory 33 includes stored therein acceleration data Da, up-down angle data Db, counterclockwise accumulated area data Dc, clockwise accumulated area data Dd, first ball trajectory data De, second ball trajectory data Df, first dummy ball data Dg, second dummy ball data Dh, ball character data Di, start point-end point angle data Dj, spin parameter data Dk, maximum inter-plot interval data Dl, count data Dm, image data Dn and the like. In addition to data shown in FIG. 18, the main memory 33 also includes stored therein data on the player character PC, the opponent character EC and the like appearing in the game (position data, etc.), data on the virtual game space (topography data, etc.) and other data necessary for the game processing.

The acceleration data Da is included in a series of operation information which is transmitted from the controller 7 as transmission data. A predetermined number of frames (for example, 30 frames for one frame (1/60 sec.) as a game processing interval) of the obtained acceleration data Da is stored. The acceleration data Da includes X-axis direction acceleration data Da1, Y-axis direction acceleration data Da2, and Z-axis direction acceleration data Da3 detected by the acceleration sensor 701 as components of the X-, Y- and Z-axis directions. The receiving unit 6 included in the game apparatus 3 receives the acceleration data Da included in the operation information transmitted from the controller 7 at a predetermined time interval (for example, every 5 ms) and accumulates the acceleration data Da in a buffer (not shown) in the receiving unit 6. Then, the acceleration data Da is read a unit of one frame as the game processing interval, and stored in the main memory 33.

The up-down angle data Db represents an up-down angle UD (see FIG. 16A through FIG. 16C and FIG. 17) calculated based on the Z-axis direction acceleration data Da3 obtained from the controller 7 before the controller 7 is swung. The counterclockwise accumulated area data Dc represents the accumulated areas of the triangles (see FIG. 12) formed using the acceleration data showing a counterclockwise shift with respect to the origin of the X-Y coordinate system. The clockwise accumulated area data Dd represents the accumulated areas of the triangles (see FIG. 12) formed using the acceleration data showing a clockwise shift with respect to the origin of the X-Y coordinate system.

The first ball trajectory data De represents a trajectory of the ball character BC moving in the virtual game space based on data obtained on an initial stage of motion recognition processing described later (such a trajectory will be referred to as a "first ball trajectory TR1"). The second ball trajectory data Df represents a trajectory of the ball character BC moving in the virtual game space based on data obtained throughout the motion recognition processing described later (such a trajectory will be referred to as a "second ball trajectory TR2"). The first dummy ball data Dg includes first dummy ball velocity data Dg1 and first dummy ball position data Dg2. The first dummy ball velocity data Dg1 is velocity vector data which represents the velocity of a first dummy ball moving along the trajectory represented by the first ball trajectory data De in the virtual game space. The first dummy ball position data Dg2 is coordinate position data which represents the position of the first dummy ball moving along the trajectory represented by the first ball trajectory data De in the virtual game space. The second dummy ball data Dh includes first dummy ball velocity data Dh1 and second dummy ball position data Dh2. The second dummy ball velocity data Dh1 is velocity vector data which represents the velocity of a second dummy ball moving along the trajectory represented by the second ball trajectory data Df in the virtual game space. The second dummy ball position data Dh2 is coordinate position data which represents the position of the second dummy ball moving along the trajectory represented by the second ball trajectory data Df in the virtual game space. The ball character data Di includes ball character velocity data Di1 and ball character position data Di2. The ball character velocity data Di1 is velocity vector data which represents a current velocity of the ball character BC in the virtual game space. The ball character position data Di2 is coordinate position data which represents a current position of the ball character BC in the virtual game space.

The start point-end point angle data Dj represents an angle θ from the start point Ps to the end point Pe in the X-Y coordinate system (see FIG. 14A through FIG. 14C). The spin parameter data Dk represents a spin parameter S (see FIG. 15) obtained by converting the angle θ. The maximum inter-plot interval data Dl represents a maximum data interval among the intervals between points plotted in a time series manner in the X-Y coordinate system based on the X- and Y-axis direction acceleration data obtained throughout the motion recognition processing. The count data Dm represents a counted value used for a flowchart described later.

The image data Dn includes player character image data Dn1, ball image data Dn2 and the like, and used for generating a game image by locating the player character PC and the ball character BC in the virtual game space.

Figure 19:
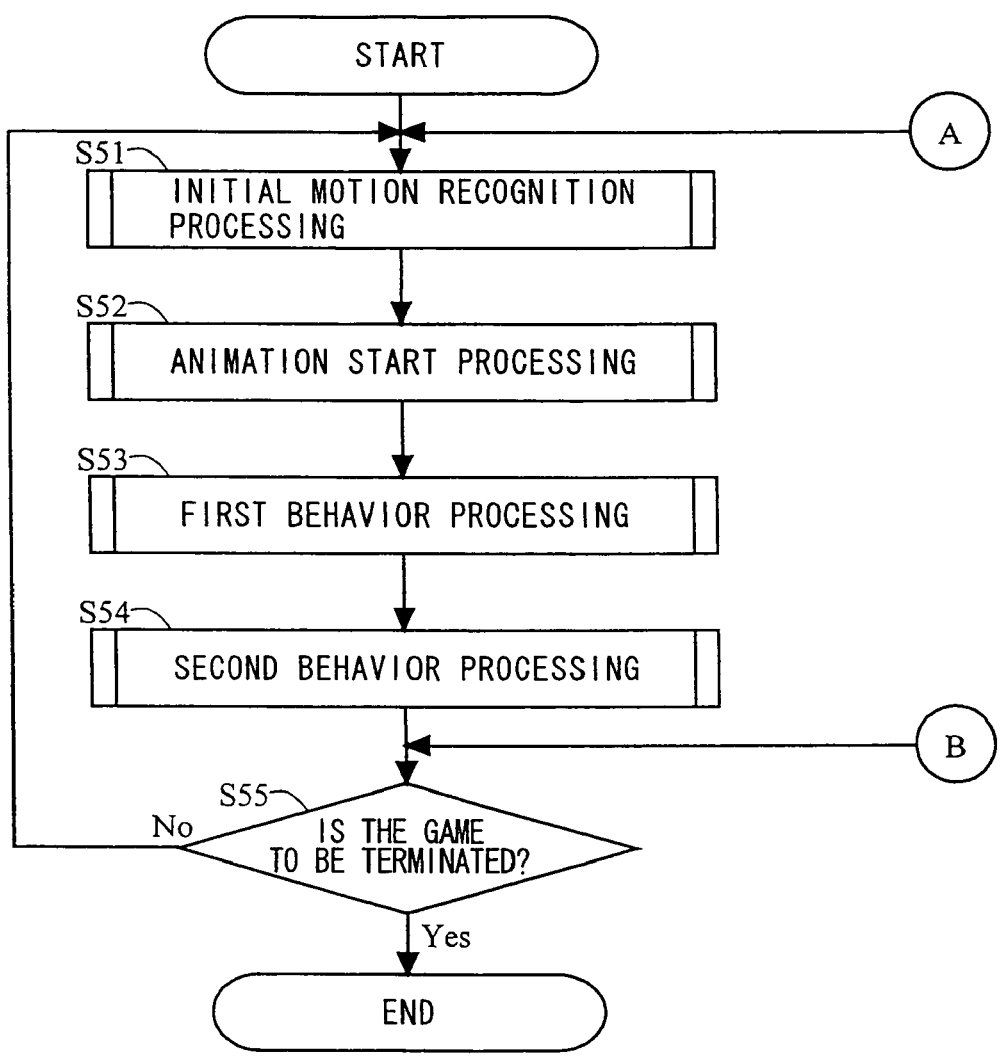
FIG. 19 is a flowchart illustrating a flow of the game processing executed by the game apparatus 3.
Figure 20:
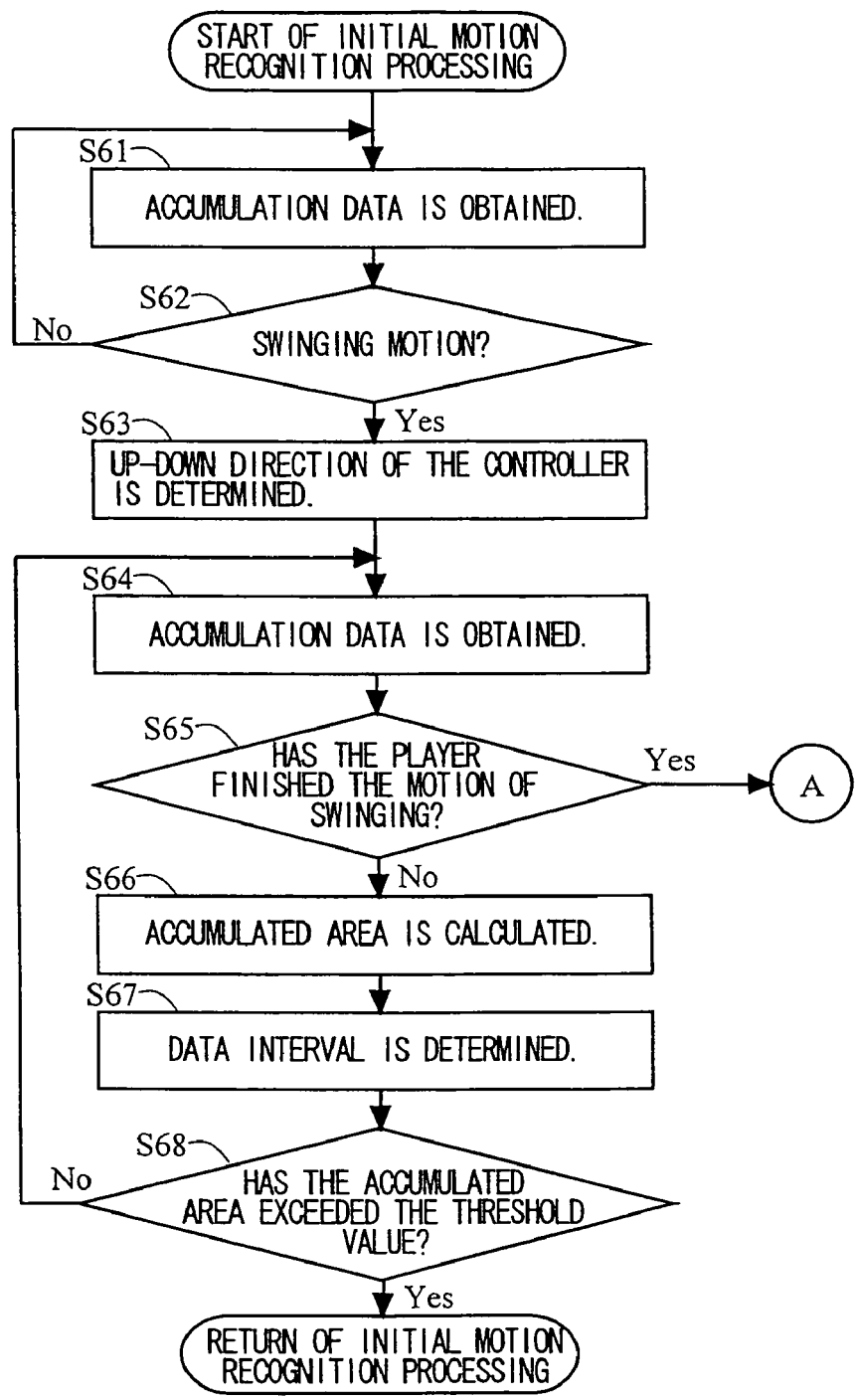
FIG. 20 is a flowchart illustrating a sub-routine of a detailed operation of initial motion recognition processing in step 51 shown in FIG. 19.
Figure 21:
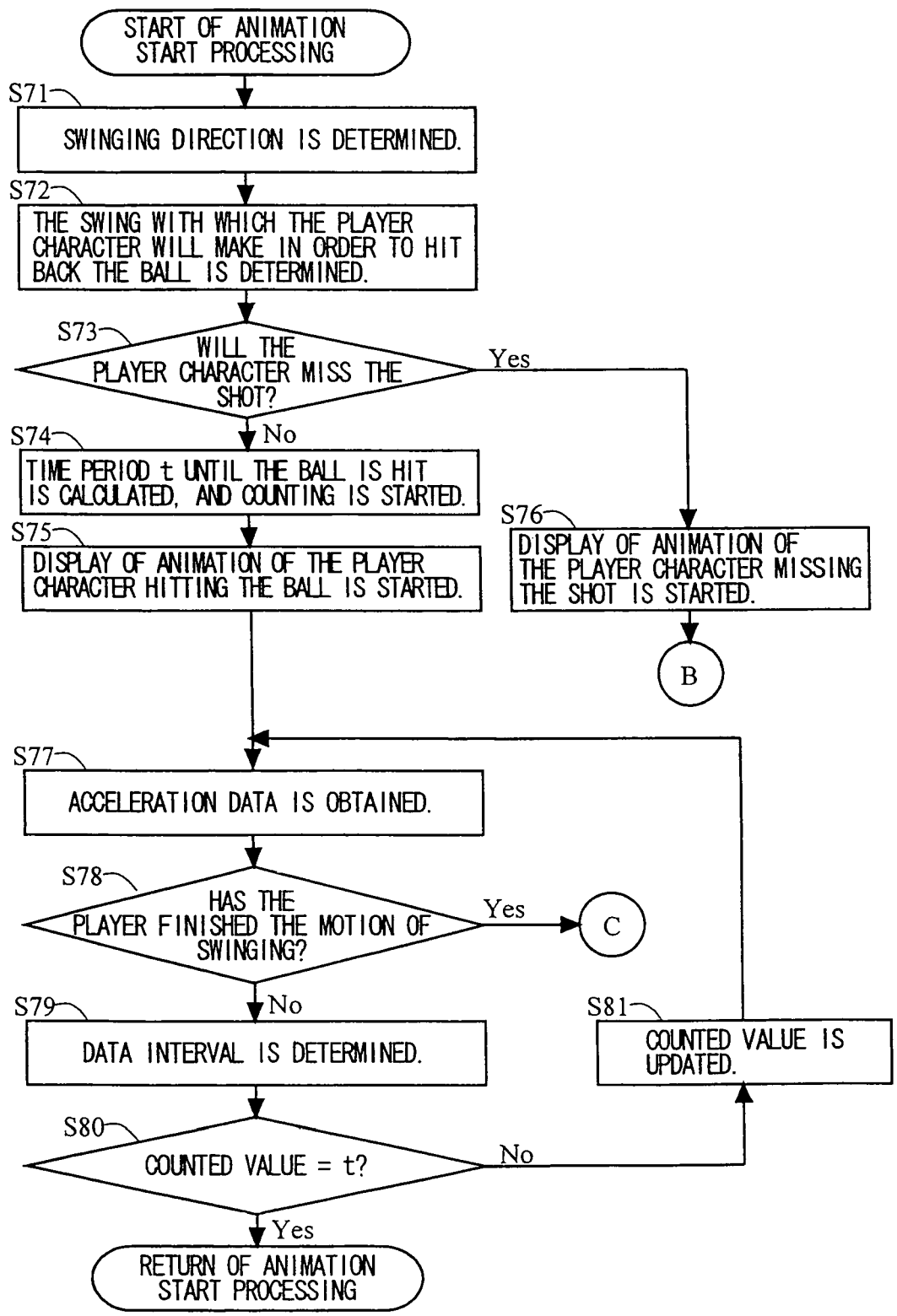
FIG. 21 is a flowchart illustrating a sub-routine of a detailed operation of animation start processing in step 52 shown in FIG. 19.
Figure 22:
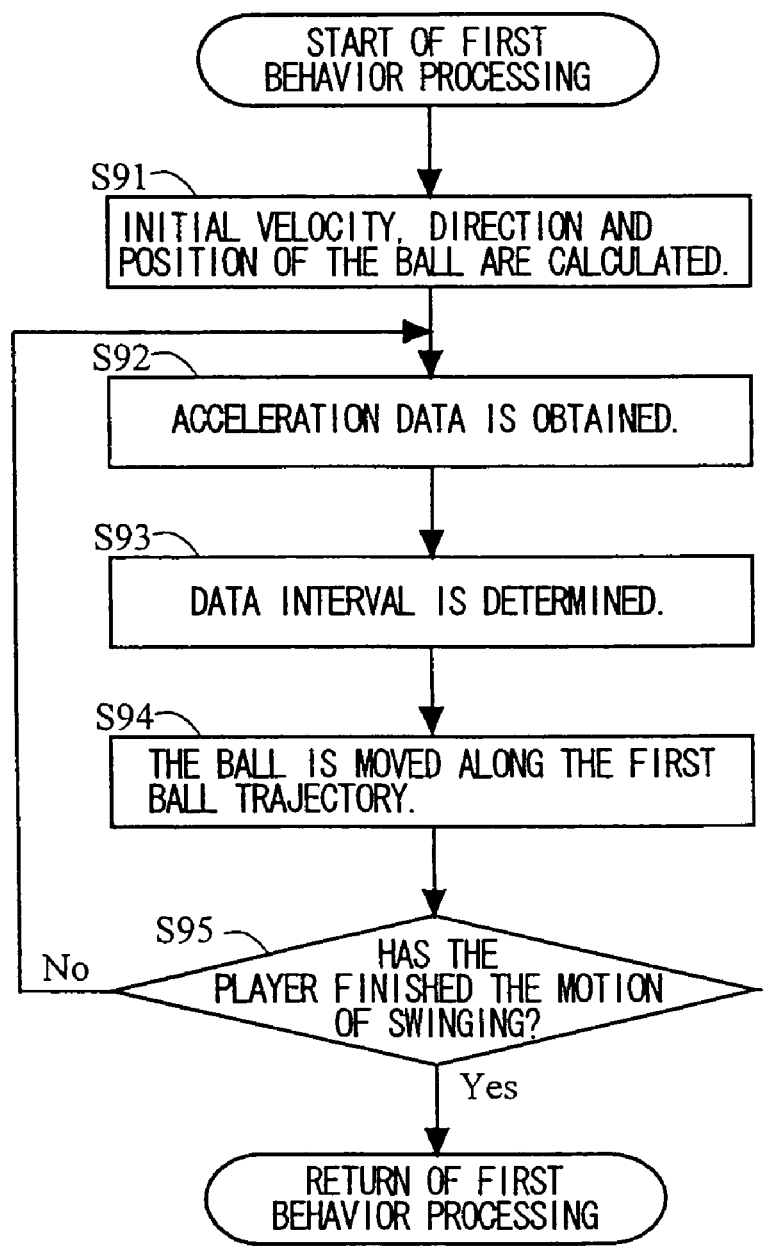
FIG. 22 is a flowchart illustrating a sub-routine of a detailed operation of first behavior processing in step 53 shown in FIG. 19.
Figure 23:
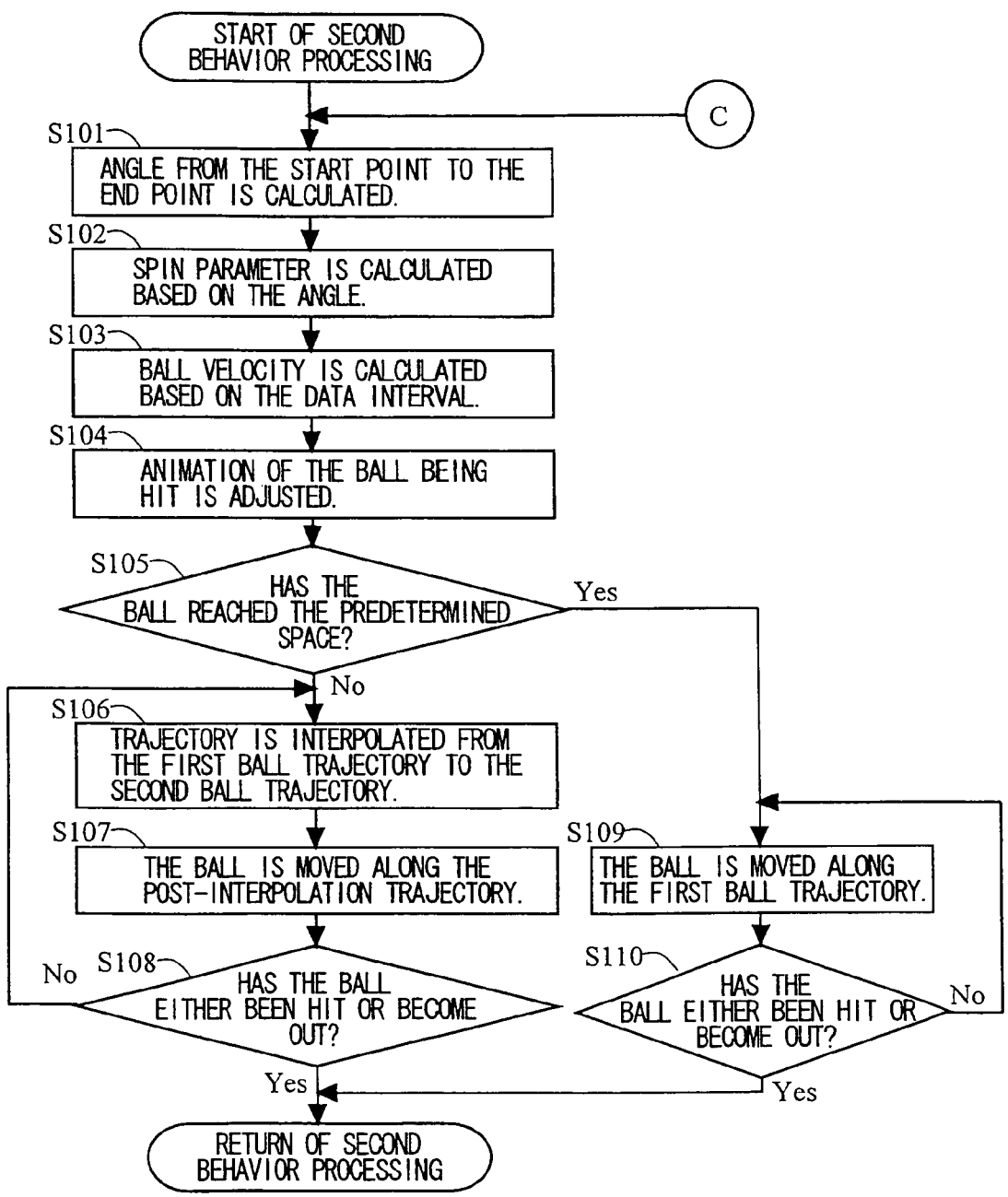
FIG. 23 is a flowchart illustrating a sub-routine of a detailed operation of second behavior processing in step 54 shown in FIG. 19.
Figure 24:
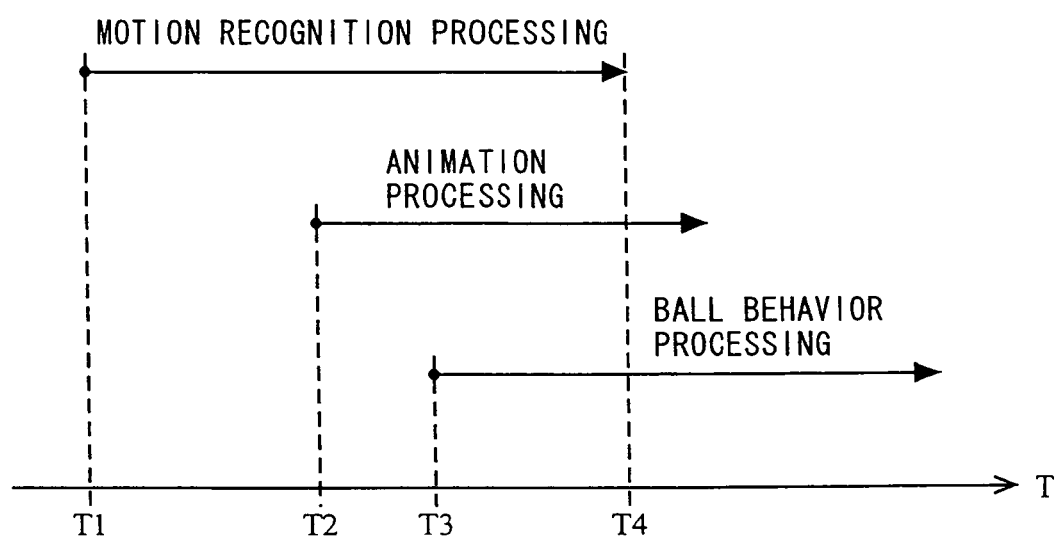
FIG. 24 shows timing of motion recognition processing, animation processing, and ball behavior processing.
Figure 26:
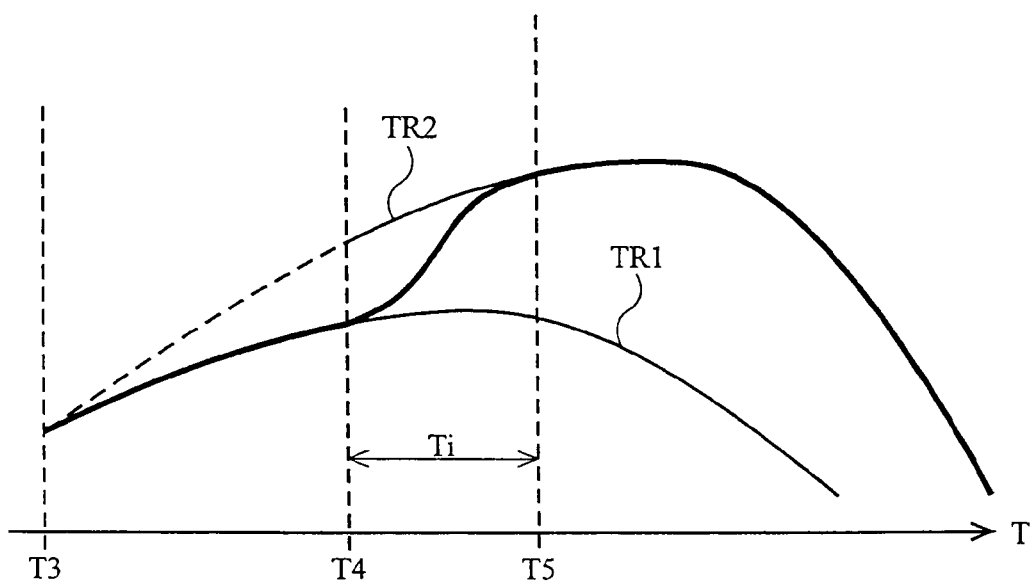
FIG. 26 shows an example of a first ball trajectory TR1 and a second ball trajectory TR2.

With reference to FIG. 19 through FIG. 26, the game processing performed by the game apparatus 3 will be described in detail. FIG. 19 is a flowchart illustrating a flow of the game processing executed by the game apparatus 3. FIG. 20 shows a sub-routine of a detailed operation of initial motion recognition processing in step 51 shown in FIG. 19. FIG. 21 shows a sub-routine of a detailed operation of animation start processing in step 52 shown in FIG. 19. FIG. 22 shows a sub-routine of a detailed operation of first behavior processing in step 53 shown in FIG. 19. FIG. 23 shows a sub-routine of a detailed operation of second behavior processing in step 54 shown in FIG. 19. FIG. 24 shows timing of motion recognition processing, animation processing, and ball behavior processing. FIG. 25 shows exemplary behaviors determined in accordance with the spin parameter S. FIG. 26 shows an example of the first ball trajectory TR1 and the second ball trajectory TR2. With reference to the flowcharts in FIG. 19 through FIG. 23, game processing performed based on a game operation by the player swinging the controller 7 will be described, and other parts of the game processing not directly relevant to the present invention will be omitted. In FIG. 19 through FIG. 23, each of steps performed by the CPU 30 will be represented with "S".

When the power of the game apparatus 3 is turned on, the CPU 30 of the game apparatus 3 executes a start program stored in a boot ROM (not shown) to initialize the elements including the main memory 33. The game program stored on the optical disc 4 is read to the main memory 33, and thus the CPU 30 starts executing the game program. The flowcharts shown in FIG. 19 through FIG. 23 illustrate the game processing executed after the above-described processing is completed.

As shown in FIG. 19, the CPU 30 sequentially executes the initial motion recognition processing (step 51), the animation start processing (step 52), the first behavior processing (step 53), and the second behavior processing (step 54). The details of these processing will be described later. After step 54, the CPU 30 determines whether or not to terminate the game (step 55). The game can be terminated, for example, when a condition for terminating the game is fulfilled (e.g., the tennis game played by the player character PC is over) or when the player performs an operation for terminating the game. When it is determined that the game is not to be terminated, the CPU 30 returns to step 51 and repeats the processing. When it is determined that the game is to be terminated, the CPU 30 terminates the processing illustrated in the flowchart in FIG. 19.

With reference to FIG. 20, the initial motion recognition processing in step 51 will be described. The CPU 30 obtains acceleration data included in the operation information received from the controller 7 (step 61), and advances the processing to the next step. The CPU 30 stores the obtained acceleration data in the main memory 33 as acceleration data Da. The acceleration data Da obtained in step 61 includes X-, Y-, and Z-axis direction acceleration data Da1, Da2 and Da3 detected by the acceleration sensor 701 as components of three axial directions (X-, Y- and Z-axis directions). The communication section 75 transmits the operation information to the game apparatus 3 at a predetermined time interval (for example, every 5 ms), and thus at least the acceleration data is accumulated in the buffer (not shown) in the receiving unit 6. The CPU 30 obtains the acceleration data by a unit of one frame, which is a game processing unit, and stores the acceleration data in the main memory 33.

Next, the CPU 30 determines whether or not the controller 7 is being swung by the player using the obtained acceleration data (step 62). Specifically, when the Z-axis direction acceleration data Da3 obtained in step 61 represents a positive Z-axis direction value exceeding a threshold value, the CPU 30 determines that the player is swinging the controller 7. In this case, the CPU 30 advances the processing to the next step.

When the player is not swinging the controller 7, the CPU 30 returns to step 61 and repeats the above-described processing.

In step 63, the CPU 30 determines the up-down direction of the controller 7 before the swing, and advances the processing to the next step. Specifically, the CPU 30 calculates an average value Zave of the Z-axis direction acceleration data Da3 in several immediately previous frames (for example, 30 frames) stored in the main memory 33. Then, the CPU 30 converts the average Zave into the up-down angle UD (see FIG. 17) and stores data representing the up-down angle UD as the up-down angle data Db.

Next, the CPU 30 obtains the acceleration data included in the operation information received from the controller 7 by substantially the same processing as step 61 (step 64), and determines whether or not the player has finished the motion of swinging the controller 7 based on whether or not the obtained Z-axis direction acceleration data Da3 represents a value equal to or less than the threshold value (step 65). When the player is still swinging the controller 7, the CPU 30 advances the processing to step 66. When the player has finished the motion of swinging the controller 7, the CPU 30 returns to step 51 and repeats the above-described processing.

In step 66, the CPU 30 accumulates the areas of the triangles defined by the accelerated data Da obtained in step 64 and the origin of the X-Y coordinate system, and advances the processing to the next step. Specifically, as described above with reference to FIG. 12, when the acceleration data Da obtained in step 64 shows a counterclockwise shift with respect to the origin, the CPU 30 accumulates the area of the resultant triangle on the counterclockwise accumulated area data Dc as necessary and stores the obtained data. When the acceleration data Da obtained in step 64 shows a clockwise shift with respect to the origin, the CPU 30 accumulates the area of the resultant triangle on the clockwise accumulated area data Dd as necessary and stores the obtained data.

Next, the CPU determines an interval between points plotted in the X-Y coordinate system (data interval) based on the acceleration data Da obtained in step 64 (step 67), and advances the processing to the next step. Specifically, when the obtained data interval is larger than the data interval included in the current maximum inter-plot interval data D1, the CPU 30 updates the maximum inter-plot interval data D1 to the obtained data interval. When the obtained data interval is equal to or smaller than the data interval included in the current maximum inter-plot interval data D1, the CPU 30 advances the processing to the next step without updating.

Next, the CPU 30 determines whether or not either one of the accumulated area represented by the counterclockwise accumulated area data Dc and the accumulated area represented by the clockwise accumulated area data Dd has exceeded a threshold value (step 68). When either one of the areas has exceeded the threshold value, the CPU 30 terminates the processing of this sub-routine and advances the processing to step 52 in FIG. 19. When neither area has exceeded the threshold value, the CPU 30 returns to step 64 and repeats the above-described processing.

With reference to FIG. 21, the animation start processing in step 52 will be described. After step 68, the CPU 30 determines the swinging direction of the controller 7 (step 71), and advances the processing to the next step. For example, when it is determined in step 68 that the accumulated area represented by the counterclockwise accumulated area data Dc has exceeded the threshold value, this means that the acceleration data shows a counterclockwise shift with respect to the origin of the X-Y coordinate system. Thus, it is determined that the player is performing a "rightward swing" (see FIG. 7). When it is determined in step 68 that the accumulated area represented by the clockwise accumulated area data Dd has exceeded the threshold value, this means that the acceleration data shows a clockwise shift with respect to the origin of the X-Y coordinate system. Thus, it is determined that the player is performing a "leftward swing" (see FIG. 7).

As is clear from steps 68 and 71, the processing in step 71 is executed when either one of the counterclockwise accumulated area data Dc and the clockwise accumulated area data Dd has exceeded the threshold value. The processing in step 71 is not executed when the player finishes the motion of swinging the controller 7. As shown in FIG. 24, processing of recognizing the motion from the start until the end of the swing of the controller 7 by the player (motion recognition processing) is executed from time T1 to time T4. Processing of displaying an animation of the player character PC swinging the tennis racket (animation processing) starts at time T2, i.e., in the middle of the motion recognition processing. Namely, the swinging direction of the controller 7 is determined at a point after the player starts swinging the controller 7 but before the player finishes swinging the controller 7, and is reflected on the game image. The initial motion recognition processing in step 51 is executed from time T1 to time T2 as a part of the motion recognition processing.

The relationship between (i) the swinging direction of the controller 7 and (ii) which of the counterclockwise accumulated area and the clockwise accumulated area has exceeded the threshold value varies in accordance with the setting of the coordinate axes for the controller 7, the characteristics of the acceleration sensor, the setting of the X-Y coordinate system and the like. Such a relationship may be adjusted in accordance with such settings as necessary. Specifically, the swinging direction of the controller 7 can be accurately determined by analyzing the relationship between (i) the swinging direction of the controller 7 and (ii) which of the counterclockwise accumulated area and the clockwise accumulated area has exceeded the threshold value, with respect to the direction of acceleration of gravity based on the obtained acceleration data.

Next, the CPU 30 determines the swing with which the player character PC will make in order to hit back the ball character BC (step 72), and determines whether or not the player character PC will miss the shot (step 73). In the steps executed so far, the player character PC has not started the motion of swinging the racket. However, the CPU 30 can estimate and determine whether or not the player character PC will be able to hit back the ball character BC flying toward the player character PC with a current swing, based on data on a current position and an estimated future position of the player character PC, a current position and an estimated future trajectory of the ball character BC, the swinging direction of the tennis racket by the player character PC and the like. When it is estimated that the player character PC will miss the shot, the CPU 30 starts processing of displaying an animation of the player character PC missing the shot on the monitor (step 76), and advances the processing to step 55 in FIG. 19. When it is estimated that the player character PC will be able to hit back the ball character BC, the CPU 30 advances the processing to step 74.

In step 74, the CPU 30 counts a time period t from the current time until the player character PC hits back the ball character BC, and starts counting to update the count data Dn. The CPU 30 starts processing of displaying an animation of the player character PC hitting back the ball character BC on the monitor (step 75), and advances the processing to the next step. The animation of the player character PC hitting back the ball character BC is provided with a swing in accordance with the up-down angle UD. Namely, an animation of the player character PC swinging up or swinging down the racket in the up-down direction represented by the up-down angle UD is displayed.

Next, the CPU 30 obtains the acceleration data included in the operation information received from the controller 7 (step 77), and determines whether or not the player has finished the motion of swinging the controller 7 based on the acceleration data (step 78). When the player is still swinging the controller 7, the CPU 30 advances the processing to step 79. When the player has finished the motion of swinging the controller 7, the CPU 30 advances the processing to step 101 (see FIG. 23). The processing of obtaining the acceleration data in step 77 is substantially the same as that in step 61 and will not be described in detail. The method for determining whether or not the player has finished the motion of swinging the controller 7 in step 78 is substantially the same as that in step 62 except that the acceleration data obtained in step 77 is used, and will not be described in detail.

In step 79, the CPU 30 determines an interval between points plotted in the X-Y coordinate system (data interval) based on the acceleration data obtained in step 77. The processing of determining the data interval in step 79 is substantially the same as that in step 67 except that the acceleration data obtained in step 77 is used, and will not be described in detail. Next, the CPU 30 determines whether or not the current counted value of the count data Dn has reached the time t (step 80). When the current counted value of the count data Dn has not reached the time t, the CPU 30 updates the current counted value in the count data Dn (step 81). Then, the CPU 30 returns to step 77 and repeats the above-described processing. When the current counted value of the count data Dn has reached the time t, the CPU 30 terminates the processing in this sub-routine and advances the processing to step 53 in FIG. 19.

With reference to FIG. 22, the first behavior processing in step 53 will be described. After step 80, the CPU 30 calculates the initial velocity, direction and position at which the ball character BC is hit back, displays the ball character BC at the calculated position (step 91), and advances the processing to the next step. Specifically, the CPU 30 represents the velocity and direction of the ball character BC by a velocity vector (vx, vy, vz) and stores data representing the velocity vector in the ball character velocity data Di1. The magnitude of the velocity vector (vx, vy, vz) is set to a fixed value. The direction of the velocity vector (vx, vy, vz) is set based on the swinging direction of the controller 7 by the player, the relationship between the timing when the player starts swinging the controller 7 and the timing when the ball character BC arrives at the player, the up-down angle UD and the like. Specifically, the left-right direction in which the ball character BC is hit back is determined by the left-right direction in which the player character PC swings the tennis racket (i.e., the swinging direction of the controller 7) and the timing at which the player character PC hits the ball character BC (i.e., the time at which the player starts swinging the controller 7). The up-down direction in which the ball character BC is hit back is determined by the up-down direction in which the player character PC swings the tennis racket (i.e., the up-down angle UD). For example, when the up-down angle UD has a positive value, the player swings down the controller 7. Therefore, the velocity vector of the ball character BC is set to a low value in correspondence to the value of the up-down angle UD. When the up-down angle UD has a negative value, the player swings up the controller 7. Therefore, the velocity vector of the ball character BC is set to a high value in correspondence to the value of the up-down angle UD. The CPU 30 indicates the position at which the ball character BC is hit by the tennis racket of the player character PC with a coordinate position (x, y, z) in the virtual game space, and stores the data representing the coordinate position in the ball character position data Di2.

Next, the CPU 30 obtains the acceleration data included in the operation information received from the controller 7 (step 92). The CPU 30 determines an interval between points plotted in the X-Y coordinate system (data interval) based on the acceleration data Da obtained in step 92 (step 93), and advances the processing to the next step. The processing of obtaining the acceleration data in step 92 is substantially the same as that in step 61 and will not be described in detail. The processing of determining the data interval in step 93 is substantially the same as that in step 67 except that the acceleration data obtained in step 92 is used, and will not be described in detail.

The CPU 30 calculates the first ball trajectory TR1 based on the velocity vector (vx, vy, vz) and the coordinate position (x, y, z) stored in the current ball character velocity data Di1 and ball character position data Di2. Then, the CPU 30 displays the ball character BC while moving the ball character BC along the first ball trajectory TR1 (step 94). More specifically, the CPU 30 defines the physical laws of the real world (for example, gravity, air resistance, influence of wind) in the virtual game space virtually or strictly. The CPU 30 calculates the first ball trajectory TR1 based on the velocity vector (vx, vy, vz), the coordinate position (x, y, z), the spin parameter S (here, S=0.0), and the physical laws, and stores the first ball trajectory TR1 in the first ball trajectory data De. Then, the CPU 30 newly calculates the velocity vector (vx, vy, vz) and the coordinate position (x, y, z) of the ball character BC such that the ball character BC moves along the first ball trajectory TR1. The CPU 30 stores the newly calculated velocity vector (vx, vy, vz) and coordinate position (x, y, z) in the ball character velocity data Di1 and the ball character position data Di2, and displays the ball character BC at the coordinate position (x, y, z) on the monitor 2. Then, the CPU 30 advances the processing to the next step.

Next, the CPU 30 determines whether or not the player has finished the motion of swinging the controller 7 based on the acceleration data obtained in step 92 (step 95). When the player is still swinging the controller 7, the CPU 30 returns to step 92 and repeats the above-described processing. When the player has finished the motion of swinging the controller 7, the CPU 30 advances the processing to step 54 in FIG. 19. The method for determining whether or not the player has finished the motion of swinging the controller 7 in step 95 is substantially the same as that in step 62 except that the acceleration data obtained in step 92 is used, and will not be described in detail.

As is clear from steps 91 through 95, the first behavior processing is executed from the time when the ball character BC is hit until the time when the player finishes swinging the controller 7. As shown in FIG. 24, processing of representing a behavior of the ball character BC being hit back (ball behavior processing) starts at time T3, i.e., in the middle of the motion recognition processing. Namely, the manner in which the ball character BC is hit back is reflected on the game image based on the operation information (acceleration data) obtained at a point after the player starts swinging the controller 7 but before the player finishes swinging the controller 7. The animation start processing in step 52 is executed from time T2 to time T3 as a part of the animation processing. The first behavior processing in step 53 is executed from time T3 to time T4 as a part of the ball behavior processing. The second behavior processing described below represents a behavior of the ball character BC being hit after the player finishes swinging the controller 7, and starts at time T4 as a part of the behavior processing.

With reference to FIG. 23, the second behavior processing in step 54 will be described. After step 95, the CPU 30 calculates the angle θ from the start point Ps to the end point Pe (see FIG. 14A through FIG. 14C) and stores the angle θ in the start point-end point angle data Dj (step 101). Next, the CPU 30 converts the angle θ into a spin parameter S (see FIG. 15), and stores the spin parameter S in the spin parameter data Dk (step 102). Based on the data interval stored in the maximum inter-plot interval data D1, the CPU 30 calculates the velocity vector (v2x, v2y, v2z) of the second dummy ball, stores the velocity vector in the second dummy ball velocity data Dh1 (step 103), and advances the processing to the next step.

As the velocity vector (v2x, v2y, v2z) of the second dummy ball, the velocity vector of the ball character BC back at the time when the player character PC hit the ball character BC with the tennis racket (time T3 shown in FIG. 24) is re-calculated in consideration of the influence of the data interval (i.e., the swinging velocity of the controller 7). Accordingly, the magnitude of the velocity vector (v2x, v2y, v2z) is set in accordance with the data interval. Specifically, when the data interval is relatively large, the velocity vector is set to be relatively large, whereas when the data interval is relatively small, the velocity vector is set to be relatively small. The direction of the velocity vector (v2x, v2y, v2z) is set in substantially the same manner as step 91.

Next, the CPU 30 performs the processing of adjusting the animation of the player character PC hitting back the ball character BC, which is started in step 75, displays the animation on the monitor 2 (step 104), and advances the processing to the next step. In step 75 (time T2 shown in FIG. 24), only the left-right and up-down directions and the timing of the player swinging the controller 7 are known. Therefore, the animation is started based on only such information. In step 104 (time T4 shown in FIG. 24), the twisting angle given to the controller 7 by the player and the swinging velocity of the controller 7 are also known. Therefore, an animation also based on such additional information can be represented. In step 104, a topspin or a backspin found from the twisting angle and the swinging velocity found from the data interval are reflected on the animation started in step 75 and displayed on the monitor 2.

Next, the CPU 30 refers to the ball character position data Di2 to determine whether or not the ball character BC has reached a predetermined space in the virtual game space (step 105). The "predetermined space" refers to, for example, a space above the opponent's court or a space outside the tennis court set in the virtual game space. When the ball character BC has not reached the predetermined space, the CPU 30 advances the processing to step 106. When the ball character BC has reached the predetermined space, the CPU 30 advances the processing to step 109.

In step 106, the CPU 30 calculates the first ball trajectory TR1 and the second ball trajectory TR2, and performs processing of interpolating the trajectory of the ball character BC from the first ball trajectory TR1 to the second ball trajectory TR2. The CPU 30 moves the ball character BC along the post-interpolation trajectory to update the ball character velocity data Di1 and the ball character position data Di2, and displays the ball character BC on the monitor 2 (step 107). Then, the CPU 30 advances the processing to step 108.

With reference to FIG. 25 and FIG. 26, the second ball trajectory TR2 and the interpolation processing will be described. The first ball trajectory TR1 of the ball character BC calculated in step 94 is obtained only based on the information recognized in the initial motion recognition processing (the left-right and up-down directions and the timing at which the controller 7 is swung). The second ball trajectory TR2 of the ball character BC is calculated further based on information obtained throughout the motion recognition processing (the twisting angle and the swinging velocity of the controller 7).

The second ball trajectory TR2 is calculated as follows, like the first ball trajectory TR1. The CPU 30 defines the physical laws of the real world in the virtual game space. The CPU 30 calculates the second ball trajectory TR2 based on the velocity vector (v2x, v2y, v2z), the coordinate position (x2, y2, z2), the spin parameter S, and the physical laws, and stores the second ball trajectory TR2 in the second ball trajectory data Df. More specifically, the CPU 30 calculates the second ball trajectory TR2 by adding the influence of the spin parameter S to a trajectory calculated in substantially the same manner as the first ball trajectory TR1 using the coordinate position (x2, y2, z2) at which the ball character BC is hit by the tennis racket of the player character PC and the velocity vector (v2x, v2y, v2z) obtained in step 103.

As shown in FIG. 25, when the player performs a "leftward swing" of the controller 7 with a "leftward twist" or performs a "right ward swing" of the controller 7 with a "rightward twist", the spin parameter S is S>0.0, which represents a topspin. When the player performs a "leftward swing" of the controller 7 with a "rightward twist" or performs a "right ward swing" of the controller 7 with a "leftward twist", the spin parameter S is S<0.0, which represents a backspin. When the spin parameter S represents a topspin (S>0.0), the CPU 30 changes the trajectory so as to rapidly go down in the up-down direction. When the spin parameter S represents a backspin (S<0.0), the CPU 30 changes the trajectory such that the flying distance of the ball character BC increases in the up-down direction and the ball character BC curves in the left-right direction in accordance with the swinging direction (such that the ball character BC curves rightward in the case of a "leftward swing" and curves leftward in the case of a "rightward swing"). When the spin parameter S represents no twist (S=0.0), the CPU 30 does not change the trajectory as an influence of the spin.

As shown in FIG. 24 and FIG. 26, the second ball trajectory TR2 is calculated at time T4 when the player finishes swinging the controller 7. At this point, the ball character BC displayed on the monitor 2 is already moving along the first ball trajectory TR1 (thick line in FIG. 26 between time T3 and time T4). The trajectory reflecting all the data obtained by the player swinging the controller 7 is the second ball trajectory TR2. Therefore, it is desirable to modify the trajectory of the ball character BC from the first ball trajectory TR1 to the second ball trajectory TR2 such that the ball character BC moves along the second ball trajectory TR2. In order to move the ball character BC along the second ball trajectory TR2 without making the player feel unnatural, it is necessary to make a shift from the first ball trajectory TR1 to the second ball trajectory TR2 smoothly (thick line in FIG. 26 between time T4 and time T5). In this embodiment, in the process of shifting the first ball trajectory TR1 to the second ball trajectory TR2 (thick line in FIG. 26 between time T4 and time T5), a dummy ball which is not displayed is flown along each of the first ball trajectory TR1 and the second ball trajectory TR2. A position at which the positions of the dummy balls are interpolated is set as the position of the ball character BC.

The CPU 30 sets a dummy ball flown along the first ball trajectory TR1 as a first dummy ball B1. A first dummy ball velocity (v1x, v1y, v1z) and a first dummy ball position (x1, y1, z1) are provided as the parameters of the first dummy ball B1. The CPU 30 sets a dummy ball flown along the second ball trajectory TR2 as a second dummy ball B2. A second dummy ball velocity (v2x, v2y, v2z) and a second dummy ball position (x2, y2, z2) are provided as the parameters of the second dummy ball B2. An interpolation time period Ti is set as a time period required for the interpolation (time T5 to time T6 shown in FIG. 26).

At time T4, the CPU 30 stores the ball character velocity (vx, vy, vz) and the ball character position (x, y, z), stored in the ball character data Di, in the first dummy ball data Dg as the first dummy ball velocity (v1x, v1y, v1z) and the first dummy ball position (x1, y1, z1). Based on the second dummy ball data Dh, the CPU 30 moves the second dummy ball B2 along the second dummy ball trajectory TR2 to a position corresponding to the time T4 and updates the second dummy ball data Dh.

At time Tn between time T4 and time T5, the CPU 30 updates the parameters of the first dummy ball B1 and the second dummy ball B2 by physical calculations, and moves the first dummy ball B1 and the second dummy ball B2 frame by frame along the first dummy ball trajectory TR1 and the second dummy ball trajectory TR2 respectively. The CPU 30 uses the following equations to calculate the position and velocity at which the dummy balls are to be interpolated and thus update the ball character velocity data Di1 and the ball character position data Di2 (thick line between time T4 and time T5 shown in FIG. 26).

$$ratio=(Tn-T4) \div Ti$$

$$x = x2 \times ratio + x1 \times (1.0 - ratio)$$

$$y = y2 \times ratio + y1 \times (1.0 - ratio)$$

$$z = z2 \times ratio + z1 \times (1.0 - ratio)$$

$$vx = v2x \times ratio + v1x \times (1.0 - ratio)$$

$$vy = v2y \times ratio + v1y \times (1.0 - ratio)$$

$$vz = v2z \times ratio + v1z \times (1.0 - ratio)$$

As shown here, the ball character velocity data Di1 and the ball character position data Di2 between time T4 and time T5 are obtained by weighting the velocity and position of the first dummy ball B1 and the second dummy ball B2, obtained at a predetermined time interval, at a predetermined ratio and averaging the resultant velocity and position.

After time T5 (thick line after time T5 shown in FIG. 26), the CPU 30 abandons the first dummy ball B1 and the second dummy ball B2. The CPU 30 calculates the second ball trajectory TR2 based on the velocity vector (vx, vy, vz) and the coordinate position (x, y, z) stored in the current ball character velocity data Di1 and ball character position data Di2. The CUP 30 moves the ball character BC along the second ball trajectory TR2 to update the ball character velocity data Di1 and the ball character position data Di2, and displays the ball character BC on the monitor 2.

Returning to FIG. 23, in step 108, the CPU 30 determines whether or not the ball character BC either has been hit back toward the opponent character EC or has become out (directly gone out of the court). When the ball character BC has not been hit back toward the opponent character EC or has not become out, the CPU 30 returns to step 106 and repeats the above-described processing. When the ball character BC either has been hit back toward the opponent character EC or has become out, the CPU 30 terminates the processing of this sub-routine and advances the processing to step 55 in FIG. 19.

When, in step 105, the ball character BC has reached the predetermined space, the CPU 30 displays the ball character BC while moving the ball character BC along the first ball trajectory TR1 (step 109), and advances the processing to the next step. More specifically, the CPU 30 calculates the first ball trajectory TR1 based on the velocity vector (vx, vy, vz) and the coordinate position (x, y, z) stored in the current ball character velocity data Di1 and ball character position data Di2. The CPU 30 displays the ball character BC while moving the ball character BC along the first ball trajectory TR1. The processing in step 109 is substantially the same as step 94, and will not be described in detail.

Next, the CPU 30 determines whether or not the ball character BC either has been hit back toward the opponent character EC or has become out (directly gone out of the court) (step 110). When the ball character BC has not been hit back toward the opponent character EC or has not become out, the CPU 30 returns to step 109 and repeats the above-described processing. When the ball character BC either has been hit back toward the opponent character EC or has become out, the CPU 30 terminates the processing of this sub-routine and advances the processing to step 55 in FIG. 19.

As described above, the game apparatus 3 in this embodiment can accurately determine motions of the controller 7 including the swinging direction of the controller 7 (moving direction of the controller 7) and the twisting direction of the controller 7 (rotation direction of the controller 7 around the Z axis as the rotation axis) as long as the player holds the controller 7 with one hand such that the front surface of the controller 7 is directed forward (i.e., away from the player). The player may swing the controller 7 with the top surface in any direction. Therefore, the degree of freedom in terms of the direction of the controller 7 held by the player (posture of the controller 7) is significantly increased. Since a rotation motion given to the controller 7 can be determined, a composite motion including a plurality of motions can be determined, for example, a motion of the controller 7 being swung while being rotated by the player. Since such a rotation motion given to the controller 7 can be used as operation information, the variety of types of operations which can be input is widened.

In the above-described game processing, the first ball trajectory TR1 and the second ball trajectory TR2 are calculated frame by frame (i.e., calculated with the processing loop of each of steps 94, 106 and 109). The trajectories may be calculated in other manners. For example, the first ball trajectory TR1 and the second ball trajectory TR2 once calculated may be stored in a memory and the stored data may be used as necessary. In this case, the first ball trajectory TR1 and/or the second ball trajectory TR2 may be calculated before the processing loop (for example, after step 91, after step 103). In this case, it is not necessary to calculate the trajectories frame by frame.

In the above description, the acceleration data in three axial directions output from the controller 7 is used to play a tennis game. The acceleration data may be used for other types of game processing. For example, example embodiment(s) of the present invention is applicable to a game in which the player character swings some type of object (ping pong, badminton, baseball, cutting something with a sword, etc.). In the above description, a determining apparatus for determining a motion of the controller 7 is included in the game system 1. Example embodiment(s) of the present invention is applicable to an information processing apparatus such as a general personal computer operated by an input device including an acceleration sensor. Based on a determined result of a motion determining apparatus, various processing can be executed. For example, in accordance with the determined motion of the input device, data displayed by the information processing apparatus may be moved, the page of information displayed by the information processing apparatus may be changed, or graphics are drawn. The motion determining apparatus may create motion data representing a motion of the input device in accordance with the determined motion of the input device and output the motion data to another apparatus.

The acceleration sensor 701 of the controller 7 is preferably a triaxial acceleration sensor for detecting and outputting linear accelerations as components of three axial directions perpendicular to one another. However, an acceleration sensor for detecting an acceleration in at least two axial directions perpendicular to each other can also be used. For example, the above-described left-right swinging direction or twisting direction can be determined using an acceleration sensor for detecting and outputting the acceleration in a three-dimensional space in which the controller 7 is located, as components of two axial directions, i.e., X-axis and Y-axis directions (see FIG. 3 and FIG. 4). In this case, the start and the end of the swing cannot be determined using the Z-axis direction acceleration, unlike the above embodiment. However, the start and the end of the swing may be determined using a centrifugal component which is generated by a left-right swing obtained by the X-axis and Y-axis direction accelerations, or using a sensor different from the acceleration sensor 701. Alternatively, a game rule that one of the operations buttons 72 should be pressed when the player swings the controller 7 may be provided, so that the start and the end of the swing can be determined in accordance with the time period in which such a button is being pressed.

In the above description, the controller 7 and the game apparatus 3 are connected to each other by wireless communication. Alternatively, the controller 7 and the game apparatus 3 may be electrically connected to each other via a cable. In this case, the cable connected to the controller 7 is connected to a connection terminal of the game apparatus 3.

In the above description, the receiving unit 6 connected to the connection terminal of the game apparatus 3 is used as receiving means for receiving transmission data which is wirelessly transmitted from the controller 7. Alternatively, the receiving means may be a receiving module built in the game apparatus 3. In this case, the transmission data received by the receiving module is output to the CPU 30 via a predetermined bus.

The shape of the controller 7, and the shape, number, position or the like of the operation section 72 provided in the controller 7 are merely exemplary, and may be altered without departing from the scope of the present invention. The position of the imaging information calculation section 74 in the controller 7 (the light incident opening of the imaging information calculation section 74) does not need to be on the front surface of the housing 71, and may be on another surface as long as light can enter from the outside of the housing 71.

A motion determining apparatus and a storage medium having a motion determining program stored thereon according to example embodiment(s) of the present invention are capable of determining a rotation motion given to an input device, and are useful as an apparatus or a program for determining a motion of an input device, such as a game apparatus or a game program operable in accordance with the motion of a game controller.

While the invention has been described in detail, the foregoing description is in all aspects illustrative and not restrictive. It is understood that numerous other modifications and variations can be devised without departing from the scope of the invention.

What is claimed is:

1. A handheld controller for use in wirelessly communicating with an electronic game machine having an associated display screen, a first light emitting marker and a second light emitting marker each mounted spaced from but in the vicinity of the display screen, said handheld controller comprising:
   a housing having a forward end, a rearward end, a top surface, a bottom surface and side surfaces and sized to be operated by one hand of a user, said housing having a user holding portion, said holding portion having a configuration to be held by a user such that the user's palm is disposed at least in part on the top surface and at least one finger is disposed at least in part on the bottom surface;
   at least one processor enclosed within said housing;
   an imaging device located in said housing and including a filter, a lens, and an image sensor for in use detecting light from said first light emitting marker and said second light emitting marker and for generating positional coordinate data related to the positional coordinates of said first light emitting marker and said second light emitting marker, said imaging device being operable to capture multiple frames of image data per second;
   said at least one processor including image processing circuitry coupled to said image sensor and operable in use to receive and process said positional coordinate data and to output processed positional coordinate data;
   a three-axis linear accelerometer in communication with said at least one processor and arranged within said housing for detecting acceleration of the controller along each of three axes and for generating acceleration data along each of the three axes over time to provide rotational-related input and to output acceleration data to said at least one processor;
   said imaging device and said three-axis linear accelerometer being operable as part of a user interface to generate game play control signals in response to at least one of a user swinging the handheld controller and to a user rotating the handheld controller when the user is holding the housing such that the user's palm is disposed at least in part on the top surface and at least one finger is disposed at least in part on the bottom surface;
   said three-axis linear accelerometer being operable in use in response to a user swinging the handheld controller and rotating the handheld controller to generate linear acceleration data along each of three axes sufficient to determine at least one of the swinging direction of the handheld controller and the controller rotation;
   a storage device for at least temporarily storing said acceleration data along each of the three axes; and
   a wireless communication device disposed within said housing operatively connected to said processor and operable in use to transmit game play-related signals to said electronic game machine including game play-related signals corresponding to said processed positional coordinate data, and said acceleration data.

2. A handheld controller for use in wirelessly communicating with an electronic game machine having an associated display screen, a first light emitting marker and a second, light emitting marker each mounted spaced from but in the vicinity of the display screen, said handheld controller comprising:
   a housing having a forward end, a rearward end, a top surface, a bottom surface and side surfaces and sized to be operated by one hand of a user, said housing having a user holding portion, said holding portion having a configuration to be held by a user such that the user's palm is disposed at least in part on the top surface and at least one finger is disposed at least in part on the bottom surface;

at least one processor enclosed within said housing;

an imaging device located in said housing and including a filter, a lens, and an image sensor for in use detecting light from said first light emitting marker and said second light emitting marker and for generating positional coordinate data related to the positional coordinates of said first light emitting marker and said second light emitting marker, said imaging device being operable to capture multiple frames of image data per second;

said at least one processor including image processing circuitry coupled to said image sensor and operable in use to receive and process said positional coordinate data and to output processed positional coordinate data;

a three-axis linear accelerometer in communication with said at least one processor and arranged within said housing for detecting acceleration of the controller along each of three axes and for generating acceleration data along each of the three axes over time to provide rotational-related input and to output acceleration data to said at least one processor;

said imaging device and said three-axis linear accelerometer and being operable as part of a user interface to generate game play control signals in response to at least one of a user swinging the handheld controller and to a user rotating the handheld controller when the user is holding the housing such that the user's palm is disposed at least in part on the top surface and at least one finger is disposed at least in part on the bottom surface;

said three-axis linear accelerometer being operable in use in response to a user swinging the handheld controller and rotating the handheld controller to generate linear acceleration data related to the point in time when a swing has begun and to generate acceleration data for a portion of the swing whose magnitude decreases over time, said generated linear acceleration data providing swinging direction-related input;

a storage device for at least temporarily storing said acceleration data along each of three axes; and a wireless communication device disposed within said housing operatively connected to said processor and operable in use to transmit game play-related signals to said electronic game machine including game play-related signals corresponding to said processed positional coordinate data, and said acceleration data.

3. A handheld controller according to claim 2, wherein said linear acceleration data indicating the point in time when a swing has begun is determined by detecting an acceleration whose magnitude exceeds the acceleration of gravity.

4. A handheld controller for use in wirelessly communicating with an electronic game machine having an associated display screen, a first light emitting marker and a second light emitting marker each mounted spaced from but in the vicinity of the display screen, said handheld controller comprising:

a housing having a forward end, a rearward end, a top surface, a bottom surface and side surfaces and sized to be operated by one hand of a user, said housing having a user holding portion, said holding portion having a configuration to be held by a user such that the user's palm is disposed at least in part on the top surface and at least one finger is disposed at least in part on the bottom surface;

at least one processor enclosed within said housing;

a first user interface for generating coordinate position data for said first and second light emitting markers, said first user interface including an imaging device located in said housing and including a filter, a lens, and an image sensor for in use detecting light from said first light emitting marker and said second light emitting marker and for generating positional coordinate data related to the positional coordinates of said first light emitting marker and said second light emitting marker; said imaging device being operable to capture multiple frames of image data per second;

a second user interface for in use controlling video game play on said electronic game machine, said user interface being operable in use to generate game play control signals in response to a user swinging the handheld controller and to a user rotating the handheld controller when the user is holding the housing such that the user's palm is disposed at least in part on the top surface and at least one finger is disposed at least in part on the bottom surface;

said second user interface including a three-axis linear accelerometer in communication with said at least one processor and arranged within said housing for detecting acceleration of the controller along each of three axes and for generating acceleration data along each of the three axes over time to provide rotational-related input and to output acceleration data to said at least one processor;

said three-axis linear accelerometer being operable in use to generate linear acceleration data related to the point in time when a swing begins and to generate acceleration data related to the point in time when a swing ends, a storage device for at least temporarily storing said acceleration data along each of the three axes; and a wireless communication device disposed within said housing operatively connected to said processor and operable in use to transmit game play-related signals to said electronic game machine including game play-related signals corresponding to said processed positional coordinate data, and said acceleration data.

5. A handheld controller according to claim 4, further comprising:

a third user interface including a plurality of control keys including a trigger switch.

6. A handheld controller according to claim 1 wherein the housing has an elongated shape that extends in a longitudinal direction from said forward end to said rearward end of the housing, the housing having a hole defined in its forward end to allow the light to pass therethrough; and a connector for engaging to a device external to the controller through a hole defined in the rearward end of the housing.

7. The handheld controller of claim 1, further comprising light emitting diodes positioned along a surface of housing.

8. An apparatus comprising:

the handheld controller of claim 1; and an electronic game machine comprising:

data obtaining programmed logic circuitry for obtaining acceleration data which is output from the accelerometer;

rotation motion determination programmed logic circuitry for determining a rotation motion of the handheld controller around a predetermined direction as a rotation axis, by comparing a start point in a two-dimensional coordinate system which is represented by the first acceleration data obtained in a predetermined period, and an end point in the two-dimensional coordinate system which is represented by the last acceleration data obtained in the predetermined period, wherein coordinate axes of the two-dimensional coordinate system are defined based on components of the two axial directions of the acceleration data, and an origin of the two-dimensional coordinate system represents a value of the acceleration data in the state where no acceleration including the acceleration of gravity acts upon the accelerometer; and an output for outputting motion data including at least the rotation motion determined by the rotation motion determination programmed logic circuitry.

9. A handheld controller according to claim 4, wherein said storage device is operable to at least temporarily store said positional coordinate data.

10. A handheld controller for use in wirelessly communicating with an electronic game machine having an associated display screen, a first light emitting marker and a second light emitting marker each mounted spaced from but in the vicinity of the display screen, said handheld controller comprising:

a housing having a forward end, a rearward end, a top surface, a bottom surface and side surfaces and sized to be operated by one hand of a user, said housing having a user holding portion, said holding portion having a configuration to be held by a user such that the user's palm is disposed at least in part on the top surface and at least one finger is disposed at least in part on the bottom surface;

at least one processor enclosed within said housing;

a first user interface for generating coordinate position data for said first and second light emitting markers, said first user interface including an imaging device located in said housing forward end and including a filter, a lens, and an image sensor for in use detecting light from said first light emitting marker and said second light emitting marker and for generating positional coordinate data related to the positional coordinates of said first light emitting marker and said second light emitting marker; said imaging device being operable to capture multiple frames of image data per second;

a second user interface for in use controlling video game play on said electronic game machine, said second user interface being operable in use to generate game play control signals in response to a user swinging the handheld controller in an arc when the user is holding the housing such that the user's palm is disposed at least in part on the top surface and at least one finger is disposed at least in part on the bottom surface;

said second user interface including a three-axis linear accelerometer in communication with said at least one processor and arranged within said housing for detecting acceleration of the controller along each of three axes and for generating acceleration data along each of the three axes over time to provide rotational-related input and to output acceleration data to said at least one processor;

said three-axis linear accelerometer being operable in use to generate linear acceleration data related to the point in time when a swing begins and to generate acceleration data related to the point in time when a swing ends, said accelerometer being operable to detect an acceleration including at least a centrifugal component generated when the controller is swung by a user in an arc and to output acceleration data;

a storage device for at least temporarily storing said acceleration data along each of the three axes; and a wireless communication device disposed within said housing operatively connected to said processor and operable in use to transmit game play-related signals to said electronic game machine including game play-related signals corresponding to said positional coordinate data and said acceleration data.

11. A handheld controller according to claim 10, wherein said three-axis linear acceleration is operable to detect and output acceleration data along an axis defined along the forward to rearward housing direction.

12. A handheld controller according to claim 4, wherein said three-axis linear accelerometer is operable to detect static linear acceleration.

13. A handheld controller of claim 4, wherein a trigger switch is embodied in a bottom surface of said housing, and wherein said three-axis linear accelerometer is disposed in the housing in an area from the vicinity of the trigger switch rearward.

14. A handheld controller of claim 4, further including a plurality of lights located adjacent said rearward end of said housing.

15. A handheld controller of claim 4, wherein said image sensor is a CMOS sensor.

16. A handheld controller of claim 4, wherein said image sensor is a CCD sensor.

17. A handheld controller according to claim 4, further including a plurality of push-button switches, and a trigger switch embodied in a bottom surface of said housing.

18. A handheld controller according to claim 4, wherein said imaging device comprises an infrared imaging device.

19. The handheld controller of claim 4, further including a connector disposed in a rearward end of said housing, said connector operable in use to engage and connect the controller with a connection cable.

20. The handheld controller of claim 4, wherein said housing is substantially rectangular in shape.

21. A handheld controller of claim 4, further including a direction control switch, and a plurality of push-button switches located adjacent and axially rearward of said direction control switch, and further including further push-button switches located adjacent a rearward end of said housing.

* * * * *

UNITED STATES PATENT AND TRADEMARK OFFICE
CERTIFICATE OF CORRECTION

PATENT NO. : 7,774,155 B2
APPLICATION NO. : 12/222787
DATED : August 10, 2010
INVENTOR(S) : Sato et al.

It is certified that error appears in the above-identified patent and that said Letters Patent is hereby corrected as shown below:

Column 1, lines 6-7, "The disclosure of Japanese Patent Application No. 2006-066450 is incorporated herein by reference." should read --This application is a continuation of U.S. Application No. 11/407,276, filed April 19, 2006, which claims the benefit of Japanese Patent Application No. 2006-066450, filed March 10, 2006, the contents of both applications are incorporated herein by reference in their entirety.--

Column 1, line 12, "embodiments of the present invention relates to" should read --embodiments of the present invention relate to--

Column 22, lines 20-21, "angle UD=-600." should read --angle UD = -60°.--

Signed and Sealed this

Fourteenth Day of September, 2010

David J. Kappos
*Director of the United States Patent and Trademark Office*